United States Patent
Marotta et al.

(10) Patent No.: US 12,198,428 B2
(45) Date of Patent: *Jan. 14, 2025

(54) SYSTEMS AND METHODS FOR A 3D HOME MODEL FOR REPRESENTATION OF PROPERTY

(71) Applicant: STATE FARM MUTUAL AUTOMOBILE INSURANCE COMPANY, Bloomington, IL (US)

(72) Inventors: Nicholas Carmelo Marotta, Scottsdale, AZ (US); Laura Kennedy, Gilbert, AZ (US); JD Johnson Willingham, Phoenix, AZ (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,723

(22) Filed: Apr. 21, 2023

(65) Prior Publication Data
US 2023/0252728 A1    Aug. 10, 2023

Related U.S. Application Data

(63) Continuation of application No. 17/240,985, filed on Apr. 26, 2021, now Pat. No. 11,676,343.
(Continued)

(51) Int. Cl.
*G06V 20/20* (2022.01)
*B64C 39/02* (2023.01)
(Continued)

(52) U.S. Cl.
CPC ............ *G06V 20/20* (2022.01); *B64C 39/024* (2013.01); *G01S 7/4808* (2013.01); *G01S 7/51* (2013.01);
(Continued)

(58) Field of Classification Search
CPC ...... G06V 20/653; G06V 10/82; G06V 20/20; G06V 20/64; G06F 16/29; G06F 30/13;
(Continued)

(56) References Cited

U.S. PATENT DOCUMENTS

| | | |
|---|---|---|
| 7,177,836 B1 | 2/2007 | German et al. |
| 7,389,255 B2 | 6/2008 | Formisano |

(Continued)

FOREIGN PATENT DOCUMENTS

| | | |
|---|---|---|
| CN | 108694266 A | 10/2018 |
| CN | 106683089 B | 12/2019 |

(Continued)

OTHER PUBLICATIONS

Article, " Hyundai MnSoft Inc Submits Korean Patent Application for Method of Automatic Generation of Indoor Map Utilizing the LiDAR Equipment"; ZGlobal IP News. Measurement & Testing Patent News [New Delhi] May 11, 2014 (Year: 2014).

(Continued)

*Primary Examiner* — Xilin Guo
(74) *Attorney, Agent, or Firm* — MARSHALL, GERSTEIN & BORUN LLP

(57) ABSTRACT

The following relates generally to light detection and ranging (LIDAR) and artificial intelligence (AI). In some embodiments, a system: receives LIDAR data generated from a LIDAR camera; measures plurality of dimensions of the home based upon processor analysis of the LIDAR data; builds a 3D model of the home based upon the measured plurality of dimensions; and displays a representation of the 3D model by visually navigating through the 3D model.

20 Claims, 21 Drawing Sheets

Related U.S. Application Data

(60) Provisional application No. 63/027,201, filed on May 19, 2020, provisional application No. 63/025,600, filed on May 15, 2020, provisional application No. 63/016,168, filed on Apr. 27, 2020.

(51) Int. Cl.

| | |
|---|---|
| *G01S 7/48* | (2006.01) |
| *G01S 7/51* | (2006.01) |
| *G01S 17/89* | (2020.01) |
| *G02B 27/01* | (2006.01) |
| *G06F 16/29* | (2019.01) |
| *G06F 30/13* | (2020.01) |
| *G06N 3/049* | (2023.01) |
| *G06N 3/08* | (2023.01) |
| *G06N 5/04* | (2023.01) |
| *G06N 20/00* | (2019.01) |
| *G06Q 10/087* | (2023.01) |
| *G06Q 20/08* | (2012.01) |
| *G06Q 20/12* | (2012.01) |
| *G06Q 30/0601* | (2023.01) |
| *G06T 7/73* | (2017.01) |
| *G06T 7/90* | (2017.01) |
| *G06T 17/00* | (2006.01) |
| *G06T 17/05* | (2011.01) |
| *G06T 19/00* | (2011.01) |
| *G06T 19/20* | (2011.01) |
| *B64U 101/30* | (2023.01) |
| *H04W 84/18* | (2009.01) |

(52) U.S. Cl.
CPC .......... *G01S 17/89* (2013.01); *G02B 27/0172* (2013.01); *G06F 16/29* (2019.01); *G06F 30/13* (2020.01); *G06N 3/049* (2013.01); *G06N 3/08* (2013.01); *G06N 5/04* (2013.01); *G06N 20/00* (2019.01); *G06Q 10/087* (2013.01); *G06Q 20/085* (2013.01); *G06Q 20/12* (2013.01); *G06Q 30/0633* (2013.01); *G06Q 30/0639* (2013.01); *G06T 7/75* (2017.01); *G06T 7/90* (2017.01); *G06T 17/00* (2013.01); *G06T 17/05* (2013.01); *G06T 19/003* (2013.01); *G06T 19/006* (2013.01); *G06T 19/20* (2013.01); *B64U 2101/30* (2023.01); *G02B 2027/0138* (2013.01); *G02B 2027/014* (2013.01); *G02B 2027/0178* (2013.01); *G06T 2207/10028* (2013.01); *G06T 2207/10044* (2013.01); *G06T 2207/30184* (2013.01); *G06T 2219/2012* (2013.01); *H04W 84/18* (2013.01)

(58) Field of Classification Search
CPC ..... G06T 19/003; G06T 19/006; G06T 17/05; G06T 19/20; G06T 17/00; G06T 7/75; G06T 7/90; G06T 2207/30184; G06T 2207/10028; G06T 2207/10044; G06T 2219/2012; G06T 2219/004; G06T 15/005; G06T 2200/04; G06N 5/04; G06N 20/00; G06N 3/08; G06N 3/049; G06Q 20/12; G06Q 30/0639; G06Q 10/087; G06Q 30/0633; G06Q 20/085; G02B 27/0172; G02B 2027/0138; G02B 2027/0178; G02B 2027/014; G01S 17/89; G01S 7/4808; G01S 7/51; B64C 39/024; B64U 2101/30; H04W 84/18

See application file for complete search history.

(56) References Cited

U.S. PATENT DOCUMENTS

| | | |
|---|---|---|
| 7,991,576 B2 | 8/2011 | Roumeliotis |
| 8,480,496 B2 * | 7/2013 | Tomita .................. H04L 67/131 463/31 |
| 8,490,006 B1 | 7/2013 | Reeser et al. |
| 8,527,306 B1 | 9/2013 | Reeser et al. |
| 8,533,144 B1 | 9/2013 | Reeser et al. |
| 8,640,038 B1 | 1/2014 | Reeser et al. |
| 8,665,084 B1 | 3/2014 | Shapiro et al. |
| 8,890,680 B2 | 11/2014 | Reeser et al. |
| 8,917,186 B1 | 12/2014 | Grant |
| 8,976,937 B2 | 3/2015 | Shapiro et al. |
| 9,049,168 B2 | 6/2015 | Jacob et al. |
| 9,057,746 B1 | 6/2015 | Houlette et al. |
| 9,064,161 B1 | 6/2015 | Boman et al. |
| 9,117,349 B2 | 8/2015 | Shapiro et al. |
| 9,142,119 B1 | 9/2015 | Grant |
| 9,152,737 B1 | 10/2015 | Micali et al. |
| 9,183,578 B1 | 11/2015 | Reeser et al. |
| 9,202,363 B1 | 12/2015 | Grant |
| 9,262,909 B1 | 2/2016 | Grant |
| 9,286,772 B2 | 3/2016 | Shapiro et al. |
| 9,344,330 B2 | 5/2016 | Jacob et al. |
| 9,424,737 B2 | 8/2016 | Bailey et al. |
| 9,443,195 B2 | 9/2016 | Micali et al. |
| 9,472,092 B1 | 10/2016 | Grant |
| 9,589,441 B2 | 3/2017 | Shapiro et al. |
| 9,609,003 B1 | 3/2017 | Chmielewski et al. |
| 9,665,892 B1 | 5/2017 | Reeser et al. |
| 9,666,060 B2 | 5/2017 | Reeser et al. |
| 9,699,529 B1 | 7/2017 | Petri et al. |
| 9,739,813 B2 | 8/2017 | Houlette et al. |
| 9,770,382 B1 | 9/2017 | Ellis |
| 9,786,158 B2 | 10/2017 | Beaver et al. |
| 9,798,979 B2 | 10/2017 | Fadell et al. |
| 9,798,993 B2 | 10/2017 | Payne et al. |
| 9,800,570 B1 | 10/2017 | Bleisch |
| 9,800,958 B1 | 10/2017 | Petri et al. |
| 9,811,862 B1 | 11/2017 | Allen et al. |
| 9,812,001 B1 | 11/2017 | Grant |
| 9,881,226 B1 | 1/2018 | Rybakov et al. |
| 9,888,371 B1 | 2/2018 | Jacob |
| 9,892,463 B1 | 2/2018 | Hakimi-Boushehri et al. |
| 9,898,168 B2 | 2/2018 | Shapiro et al. |
| 9,898,912 B1 | 2/2018 | Jordan, II et al. |
| 9,911,042 B1 | 3/2018 | Cardona et al. |
| 9,923,971 B2 | 3/2018 | Madey et al. |
| 9,942,630 B1 | 4/2018 | Petri et al. |
| 9,947,202 B1 | 4/2018 | Moon et al. |
| 9,978,033 B1 | 5/2018 | Payne et al. |
| 9,997,056 B2 | 6/2018 | Bleisch |
| 10,002,295 B1 | 6/2018 | Cardona et al. |
| 10,025,887 B1 | 7/2018 | Santarone et al. |
| 10,042,341 B1 | 8/2018 | Jacob |
| 10,047,974 B1 | 8/2018 | Riblet et al. |
| 10,055,793 B1 | 8/2018 | Call et al. |
| 10,055,803 B2 | 8/2018 | Orduna et al. |
| 10,057,664 B1 | 8/2018 | Moon et al. |
| 10,062,205 B2 | 8/2018 | Eikhoff |
| 10,073,929 B2 | 9/2018 | Vaynriber et al. |
| 10,102,584 B1 | 10/2018 | Devereaux et al. |
| 10,102,585 B1 | 10/2018 | Bryant et al. |
| 10,102,586 B1 | 10/2018 | Marlow et al. |
| 10,102,589 B1 | 10/2018 | Tofte et al. |
| 10,107,708 B1 | 10/2018 | Schick et al. |
| 10,137,942 B2 | 11/2018 | Sanders et al. |
| 10,137,984 B1 | 11/2018 | Flick |
| 10,142,394 B2 | 11/2018 | Chmielewski et al. |
| 10,169,677 B1 | 1/2019 | Ren et al. |
| 10,176,514 B1 | 1/2019 | Chen et al. |
| 10,176,705 B1 | 1/2019 | Grant |
| 10,181,160 B1 | 1/2019 | Hakimi-Boushehri et al. |
| 10,186,134 B1 | 1/2019 | Moon et al. |
| 10,198,771 B1 | 2/2019 | Madigan et al. |
| 10,210,577 B1 | 2/2019 | Davis et al. |
| 10,217,068 B1 | 2/2019 | Davis et al. |

(56) References Cited

U.S. PATENT DOCUMENTS

| | | |
|---|---|---|
| 10,229,394 B1 | 3/2019 | Davis et al. |
| 10,244,294 B1 | 3/2019 | Moon et al. |
| 10,249,158 B1 | 4/2019 | Jordan, II et al. |
| 10,275,427 B2 | 4/2019 | Saptharishi et al. |
| 10,282,787 B1 | 5/2019 | Hakimi-Boushehri et al. |
| 10,282,788 B1 | 5/2019 | Jordan, II et al. |
| 10,282,961 B1 | 5/2019 | Jordan, II et al. |
| 10,295,431 B1 | 5/2019 | Schick et al. |
| 10,296,978 B1 | 5/2019 | Corder et al. |
| 10,297,138 B2 | 5/2019 | Reeser et al. |
| 10,304,313 B1 | 5/2019 | Moon et al. |
| 10,311,302 B2 | 6/2019 | Kottenstette et al. |
| 10,323,860 B1 | 6/2019 | Riblet et al. |
| 10,325,473 B1 | 6/2019 | Moon et al. |
| 10,332,059 B2 | 6/2019 | Matsuoka et al. |
| 10,346,811 B1 | 7/2019 | Jordan, II et al. |
| 10,353,359 B1 | 7/2019 | Jordan, II et al. |
| 10,356,303 B1 | 7/2019 | Jordan, II et al. |
| 10,366,288 B1 | 7/2019 | Kottenstette et al. |
| 10,387,966 B1 | 8/2019 | Shah et al. |
| 10,388,135 B1 | 8/2019 | Jordan, II et al. |
| 10,409,855 B2 | 9/2019 | Petrou et al. |
| 10,412,169 B1 | 9/2019 | Madey et al. |
| 10,446,000 B2 | 10/2019 | Friar et al. |
| 10,467,476 B1 | 11/2019 | Cardona et al. |
| 10,469,282 B1 | 11/2019 | Konrardy et al. |
| 10,480,825 B1 | 11/2019 | Riblet et al. |
| 10,482,746 B1 | 11/2019 | Moon et al. |
| 10,506,411 B1 | 12/2019 | Jacob |
| 10,514,669 B1 | 12/2019 | Call et al. |
| 10,515,372 B1 | 12/2019 | Jordan, II et al. |
| 10,515,419 B1 | 12/2019 | Walker et al. |
| 10,521,865 B1 | 12/2019 | Spader et al. |
| 10,522,009 B1 | 12/2019 | Jordan, II et al. |
| 10,527,423 B1 | 1/2020 | Pavlyuk et al. |
| 10,528,996 B2 | 1/2020 | Clark et al. |
| 10,546,478 B1 | 1/2020 | Moon et al. |
| 10,547,918 B1 | 1/2020 | Moon et al. |
| 10,565,541 B2 | 2/2020 | Payne et al. |
| 10,565,550 B1 | 2/2020 | Gowda |
| 10,573,146 B1 | 2/2020 | Jordan, II et al. |
| 10,573,149 B1 | 2/2020 | Jordan, II et al. |
| 10,579,028 B1 | 3/2020 | Jacob |
| 10,586,177 B1 | 3/2020 | Choueiter et al. |
| 10,607,295 B1 | 3/2020 | Hakimi-Boushehri et al. |
| 10,630,639 B2 | 4/2020 | Bilsten |
| 10,634,576 B1 | 4/2020 | Schick et al. |
| 10,643,072 B2 | 5/2020 | Kottenstette et al. |
| 10,664,922 B1 | 5/2020 | Madigan et al. |
| 10,679,292 B1 | 6/2020 | Call et al. |
| 10,685,402 B1 | 6/2020 | Bryant et al. |
| 10,699,346 B1 | 6/2020 | Corder et al. |
| 10,699,348 B1 | 6/2020 | Devereaux et al. |
| 10,726,494 B1 | 7/2020 | Shah et al. |
| 10,726,500 B1 | 7/2020 | Shah et al. |
| 10,733,671 B1 | 8/2020 | Hakimi-Boushehri et al. |
| 10,733,868 B2 | 8/2020 | Moon et al. |
| 10,735,829 B2 | 8/2020 | Petri et al. |
| 10,740,691 B2 | 8/2020 | Choueiter et al. |
| 10,741,033 B1 | 8/2020 | Jordan, II et al. |
| 10,750,252 B2 | 8/2020 | Petri et al. |
| 10,795,329 B1 | 10/2020 | Jordan, II et al. |
| 10,796,557 B2 | 10/2020 | Sundermeyer et al. |
| 10,802,477 B1 | 10/2020 | Konrardy et al. |
| 10,804,700 B2 | 10/2020 | Cohen et al. |
| 10,816,939 B1 | 10/2020 | Coleman |
| 10,818,105 B1 | 10/2020 | Konrardy et al. |
| 10,823,458 B1 | 11/2020 | Riblet et al. |
| 10,824,971 B1 | 11/2020 | Davis et al. |
| 10,825,320 B1 | 11/2020 | Moon et al. |
| 10,825,321 B1 | 11/2020 | Moon et al. |
| 10,832,225 B1 | 11/2020 | Davis et al. |
| 10,832,267 B2 | 11/2020 | Poole |
| 10,846,800 B1 | 11/2020 | Bryant et al. |
| 10,907,844 B2 | 2/2021 | Ribbich et al. |
| 10,922,756 B1 | 2/2021 | Call et al. |
| 10,922,948 B1 | 2/2021 | Moon et al. |
| 10,943,447 B1 | 3/2021 | Jordan, II et al. |
| 10,970,990 B1 | 4/2021 | Jacob |
| 10,990,069 B1 | 4/2021 | Jacob |
| 11,003,334 B1 | 5/2021 | Conway et al. |
| 11,004,320 B1 | 5/2021 | Jordan, II et al. |
| 11,015,997 B1 | 5/2021 | Schick et al. |
| 11,017,480 B2 | 5/2021 | Shah et al. |
| 11,024,079 B1 | 6/2021 | Chuah et al. |
| 11,042,137 B1 | 6/2021 | Call et al. |
| 11,042,942 B1 | 6/2021 | Hakimi-Boushehri et al. |
| 11,043,026 B1 | 6/2021 | Fathi et al. |
| 11,043,098 B1 | 6/2021 | Jordan, II et al. |
| 11,046,430 B1 | 6/2021 | Melton et al. |
| 11,049,078 B1 | 6/2021 | Jordan, II et al. |
| 11,049,189 B2 | 6/2021 | Shah et al. |
| 11,069,352 B1 | 7/2021 | Tang et al. |
| 11,074,659 B1 | 7/2021 | Hakimi-Boushehri et al. |
| 11,100,594 B1 | 8/2021 | West et al. |
| 11,118,812 B1 | 9/2021 | Riblet et al. |
| 11,126,708 B2 | 9/2021 | Reimer |
| 11,151,378 B2 | 10/2021 | Kottenstette et al. |
| 11,164,257 B1 | 11/2021 | Devereaux et al. |
| 11,164,391 B1 | 11/2021 | Sharma et al. |
| 11,195,324 B1 | 12/2021 | Dubost et al. |
| 11,205,213 B2 | 12/2021 | Turner et al. |
| 11,210,552 B2 | 12/2021 | Kossyk et al. |
| 11,222,426 B2 | 1/2022 | Richter et al. |
| 11,232,150 B2 | 1/2022 | Vianello et al. |
| 11,232,873 B1 | 1/2022 | Aspro et al. |
| 11,250,515 B1 | 2/2022 | Feiteira et al. |
| 11,263,583 B1 | 3/2022 | Kumar et al. |
| 11,277,465 B2 | 3/2022 | Chmielewski et al. |
| 11,300,662 B1 | 4/2022 | Milton |
| 11,348,193 B1 | 5/2022 | Konrardy et al. |
| 11,354,728 B2 | 6/2022 | Chachek et al. |
| 11,367,265 B2 | 6/2022 | Vianello et al. |
| 11,417,212 B1 | 8/2022 | Farooqui et al. |
| 11,453,129 B2 | 9/2022 | Paepcke et al. |
| 11,568,356 B1 | 1/2023 | Rochon et al. |
| 2001/0033284 A1 | 10/2001 | Chan |
| 2002/0060784 A1 | 5/2002 | Pack et al. |
| 2003/0023483 A1 | 1/2003 | Messner et al. |
| 2003/0212818 A1 | 11/2003 | Klein et al. |
| 2007/0150406 A1 | 6/2007 | Subramanian et al. |
| 2007/0269102 A1 | 11/2007 | Wang |
| 2009/0110267 A1 | 4/2009 | Zakhor et al. |
| 2009/0265193 A1 | 10/2009 | Collins et al. |
| 2009/0310867 A1 | 12/2009 | Matei et al. |
| 2009/0322742 A1 | 12/2009 | Muktinutalapati et al. |
| 2010/0131533 A1 | 5/2010 | Ortiz |
| 2010/0150431 A1 | 6/2010 | Chen et al. |
| 2011/0161117 A1 | 6/2011 | Busque et al. |
| 2011/0276417 A1 | 11/2011 | Campbell et al. |
| 2012/0022896 A1 | 1/2012 | Jayaram et al. |
| 2012/0176497 A1 | 7/2012 | Shadmi |
| 2012/0216129 A1 | 8/2012 | Ng et al. |
| 2012/0299961 A1 | 11/2012 | Ramkumar et al. |
| 2013/0083964 A1 | 4/2013 | Morris et al. |
| 2013/0141549 A1 | 6/2013 | Beers et al. |
| 2013/0144566 A1 | 6/2013 | De Biswas |
| 2013/0179841 A1 | 7/2013 | Mutton et al. |
| 2013/0215116 A1 | 8/2013 | Siddique et al. |
| 2013/0300740 A1 | 11/2013 | Snyder et al. |
| 2014/0032596 A1 | 1/2014 | Fish et al. |
| 2014/0081599 A1 | 3/2014 | Bradley |
| 2014/0107927 A1 | 4/2014 | Rojas |
| 2014/0125671 A1 | 5/2014 | Vorobyov et al. |
| 2014/0229301 A1 | 8/2014 | Wu |
| 2014/0266669 A1 | 9/2014 | Fadell et al. |
| 2014/0267717 A1 | 9/2014 | Pitzer et al. |
| 2014/0304011 A1 | 10/2014 | Yager et al. |
| 2014/0306993 A1 | 10/2014 | Poulos et al. |
| 2015/0061859 A1 | 3/2015 | Matsuoka et al. |
| 2015/0097688 A1 | 4/2015 | Bruck et al. |
| 2015/0172628 A1 | 6/2015 | Brown et al. |
| 2015/0227644 A1 | 8/2015 | Schultz |
| 2015/0227893 A1 | 8/2015 | Huynh et al. |

(56) References Cited

U.S. PATENT DOCUMENTS

| | | |
|---|---|---|
| 2015/0269438 A1 | 9/2015 | Samarasekera et al. |
| 2015/0286893 A1 | 10/2015 | Straub et al. |
| 2015/0302116 A1 | 10/2015 | Howell |
| 2015/0347910 A1 | 12/2015 | Fadell et al. |
| 2015/0379371 A1 | 12/2015 | Yoon et al. |
| 2016/0023761 A1 | 1/2016 | McNally |
| 2016/0148433 A1 | 5/2016 | Petrovskaya et al. |
| 2016/0196689 A1 | 7/2016 | Pullan |
| 2016/0224321 A1 | 8/2016 | Seshadri et al. |
| 2016/0260158 A1 | 9/2016 | High et al. |
| 2017/0031925 A1 | 2/2017 | Mishra et al. |
| 2017/0039307 A1 | 2/2017 | Koger et al. |
| 2017/0097413 A1 | 4/2017 | Gillian et al. |
| 2017/0116781 A1 | 4/2017 | Babahajiani et al. |
| 2017/0132567 A1 | 5/2017 | Glunz |
| 2017/0206426 A1 | 7/2017 | Schrier et al. |
| 2017/0220887 A1 | 8/2017 | Fathi et al. |
| 2017/0243064 A1 | 8/2017 | Simari et al. |
| 2017/0264890 A1 | 9/2017 | Gorilovsky et al. |
| 2017/0293894 A1 | 10/2017 | Taliwal et al. |
| 2017/0314803 A1 | 11/2017 | Jacobson et al. |
| 2017/0365008 A1 | 12/2017 | Schreier et al. |
| 2017/0365094 A1 | 12/2017 | Liu et al. |
| 2018/0075648 A1 | 3/2018 | Moghadam et al. |
| 2018/0096373 A1 | 4/2018 | Poole |
| 2018/0101813 A1 | 4/2018 | Paat et al. |
| 2018/0121576 A1 | 5/2018 | Mosher et al. |
| 2018/0129635 A1 | 5/2018 | Saptharishi et al. |
| 2018/0143756 A1* | 5/2018 | Mildrew ............ G06T 19/003 |
| 2018/0144547 A1 | 5/2018 | Shakib et al. |
| 2018/0181789 A1 | 6/2018 | Metzler et al. |
| 2018/0211441 A1 | 7/2018 | Priest et al. |
| 2018/0225504 A1 | 8/2018 | Sargent et al. |
| 2018/0273030 A1 | 9/2018 | Weldon et al. |
| 2018/0350145 A1 | 12/2018 | Byl et al. |
| 2018/0358009 A1 | 12/2018 | Daley et al. |
| 2018/0364045 A1 | 12/2018 | Williams et al. |
| 2019/0012726 A1 | 1/2019 | D'Agostino et al. |
| 2019/0025858 A1 | 1/2019 | Bar-Nahum et al. |
| 2019/0026570 A1 | 1/2019 | Wei et al. |
| 2019/0026958 A1 | 1/2019 | Gausebeck et al. |
| 2019/0050732 A1 | 2/2019 | Anderson |
| 2019/0051054 A1* | 2/2019 | Jovanovic ........... G06F 3/04815 |
| 2019/0057169 A1 | 2/2019 | Santarone et al. |
| 2019/0096135 A1 | 3/2019 | Dal Mutto et al. |
| 2019/0097443 A1 | 3/2019 | Kwa et al. |
| 2019/0128771 A1 | 5/2019 | Santarone et al. |
| 2019/0155973 A1 | 5/2019 | Morczinek et al. |
| 2019/0188755 A1 | 6/2019 | Fuzell-Casey et al. |
| 2019/0188796 A1 | 6/2019 | Sauer et al. |
| 2019/0189007 A1 | 6/2019 | Herman et al. |
| 2019/0217477 A1 | 7/2019 | Paepcke et al. |
| 2019/0228115 A1 | 7/2019 | Bergin et al. |
| 2019/0234742 A1 | 8/2019 | Jachym et al. |
| 2019/0236531 A1* | 8/2019 | Adato .................... H04N 23/80 |
| 2019/0251520 A1 | 8/2019 | Bentley, III et al. |
| 2019/0277703 A1 | 9/2019 | Valouch et al. |
| 2019/0295319 A1 | 9/2019 | Pham et al. |
| 2019/0303850 A1 | 10/2019 | Mangos et al. |
| 2019/0311319 A1 | 10/2019 | Cote et al. |
| 2019/0346271 A1 | 11/2019 | Zhang et al. |
| 2019/0362431 A1 | 11/2019 | Hertz et al. |
| 2019/0366558 A1 | 12/2019 | Gupta et al. |
| 2019/0377837 A1 | 12/2019 | Lewis et al. |
| 2019/0392087 A1 | 12/2019 | Suard et al. |
| 2020/0043077 A1 | 2/2020 | Turner et al. |
| 2020/0043368 A1 | 2/2020 | Brathwaite et al. |
| 2020/0051338 A1 | 2/2020 | Zia et al. |
| 2020/0079488 A1 | 3/2020 | Messori et al. |
| 2020/0082612 A1 | 3/2020 | Frederick et al. |
| 2020/0092473 A1 | 3/2020 | Shan et al. |
| 2020/0122321 A1 | 4/2020 | Khansari et al. |
| 2020/0124731 A1 | 4/2020 | Xiong et al. |
| 2020/0129862 A1 | 4/2020 | Liu et al. |
| 2020/0132470 A1 | 4/2020 | Xu et al. |
| 2020/0134734 A1 | 4/2020 | Aneesh |
| 2020/0151504 A1 | 5/2020 | Albrecht et al. |
| 2020/0160611 A1 | 5/2020 | Gertenbach et al. |
| 2020/0167631 A1 | 5/2020 | Rezgui |
| 2020/0182634 A1 | 6/2020 | Karceski |
| 2020/0184706 A1 | 6/2020 | Speasl et al. |
| 2020/0219264 A1 | 7/2020 | Brunner et al. |
| 2020/0274962 A1 | 8/2020 | Martin et al. |
| 2020/0285206 A1 | 9/2020 | Young et al. |
| 2020/0293796 A1 | 9/2020 | Sajjadi et al. |
| 2020/0294247 A1 | 9/2020 | Baumbach et al. |
| 2020/0301378 A1* | 9/2020 | McQueen .............. G05B 15/02 |
| 2020/0301799 A1 | 9/2020 | Manivasagam et al. |
| 2020/0302510 A1 | 9/2020 | Chachek et al. |
| 2020/0302549 A1 | 9/2020 | Jordan, II et al. |
| 2020/0302681 A1 | 9/2020 | Totty et al. |
| 2020/0309557 A1 | 10/2020 | Efland |
| 2020/0327791 A1 | 10/2020 | Moon et al. |
| 2020/0357132 A1* | 11/2020 | Jovanovic ................. G06T 7/80 |
| 2020/0370994 A1 | 11/2020 | Santarone et al. |
| 2021/0035432 A1 | 2/2021 | Moon et al. |
| 2021/0035455 A1 | 2/2021 | Hall et al. |
| 2021/0041246 A1 | 2/2021 | Kukreja |
| 2021/0042843 A1 | 2/2021 | Bryant et al. |
| 2021/0049542 A1 | 2/2021 | Dalal et al. |
| 2021/0064792 A1 | 3/2021 | Kim et al. |
| 2021/0097776 A1 | 4/2021 | Faulkner et al. |
| 2021/0104093 A1 | 4/2021 | Vincent et al. |
| 2021/0112647 A1 | 4/2021 | Coleman |
| 2021/0142564 A1 | 5/2021 | Impas et al. |
| 2021/0158671 A1 | 5/2021 | Jordan, II et al. |
| 2021/0224589 A1 | 7/2021 | Jahagirdar et al. |
| 2021/0264524 A1 | 8/2021 | Knarr et al. |
| 2021/0279811 A1 | 9/2021 | Waltman et al. |
| 2021/0279950 A1 | 9/2021 | Phalak |
| 2021/0312789 A1 | 10/2021 | Linn |
| 2021/0373569 A1 | 12/2021 | Tazume |
| 2022/0075038 A1 | 3/2022 | Hall et al. |
| 2022/0101275 A1 | 3/2022 | Aspro et al. |
| 2022/0415059 A1 | 12/2022 | Smolyanskiy et al. |
| 2023/0281527 A1 | 9/2023 | Cella et al. |
| 2023/0352005 A1 | 11/2023 | Akahori et al. |

FOREIGN PATENT DOCUMENTS

| | | |
|---|---|---|
| CN | 110160545 B | 5/2020 |
| CN | 111626536 A | 9/2020 |
| CN | 113138558 A | 7/2021 |
| EP | 2259225 A1 | 12/2010 |
| JP | 2003-157357 A | 5/2003 |
| JP | 6675743 B1 | 4/2020 |
| KR | 10-1427369 B1 | 8/2014 |
| KR | 10-2015-0129845 A | 11/2015 |
| KR | 10-2019-0106867 A | 9/2019 |
| KR | 10-2038097 B1 | 10/2019 |
| WO | 2014/159131 A2 | 10/2014 |
| WO | 2016/081511 A2 | 5/2016 |
| WO | 2017/201486 A1 | 11/2017 |
| WO | 2017/217936 A1 | 12/2017 |
| WO | 2021/087185 A1 | 5/2021 |

OTHER PUBLICATIONS

Nagy, D., Lau, D., Locke, J., Stoddart, J., Villaggi, L., Wang, R & Benjamin, D. (May 2017). Project discover: An application of generative design for architectural space planning. In Proceedings of the Symposium on Simulation for Architecture and Urban Design (pp. 1-8). (Year: 2017).

Rahbar, M., Mahdavinejad, M., Bemanian, M., Davaie Markazi, A. H., & Hovestadt, L. (2019). Generating synthetic space allocation probability layouts based on trained conditional-GANs. Applied Artificial Intelligence, 33(8), 689-705. (Year: 2019).

Villaggi, L., & Nagy, D. (2019). Generative Design for Architectural Space Planning: The Case of the Autodesk University 2017 Layout. (Year: 2017).

Anon., "Ubamarketapp trial for Warner's Budgens," Grocer (The) 239.8269: 11. Williams Reed Ltd. (Aug. 20, 2016). (Year: 2016).

(56) References Cited

OTHER PUBLICATIONS

ApolloAuto, apollo_2_0_hardware_system_installation_guide_v1. md, updated on Jan. 17, 2019.
Arief, H.A., et al., "Land Cover Segmentation of Airborne LiDAR Data Using Stochastic Atrous Network," Remote Sensing 10.6 MDPI AG. (Jun. 2018), (Year: 2018).
Covelli, "The Camera-Lidar Debate", Jul. 29, 2019 (Year: 2019).
Leskens et al., An interactive simulation and visualization tool for flood analysis usable for practitioners, Mitig. Adapt. Strateg. Glob. Chang., 22:307-324 (2015).
LiDAR Camera L515—Intel (Registered) RealSense (Trademark) Depth and Tracking Cameras, Available Online at <https://web.archive.org./web/20200220130643/https://www.intelrealsense.com/lidar-camera-l515/> 1-17 (2020).
Liu et al., Precision study on augmented reality-based visual guidance for facility management tasks, Automation in Construction, 90: 79-90. (2018).
Ridden, "Intel adds palm-sized LiDAR to RealSense Range," New Atlas, downloaded from the Internet at: <https://newatlas.com/digital-cameras/intel-realsense-1515-lidar/>, Dec. 12, 2019 (Year: 2019).
Rubinstein, E., "EFR confab: Operators put principles and the 'Net' into action," Nation's Restaurant News 33.17: 4,83. Lebhar-Friedman, Inc. (Aril 26, 199). (Year: 1999).
Schall et al., "VIDENTE-3D visualization of underground infrastructure using handheld augmented reality." Geohydroinformatics: integrating GIS and water engineering (2010): 207-219 (Year: 2010).
Schall et al., Smart Vidente: advances in mobile augmented reality for interactive visualization of underground infrastructure, Personal and Ubiquitous Computing, 17: 1533-1549 (2013).
Soria et al., Augmented and virtual reality for underground facilities management, Journal of Computing and Information Science in Engineering, 18.4 (2018).
Tran et al., Procedural Reconstruction of 3D Indoor Models from Lidar Data Using Reversible Jump Markov Chain Monte Carlo, 2020 (Year: 2020).
U.S. Appl. No. 17/185,858, filed Feb. 25, 2021, Marotta et al., "Systems and Methods for Light Detection and Ranging (LIDAR) Based Generation of a Personal Articles Insurance Quote"., U.S. Appl. No. 17/185,858.
U.S. Appl. No. 17/185,896, filed Feb. 25, 2021, Marotta et al., "Systems and Methods for Light Detection and Ranging (LIDAR) Based Generation of an Inventory List of Personal Belongings"., U.S. Appl. No. 17/185,896.
U.S. Appl. No. 17/185,925, filed Feb. 25, 2021, Marotta et al., "Systems And Methods For Light Detection And Ranging (Lidar) Based Generation Of A Homeowners Insurance Quote"., U.S. Appl. No. 17/185,925.
U.S. Appl. No. 17/185,930, filed Feb. 25, 2021, "Systems And Methods For Light Detection And Ranging (Lidar) Based Generation Of An Insurance Claim"., U.S. Appl. No. 17/185,930.
U.S. Appl. No. 17/185,938, filed Feb. 25, 2021, "Systems And Methods For Light Detection And Ranging (Lidar) Based Generation Of First Notice Of Loss"., U.S. Appl. No. 17/185,938.
U.S. Appl. No. 17/185,955, filed Feb. 25, 2021, "Systems And Methods For Light Detection And Ranging (Lidar) Based Generation Of Navigation For Vision-Impaired Individuals"., U.S. Appl. No. 17/185,955.
U.S. Appl. No. 17/240,970, filed Apr. 26, 2021, Marotta et al., "Systems And Methods For A 3d Home Model For Visualizing Proposed Changes To Home".
U.S. Appl. No. 17/240,985, filed Apr. 26, 2021, "Systems And Methods For A 3d Home Model For Representation Of Property".
U.S. Appl. No. 17/240,993, filed Apr. 26, 2021, Marotta et al., "Systems And Methods For A 3d Model For Viewing Potential Placement Of An Object".
U.S. Appl. No. 17/240,999, filed Apr. 26, 2021, "Systems And Methods For Ai Based Recommendations For Object Placement In A Home".
U.S. Appl. No. 17/241,008, filed Apr. 26, 2021, Marotta et al., "Systems And Methods For A 3d Model For Visualization Of Landscape Design".
U.S. Appl. No. 17/241,013, filed Apr. 26, 2021, Marotta et al., "Systems And Methods For Visualization Of Utility Lines".
U.S. Appl. No. 17/241,019, filed Apr. 26, 2021, Marotta et al., "Systems And Methods For Commercial Inventory Mapping".
U.S. Appl. No. 17/241,025, filed Apr. 26, 2021, "Systems And Methods For Commercial Inventory Mapping Including A Lidar-Based Virtual Map".
U.S. Appl. No. 17/241,036, filed Apr. 26, 2021, Marotta et al., "Systems And Methods For Commercial Inventory Mapping Including Determining If Goods Are Still Available".
U.S. Appl. No. 17/241,043, filed Apr. 26, 2021, Marotta et al., "Systems And Methods For 3d Generation Of A Floor Plan For A Commercial Building".
U.S. Appl. No. 17/241,053, filed Apr. 26, 2021, Marotta et al., "Systems And Methods For 3d Navigation Of An Interior Of A Building".
U.S. Appl. No. 62/888,771 Specification, filed Aug. 19, 2019. (Year: 2019).
Zhou et al., Seamless Fusion of LiDAR and Aerial Imagery for Building Extraction, IEEE Transactions on Geoscience and Remote Sensing, 52(11):7393-7407 (2014).
Ataer-Cansizoglu et al., Room Style Estimation for Style-Aware Recommendation, 2019 (Year: 2019).
Jiang et al., Learning Object Arrangements in 3D Scenes using Human Context, 2012 (Year: 2012).
Liu et al., Style Compatibility for 3D Furniture Models, 2015 (Year: 2015).
Wang et al., Deep Convolutional Priors for Indoor Scene Synthesis, 2018 (Year: 2018).
Liu et al., Style Compatibility for 3D Furniture Models, ACM Transactions on Graphics, 34(4): 85 (2015).

\* cited by examiner

SYSTEMS AND METHODS FOR A 3D HOME MODEL FOR REPRESENTATION OF PROPERTY

CROSS-REFERENCE TO RELATED APPLICATIONS

This application claims priority to U.S. patent application Ser. No. 17/240,985, entitled "Systems And Methods For A 3D Home Model For Representation Of Property" (filed Apr. 26, 2021); which claims benefit to U.S. Provisional Application No. 63/016,168, entitled "Systems and Methods for Light Detection and Ranging (LIDAR)" (filed Apr. 27, 2020); U.S. Provisional Application No. 63/025,600, entitled "Systems and Methods for Light Detection and Ranging (LIDAR)" (filed May 15, 2020); and U.S. Provisional Application No. 63/027,201, entitled "Systems and Methods for Light Detection and Ranging (LIDAR)" (filed May 19, 2020), the entirety of each of which is incorporated by reference herein.

FIELD

The present disclosure generally relates to light detection and ranging (LIDAR) technology and artificial intelligence (AI). More specifically, the following relates to LIDAR technology and AI based 3-dimensional (3D) models, navigation systems, and visualization systems.

BACKGROUND

LIDAR is a technology that measures distance to a target by illuminating the target (e.g., using laser light) and then measuring the reflected light with a sensor (e.g., measuring the time of flight from the laser signal source to its return to the sensor). Digital 3D representations of the target may then be made using differences in laser return times and wavelengths. LIDAR may be used to measure distances (e.g., the distance from a LIDAR camera to an object, the distance between objects, and so forth).

SUMMARY

The present embodiments may be related to LIDAR technology, and to AI. Broadly speaking, some embodiments relate to: (i) LIDAR technology based 3D home models for visualizing proposed changes to a home; (ii) LIDAR technology based 3D home models for representation of the home; (iii) LIDAR technology based viewing of objects to be placed in a building; (iv) AI based recommendations for placement of belongings in a residence; (v) LIDAR technology based visualization of landscape design; (vi) LIDAR technology based visualization of utility lines; (vii) LIDAR technology based commercial inventory mapping; (viii) LIDAR technology and AI based floor plan generation; and (ix) LIDAR technology and AI based visualization of directions to interior rooms.

In accordance with the described embodiments, the disclosure herein generally addresses, inter alia, systems and methods for visualizing proposed changes to a home. A server may receive light detection and ranging (LIDAR) data generated from a LIDAR camera, measure a plurality of dimensions of a room of the home based upon processor analysis of the LIDAR data, build a 3D model of the room based upon the measured plurality of dimensions, receive an indication of a proposed change to the room, modify the 3D model to include the proposed change to the room, and display a representation of the modified 3D model.

In one aspect, a computer-implemented method for visualizing proposed changes to a home may be provided. The computer-implemented method may include, via one or more local or remote processors, transceivers, sensors, and/or servers, (1) receiving light detection and ranging (LIDAR) data generated from a LIDAR camera; (2) measuring a plurality of dimensions of the home based upon processor analysis of the LIDAR data; (3) building a 3D model of the home based upon the measured plurality of dimensions; (4) receiving an indication of a proposed change to the; (5) modifying the 3D model to include the proposed change to the room; and/or (6) displaying a representation of the modified 3D model. The method may include additional, less, or alternate actions, including that discussed elsewhere herein.

Further in accordance with the described embodiments, the disclosure herein generally addresses, inter alia, systems and methods for representation of property. A server may receive light detection and ranging (LIDAR) data generated from a LIDAR camera, measure plurality of dimensions of the home based upon processor analysis of the LIDAR data, build a 3D model of the home based upon the measured plurality of dimensions, and display a representation of the 3D model by visually navigating through the 3D model.

In another aspect, a computer-implemented method for representation of property may be provided. The computer-implemented method may include, via one or more local or remote processors, transceivers, sensors, and/or servers, (1) receiving light detection and ranging (LIDAR) data generated from a LIDAR camera; (2) measuring a plurality of dimensions of the home based upon processor analysis of the LIDAR data; (3) building a 3D model of the home based upon the measured plurality of dimensions; and/or (4) displaying a representation of the 3D model by visually navigating through the 3D model. The method may include additional, less, or alternate actions, including that discussed elsewhere herein.

Further in accordance with the described embodiments, the disclosure herein generally addresses, inter alia, systems and methods for viewing potential placement of an object. A server may receive light detection and ranging (LIDAR) data generated from a LIDAR camera, measure a plurality of dimensions of the object based upon processor analysis of the LIDAR data, receive or generate a 3D model of a room, the 3D model of the room including dimensional data of the room, insert a representation of the object into the 3D model of the room based upon processor analysis of: (i) the plurality of dimensions of the object measured from the LIDAR data; and (ii) the dimensional data of the room, and display the 3D model of the room with the inserted representation of the object.

In another aspect, a computer-implemented method for viewing potential placement of an object may be provided. The computer-implemented method may include, via one or more local or remote processors, transceivers, sensors, and/or servers, (1) receiving light detection and ranging (LIDAR) data generated from a LIDAR camera; (2) measuring a plurality of dimensions of the object based upon processor analysis of the LIDAR data; (3) receiving or generating a 3D model of a room, the 3D model of the room including dimensional data of the room; (4) inserting a representation of the object into the 3D model of the room based upon processor analysis of: (i) the plurality of dimensions of the object measured from the LIDAR data; and (ii) the dimensional data of the room; and/or (5) displaying the 3D model of the room with the inserted representation of the object. The method may include additional, less, or alternate actions, including that discussed elsewhere herein.

Further in accordance with the described embodiments, the disclosure herein generally addresses, inter alia, systems and methods for machine learning based recommendation of object placement. A server may train a machine learning algorithm based upon preexisting data of object placement in a room, receive room data comprising dimensional data of a room, receive object data comprising: (i) dimensional data of an object; (ii) a type of the object; and/or (iii) color data of the object, and with the trained machine learning algorithm, generate a recommendation for placement of the object in the room based upon: (i) the received room data, and (ii) the received object data.

In another aspect, a computer-implemented method for machine learning based recommendation of object placement may be provided. The computer-implemented method may include, via one or more local or remote processors, transceivers, sensors, and/or servers, (1) training a machine learning algorithm based upon preexisting data of object placement in a room; (2) receiving room data comprising dimensional data of a room; (3) receiving object data comprising: (i) dimensional data of an object; (ii) a type of the object; and/or (iii) color data of the object; (4) and/or with the trained machine learning algorithm, generating a recommendation for placement of the object in the room based upon: (i) the received room data, and (ii) the received object data. The method may include additional, less, or alternate actions, including that discussed elsewhere herein.

Further in accordance with the described embodiments, the disclosure herein generally addresses, inter alia, systems and methods for visualization of landscape design. A server may receive light detection and ranging (LIDAR) data generated from a LIDAR camera, measure a plurality of dimensions of a landscape based upon processor analysis of the LIDAR data, build a 3D model of the landscape based upon the measured plurality of dimensions, the 3D model including: (i) a structure, and (ii) a vegetation, and display a representation of the 3D model.

In another aspect, a computer-implemented method for visualization of landscape design may be provided. The computer-implemented method may include, via one or more local or remote processors, transceivers, sensors, and/or servers, (1) receiving light detection and ranging (LIDAR) data generated from a LIDAR camera; (2) measuring a plurality of dimensions of a landscape based upon processor analysis of the LIDAR data; (3) building a 3D model of the landscape based upon the measured plurality of dimensions, the 3D model including: (i) a structure, and (ii) a vegetation; and/or (4) displaying a representation of the 3D model. The method may include additional, less, or alternate actions, including that discussed elsewhere herein.

Further in accordance with the described embodiments, the disclosure herein generally addresses, inter alia, systems and methods for visualization of a utility line. A server may receive light detection and ranging (LIDAR) data generated from a LIDAR camera, receive preexisting utility line data, and determine a location of the utility line based upon: (i) the received LIDAR data, and (ii) the received preexisting utility line data.

In another aspect, a computer-implemented method for visualization of a utility line may be provided. The computer-implemented method may include, via one or more local or remote processors, transceivers, sensors, and/or servers, (1) receiving light detection and ranging (LIDAR) data generated from a LIDAR camera; (2) receiving preexisting utility line data; and/or (3) determining a location of the utility line based upon: (i) the received LIDAR data, and (ii) the received preexisting utility line data. The method may include additional, less, or alternate actions, including that discussed elsewhere herein.

Further in accordance with the described embodiments, the disclosure herein generally addresses, inter alia, systems and methods for commercial inventory mapping. A server may receive light detection and ranging (LIDAR) data generated from a LIDAR camera, determine data of a first object based upon processor analysis of the LIDAR data, the data of the first object comprising: (i) dimensional data of the first object, and (ii) a type of the first object, and add the first object and the first object data to a commercial inventory list.

In another aspect, a computer-implemented method for commercial inventory mapping may be provided. The computer-implemented method may include, via one or more local or remote processors, transceivers, sensors, and/or servers, (1) receiving light detection and ranging (LIDAR) data generated from a LIDAR camera; (2) determining data of a first object based upon processor analysis of the LIDAR data, the data of the first object comprising: (i) dimensional data of the first object, and (ii) a type of the first object; and/or (3) adding the first object and the first object data to a commercial inventory list. The method may include additional, less, or alternate actions, including that discussed elsewhere herein.

Further in accordance with the described embodiments, the disclosure herein generally addresses, inter alia, systems and methods for commercial inventory mapping including a LIDAR-based virtual map. A server may receive light detection and ranging (LIDAR) data generated from a LIDAR camera via wireless communication or data transmission over one or more radio frequency links, the LIDAR data associated with a store or a store layout; generate a LIDAR-based virtual map of the store from processor analysis of the LIDAR data; determine locations of individual goods in the store; overlay the locations of the individual goods onto the LIDAR-based virtual map; and generate an updated LIDAR-based virtual map of the store displaying aisles of the store and the overlaid locations of the individual goods within the store.

In another aspect, a computer-implemented method for commercial inventory mapping including a LIDAR-based virtual map may be provided. The computer-implemented method may include, via one or more local or remote processors, transceivers, sensors, and/or servers, (1) receiving LIDAR data generated from a LIDAR camera, the LIDAR data associated with a store or a store layout; (2) generating a LIDAR-based virtual map of the store from processor analysis of the LIDAR data; (3) determining locations of individual goods in the store; (4) overlaying the locations of the individual goods onto the LIDAR-based virtual map; and (5) generating an updated LIDAR-based virtual map of the store displaying aisles of the store and the overlaid locations of the individual goods within the store.

Further in accordance with the described embodiments, the disclosure herein generally addresses, inter alia, systems and methods for commercial inventory mapping including determining if goods are still available. A server may receive sensor data via wireless communication or data transmission over one or more radio frequency links, the sensor data associated with item movement or purchase, the sensor data being generated from a good-mounted sensor, shelf-mounted sensor, a camera, or a self-check device; update an electronic inventory of goods within a store based upon the received sensor data associated with the item movement or purchase; receive an electronic order of goods from a customer mobile device via wireless communication or data transmission over one or more radio frequency links; determine if the goods in the electronic order received from the customer are still available by comparing the updated electronic inventory of goods with the electronic order of goods and/or comparing the electronic order of goods with other incoming electronic orders from other customers; generate a LIDAR-based virtual map of the store from processor analysis of LIDAR data; determine a location of the goods in the electronic order that are still available; overlay the determined location of the goods onto the LIDAR-based virtual map of the store; and generate and display an updated LIDAR-based virtual map of the store displaying aisles of the store and the determined location of the goods within the store.

In another aspect, a computer-implemented method for commercial inventory mapping including determining if goods are still available may be provided. The computer-implemented method may include, via one or more local or remote processors, sensors, servers, light detection and ranging (LIDAR) devices, and/or transceivers, (1) receiving sensor data via wireless communication or data transmission over one or more radio frequency links, the sensor data associated with item movement or purchase, the sensor data being generated from a good-mounted sensor, shelf-mounted sensor, a camera, or a self-check device; (2) updating an electronic inventory of goods within a store based upon the received sensor data associated with the item movement or purchase; (3) receiving an electronic order of goods from a customer mobile device via wireless communication or data transmission over one or more radio frequency links; (4) determining goods in the electronic order received from the customer that are still available by comparing the updated electronic inventory of goods with the electronic order of goods and/or comparing the electronic order of goods with other incoming electronic orders from other customers; (5) generating a LIDAR-based virtual map of the store from processor analysis of LIDAR data; (6) determining a location of the goods in the electronic order that are still available; (7) overlaying the determined location of the goods onto the LIDAR-based virtual map of the store; and (8) generating an updated LIDAR-based virtual map of the store displaying aisles of the store and the determined locations of the goods within the store.

Further in accordance with the described embodiments, the disclosure herein generally addresses, inter alia, systems and methods for 3D generation of a floor plan for a commercial building. A server may receive a 3-dimensional (3D) model of a floor of a commercial building comprising a plurality of dimensions of the floor of the commercial building, and with a machine learning algorithm, generate a new floor plan of the floor of the commercial building based upon the received 3D model of the floor. The generated new floor plan may be a 3D floor plan.

In another aspect, a computer-implemented method for 3D generation of a floor plan for a commercial building may be provided. The computer-implemented method may include, via one or more local or remote processors, transceivers, sensors, and/or servers, (1) receiving a 3-dimensional (3D) model of a floor of a commercial building comprising a plurality of dimensions of the floor of the commercial building; and/or (2) with a machine learning algorithm, generating a new floor plan of the floor of the commercial building based upon the received 3D model of the floor; wherein the generated new floor plan comprises a 3D floor plan. The method may include additional, less, or alternate actions, including that discussed elsewhere herein.

Further in accordance with the described embodiments, the disclosure herein generally addresses, inter alia, systems and methods for 3D navigation of an interior of a building. A server may receive a 3-dimensional (3D) model of the building, the 3D model comprising: (i) a plurality of dimensions of the interior of the building, and (ii) a location of a room and/or a location of a commercial item, receive, from a user, a request for navigation instructions to the room and/or the commercial item, calculate the navigation instructions based upon the received 3D model of the building, and provide, to the user, the calculated navigation instructions to the room and/or the commercial item.

In another aspect, a computer-implemented method for 3D navigation of an interior of a building may be provided. The computer-implemented method may include, via one or more local or remote processors, transceivers, sensors, and/or servers, (1) receiving a 3-dimensional (3D) model of the building, the 3D model comprising: (i) a plurality of dimensions of the interior of the building, and (ii) a location of a room and/or a location of a commercial item; (2) receiving, from a user, a request for navigation instructions to the room and/or the commercial item; (3) calculating the navigation instructions based upon the received 3D model of the building; and/or (4) providing, to the user, the calculated navigation instructions to the room and/or the commercial item. The method may include additional, less, or alternate actions, including that discussed elsewhere herein.

Advantages will become apparent to those skilled in the art from the following description. For example, in one aspect, the systems and methods disclosed herein advantageously produce a more accurate (i) 3D models, (ii) navigation systems, and (iii) visualization systems than prior systems. This is, in part, because of the higher accuracy that LIDAR technology provides in measuring dimensions, such as dimensions of objects, rooms, hallways, etc. In another aspect, a further advantage of the systems and methods described herein is to provide a company with a more accurate inventory, including specific locations of items. In yet another aspect, a further advantage of the systems and methods described herein is to allow a customer of a store to minimize time spent in the store. Further advantages will become apparent to those of ordinary skill in the art from the following description.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The Figures described below depict various aspects of the applications, methods, and systems disclosed herein. It should be understood that each Figure depicts an embodiment of a particular aspect of the disclosed applications, systems and methods, and that each of the Figures is intended to accord with a possible embodiment thereof. Furthermore, wherever possible, the following description refers to the reference numerals included in the following Figures, in which features depicted in multiple Figures are designated with consistent reference numerals.

DETAILED DESCRIPTION

The present embodiments relate to, inter alia: (i) LIDAR technology based 3D home models for visualizing proposed changes to a home; (ii) LIDAR technology based 3D home models for representation of the home; (iii) LIDAR technology based viewing of objects to be placed in a building; (iv) artificial intelligence (AI) based recommendations for placement of belongings in a residence; (v) LIDAR technology based visualization of landscape design; (vi) LIDAR technology based visualization of utility lines; (vii) LIDAR technology based commercial inventory mapping; (viii) LIDAR technology and AI based floor plan generation; and (ix) LIDAR technology and AI based visualization of directions to interior rooms.

LIDAR is a technology that measures distance to a target by illuminating the target (e.g., using laser light) and then measuring the reflected light with a sensor (e.g., measuring the time of flight from the laser signal source to its return to the sensor). Digital 3D representations of the target can then be made using differences in laser return times and wavelengths. LIDAR may be used to measure distances (e.g., the distance from a LIDAR camera to an object, the distance between objects, and so forth). Moreover, LIDAR is able to make more accurate measurements of dimensions of objects than previously known technologies.

In this respect, LIDAR may create a 3D point cloud model (e.g., a set of data points in space) of a room or landscape by measuring many points in the room or landscape. Furthermore, as is understood in the art, 3D point clouds may be converted to 3D surfaces (e.g., by using techniques such as Delaunay triangulation, alpha shapes, or ball pivoting to build a network of triangles over existing vertices of the point cloud).

Exemplary System for a 3D Home Model for Visualizing Proposed Changes to Home

Figure 1:
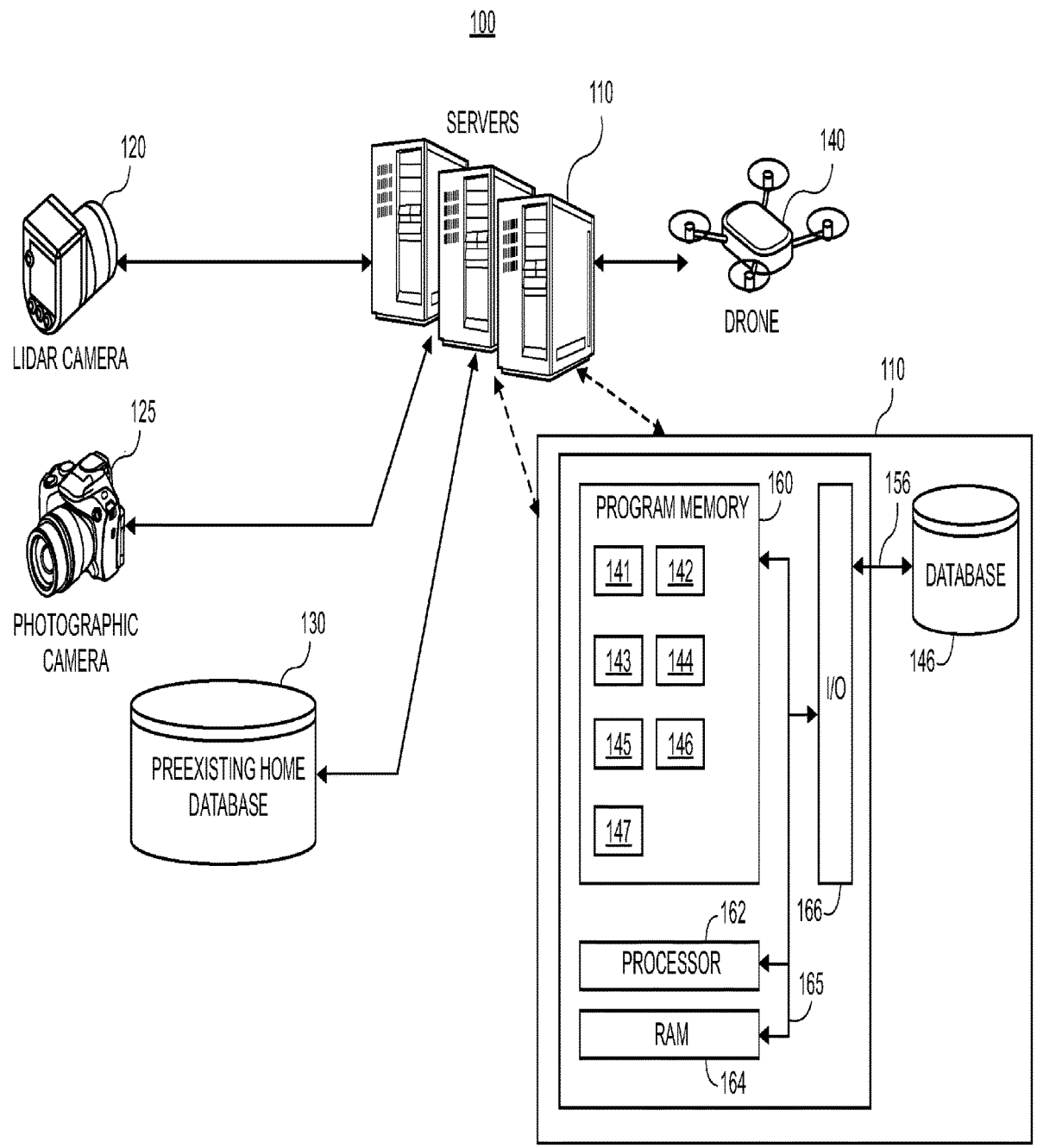
FIG. 1 shows an exemplary computer system for generating a 3D home model for visualizing proposed changes to the home.

FIG. 1 shows an exemplary computer system for generating a 3D home model for visualizing proposed changes to the home. With reference thereto, servers 110 are shown sending and receiving information with LIDAR camera 120. The gathered LIDAR data may be analyzed to determine the dimensions of a house, including dimensions of part or all of the interior and exterior of the house, as well as specific dimensions of any part of a room (e.g., the length, width, and/or height of a wall, or of an object in the room, etc.). The LIDAR data may be used to create a partial or complete home model, and/or a partial or complete room model. Furthermore, 3D point cloud(s) may be created from the LIDAR data. The LIDAR camera 120 may be operated by any human or machine.

In some embodiments, the LIDAR camera 120 may be operated by the homeowner. For instance, a home owner may be planning on remodeling a kitchen. In accordance with the techniques described herein, the homeowner may operate LIDAR camera 120 to generate data of the kitchen, which may be used to create a 3D model of the kitchen and further used to visualize proposed changes to the kitchen.

In some embodiments, the LIDAR camera 120 may be operated by a company employee. For instance, an employee of a kitchen remodeling company may bring a LIDAR camera to an individual's house, and use the LIDAR camera 120 to gather LIDAR data from the kitchen. The LIDAR data may then be used to create a 3D model of the kitchen, and visualize proposed changes to the kitchen.

The LIDAR data may be sent to the servers 110 by any method. For instance, the LIDAR data may be sent to the servers 110 directly from the LIDAR camera 120 via the internet. In another example, the LIDAR data may be transferred from the LIDAR camera 120 to a computer (via, e.g., a cable, a USB device, or any other means), and then sent from the computer to the servers 110 by any methods (e.g., sent by the internet, by Ethernet connection, or so forth).

The servers 110 also gather data from other sources. For instance, the servers 110 may gather data from photographic camera 125 (e.g., an optical instrument used for photography or to record images, etc.). In some embodiments, the camera 125 is a camera on an individual's smartphone. The camera data gathered by camera 125 includes color data, pixel data, and so forth.

Moreover, the servers 110 may also gather data from preexisting sources that have data on the home. For instance, data may be gathered from public records, property deeds, government records, realtors (e.g., from websites and apps that realtors post information to), websites (e.g., websites that display information of houses for sale), previous insurance claims, and so forth. In some embodiments, this data is gathered from preexisting home database 130. The database 130 may include structural data of the home.

The servers 110 also gather data from a drone 140. Such data may include data from a camera on the drone, a LIDAR camera on the drone, radio detection and ranging (RADAR) data gathered by the drone, global positioning system (GPS) data gathered by the drone, information from an infrared camera of the drone, and so forth.

Each server 110 may include one or more computer processors adapted and configured to execute various software applications and components of the system for a 3D home model for visualizing proposed changes 100, in addition to other software applications. The server 110 may further include a database 146, which may be adapted to store data related to the LIDAR camera 120, as well as any other data. The server 110 may access data stored in the database 146 when executing various functions and tasks associated with LIDAR technology and generating 3D home models along with proposed changes to the home.

Although the exemplary system 100 is illustrated to include one LIDAR camera 120, one drone 140, database 130, photographic camera 125 and one group of servers 110 (FIG. 1 is illustrated to show three servers 110, but it should be understood that the server(s) 110 may be one or more server(s)), it should be understood that different numbers of LIDAR camera 120, drone 140, database 130, photographic camera 125, and/or servers 110 may be utilized. For instance, the system 100 may include any number of servers 110 and hundreds of mobile LIDAR cameras 120 or drones 140. Furthermore, the database storage or processing performed by the one or more servers 110 may be distributed among a plurality of servers 110 in an arrangement known as "cloud computing." This configuration may provide various advantages, such as enabling near real-time uploads and downloads of information as well as periodic uploads and downloads of information.

The server 110 may have a controller 155 that is operatively connected to the database 146 via a link 156. It should be noted that, while not shown, additional databases may be linked to the controller 155 in a known manner. For instance, separate databases may be used for storing different types of information and/or making different calculations. The controller 155 may include a program memory 160, a processor 162 (which may be called a microcontroller or a microprocessor), a random-access memory (RAM) 164, and an input/output (I/O) circuit 166, all of which may be interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for instance.

The server 110 may further include a number of software applications stored in a program memory 160. The various software applications on the server 110 may include: a LIDAR data monitoring application 141 for receiving information from LIDAR camera 120; a drone data monitoring application 142 for monitoring drone data; a receiving preexisting house data application 143 for receiving preexisting data; camera data receiving application 144 for receiving camera data; a 3D model builder/modifier 145 for building and modifying a 3D model (e.g., of a home, room, object etc.); a display application 146 for displaying a representation of the 3D model; and a navigation input receiver 147 for receiving navigation input. The various software applications may be executed on the same computer processor or on different computer processors.

A machine learning algorithm may be used to analyze any or all of the data held by servers 110. The machine learning algorithm may be a supervised learning algorithm, employ decision trees, make use of an artificial neural network, make use of Bayesian statistical analysis, or combinations thereof. In this regard, a processor or a processing element may be trained using supervised or unsupervised machine learning, and the machine learning algorithm may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

It should be understood that, over time, the servers 110 may accumulate a large pool of data on an individual home or a group of homes.

The data described above may be used (e.g., with a machine learning algorithm described above or by any other technique) to generate a 3D home model for visualizing proposed changes to the home. The machine learning algorithm may be trained using previously known home data.

Figure 2:
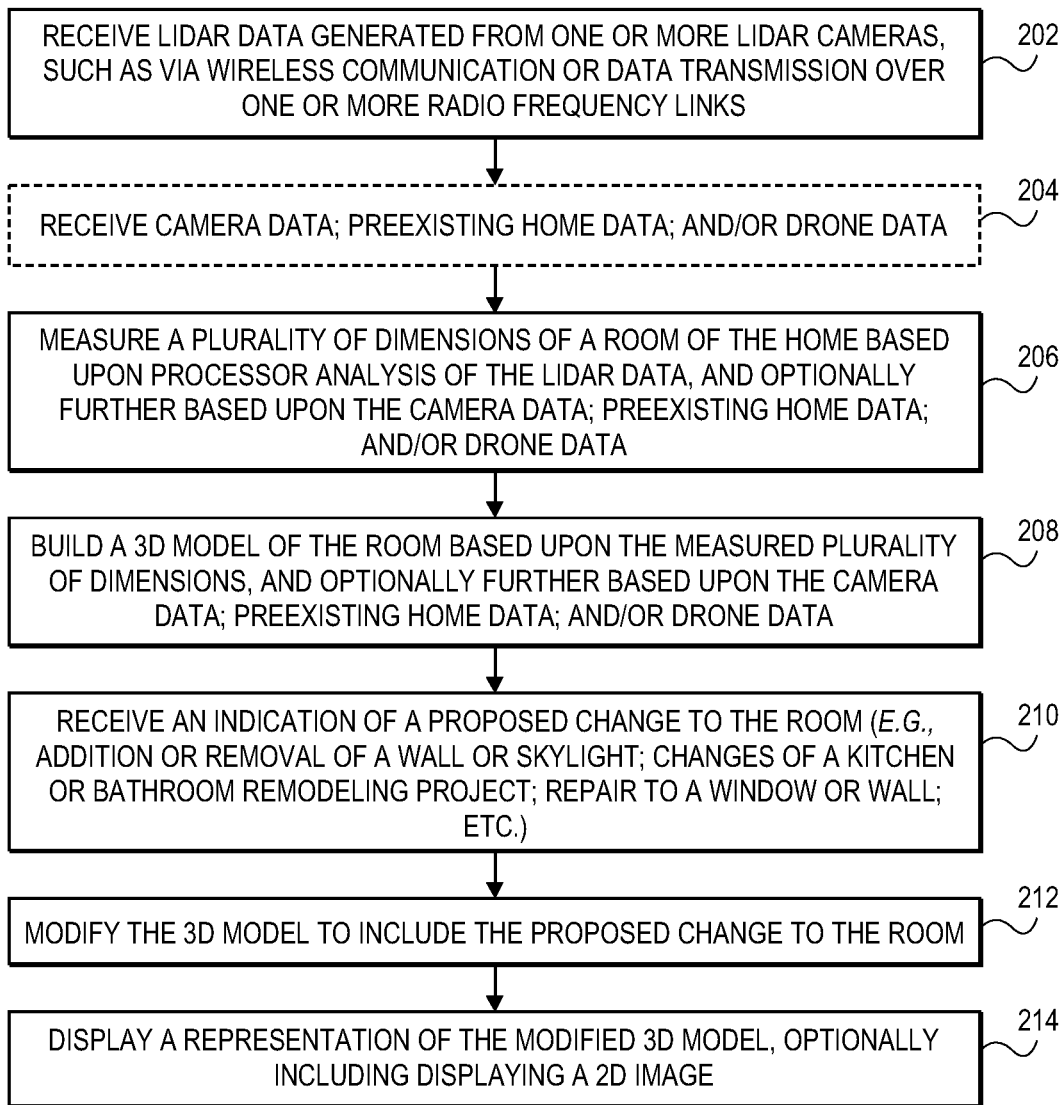
FIG. 2 shows a flowchart of an exemplary computer-implemented method of generating a 3D home model for visualizing proposed changes to home.

Exemplary Computer-Implemented Method of Generating a 3D Home Model for Visualizing Proposed Changes to Home FIG. 2 shows a flowchart of an exemplary computer-implemented method 200 of generating a 3D home model for visualizing proposed changes to home. With reference thereto, at step 202, LIDAR data (e.g., from LIDAR camera 120) is received, such as via wireless communication or data transmission over one or more radio frequency links, by server 110. In some embodiments, the LIDAR data is transferred to the servers 110 from the LIDAR camera 120 via a physical memory device.

At optional step 204, the server 110 receives any of: camera data from camera 125; preexisting home data from database 130; and/or drone data from drone 140. At step 206, the servers 110 measure a plurality of dimensions of a room of the home based upon processor analysis of the LIDAR data. In this respect, LIDAR data provides more accurate measurements than other measurement methods (e.g., measurement data from photographic camera data alone). The dimensions measured may include dimensions of any object and/or wall of a room.

At step 208, the servers 110 build a 3D model of the house or part of the house (e.g., one or more rooms, etc.) based upon the derived dimensions. The 3D model may further be based upon camera data from camera 125; preexisting home data from database 130; and/or drone data from drone 140. For instance, the model may include dimensional data of an object from the LIDAR data, and color data of the object from the camera data. In another aspect, structural data from database 130 may show where a beam needed for support is, and this may be depicted in the 3D model. For instance, the 3D model may show the wall with a cut out indicating where the necessary support beam; or, the necessary support beam may be indicated by a different color that contrasts it from the wall covering the necessary support beam. In another aspect, drone data (e.g., a LIDAR camera, a photographic camera, or any other data coming from a drone inside or outside of the building) may aide in building the 3D model. For instance, a drone flying exterior to the house may provide data verifying where a window or skylight is.

At step 210, the servers 110 receive an indication of a proposed change or repair to the room (e.g., addition or removal of a wall or skylight; changes of a kitchen or bathroom remodeling project; repair to a window or wall; etc.). For instance, in a kitchen remodel, the proposed change may suggest a different size or color of a countertop or cabinet. In a bathroom remodel, the proposed change may be, for instance, a different floor and/or wall tiles; a different shower or bathtub; a different mirror; etc. The servers 110 may also provide an estimated cost to make the change (e.g., an estimated cost of different cabinets or countertops viewed in the 3D model).

In another aspect the proposed change may be a proposed change for a repair. For instance, following a fire stemming from an electrical outlet, only part of the wall may be damaged (e.g., the part around the electrical outlet); here, the proposed change/repair may be to replace only part of the wall around the electrical outlet. Furthermore, the servers 110 may provide a cost estimate of making the repair (e.g., in the electrical outlet fire example, the cost would depend on how much of the wall was damaged).

At step 212, the 3D model is modified to include the proposed change to the room. At step 214, a representation of the modified 3D model is displayed. This may optionally comprise displaying a 2D image from the model. In some embodiments, the user may navigate through the 3D models using arrows (e.g., the user supplies navigational data to the servers 110 by clicking on the arrows of the 3D model).

Exemplary System for Generating a 3D Model for Representing a Home

Figure 3:
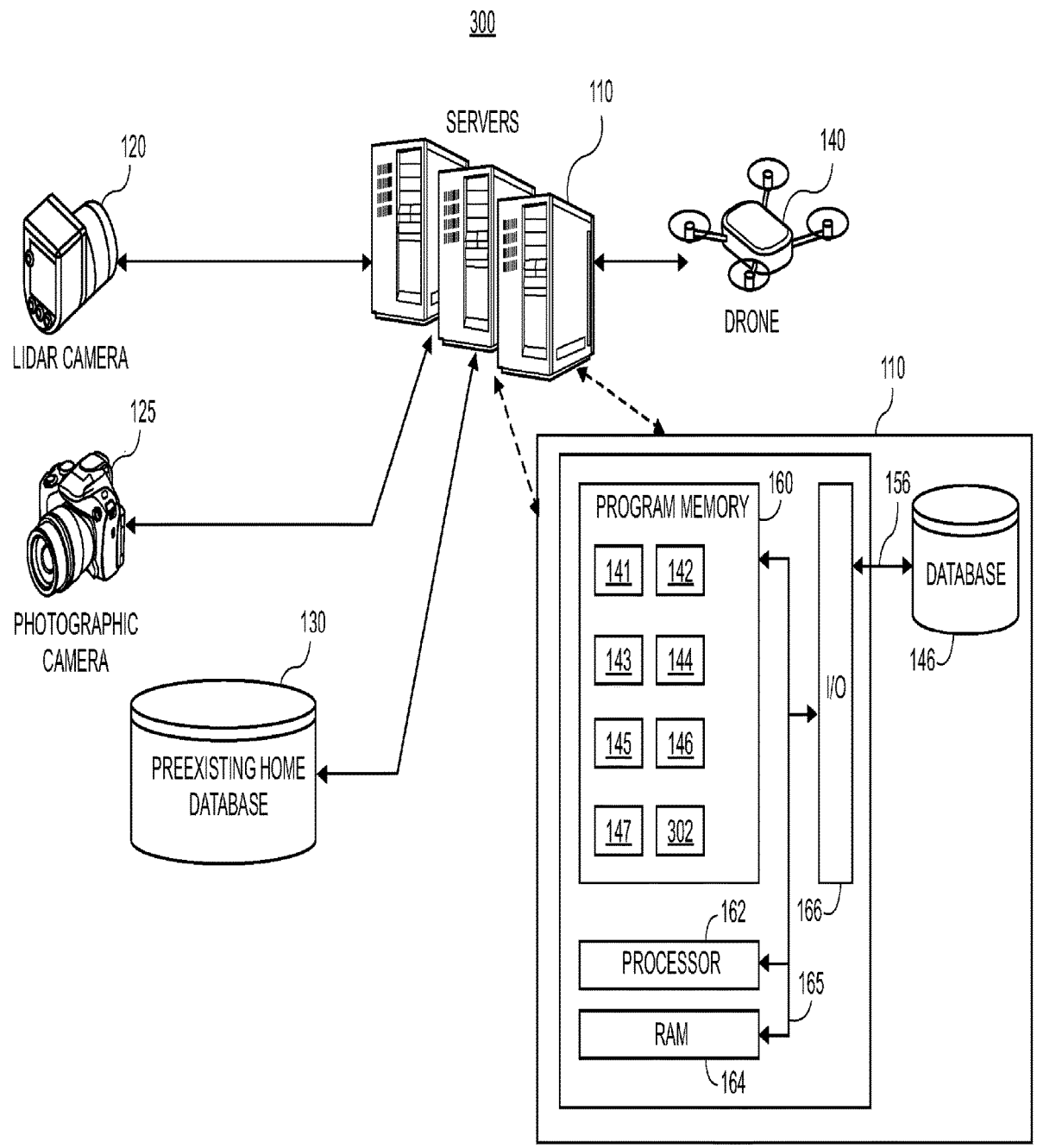
FIG. 3 shows an exemplary computer system for representation of a home.

FIG. 3 shows an exemplary computer system for generating a 3D home model for representing a home. With reference thereto, servers 110 are shown sending and receiving information with LIDAR camera 120. The gathered LIDAR data may be analyzed to determine the dimensions of a house, including dimensions of part or all of the interior and exterior of the house, as well as specific dimensions of any part of a room (e.g., the length, width, and/or height of a wall, or of an object in the room, etc.). The LIDAR data may be used to create a partial or complete home model, and may include 3D point cloud(s) created from the LIDAR data. The LIDAR camera 120 may be operated by any human or machine.

In some embodiments, the LIDAR camera 120 may be operated by the homeowner. For instance, a home owner may be planning to move, and thus may wish to market the home on online websites. In accordance with the techniques described herein, the homeowner may operate LIDAR camera 120 to generate data of the home, which may be used to create a 3D model of the home for online display.

In some embodiments, the LIDAR camera 120 may be operated by a real estate agent or a company employee (e.g., an employee of an online website for marketing houses). For instance, a real estate agent or a company employee may bring a LIDAR camera to an individual's house, and use the LIDAR camera 120 to gather LIDAR data from the home. The LIDAR data may then be used to create a 3D model of the home, and display the 3D model on an online website.

The LIDAR data may be sent to the servers 110 by any method. For instance, the LIDAR data may be sent to the servers 110 directly from the LIDAR camera 120 via the internet. In another example, the LIDAR data may be transferred from the LIDAR camera 120 to a computer (via, e.g., a cable, a USB device, or any other means), and then sent from the computer to the servers 110 by any methods (e.g., sent through the internet, sent by Ethernet connection, or so forth).

The servers 110 also gather data from other sources. For instance, the servers 110 may gather data from photographic camera 125 (e.g., an optical instrument used for photography or to record images, etc.). In some embodiments, the camera 125 is a camera on an individual's smartphone. The camera data gathered by camera 125 includes color data, pixel data, and so forth.

Moreover, the servers 110 may also gather data from preexisting sources that have data on the home. For instance, data may be gathered from public records, property deeds, government records, realtors (e.g., from websites and apps that realtors post information to), websites (e.g., websites that display information of houses for sale), previous insurance claims, and so forth. In some embodiments, this data is gathered from preexisting home database 130. The database 130 may also include structural data of the home.

The servers 110 also gather data from a drone 140. Such data may include data from a camera on the drone, a LIDAR camera on the drone, radio detection and ranging (RADAR) data gathered by the drone, global positioning system (GPS) data gathered by the drone, information from an infrared camera of the drone, and so forth.

Each server 110 may include one or more computer processors adapted and configured to execute various software applications and components of the system for a 3D home model for representation of a home 300, in addition to other software applications. The server 110 may further include a database 146, which may be adapted to store data related to the LIDAR camera 120, as well as any other data. The server 110 may access data stored in the database 146 when executing various functions and tasks associated with LIDAR technology and generating 3D home models along with proposed changes to the home.

Although the exemplary system 300 is illustrated to include one LIDAR camera 120, one drone 140, database 130, photographic camera 125, and one group of servers 110 (FIG. 3 is illustrated to show three servers 110, but it should be understood that the server(s) 110 may be one or more server(s)), it should be understood that different numbers of LIDAR camera 120, drone 140, database 130, photographic camera 125, and/or servers 110 may be utilized. For instance, the system 300 may include any number of servers 110 and hundreds of mobile LIDAR cameras 120 or drones 140. Furthermore, the database storage or processing performed by the one or more servers 110 may be distributed among a plurality of servers 110 in an arrangement known as "cloud computing." This configuration may provide various advantages, such as enabling near real-time uploads and downloads of information as well as periodic uploads and downloads of information.

The server 110 may have a controller 155 that is operatively connected to the database 146 via a link 156. It should be noted that, while not shown, additional databases may be linked to the controller 155 in a known manner. For instance, separate databases may be used for storing different types of information and/or making different calculations. The controller 155 may include a program memory 160, a processor 162 (which may be called a microcontroller or a microprocessor), a random-access memory (RAM) 164, and an input/output (I/O) circuit 166, all of which may be interconnected via an address/data bus 165.

It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for instance.

The server 110 may further include a number of software applications stored in a program memory 160. The various software applications on the server 110 may include: a LIDAR data monitoring application 141 for receiving information from LIDAR camera 120; a drone data monitoring application 142 for monitoring drone data; a receiving preexisting house data application 143 for receiving preexisting data; camera data receiving application 144 for receiving camera data; a 3D model builder/modifier 145 for building and modifying a 3D model (e.g., of a home, room, object etc.); a display application 146 for displaying a representation of the 3D model; a navigation input receiver 147 for receiving navigation input; and/or default navigation calculator 302 for calculating a default navigation through the 3D model. The various software applications may be executed on the same computer processor or on different computer processors.

A machine learning algorithm may be used to analyze any or all of the data held by servers 110. The machine learning algorithm may be a supervised learning algorithm, employ decision trees, make use of an artificial neural network, make use of Bayesian statistical analysis, or combinations thereof. In this regard, a processor or a processing element may be trained using supervised or unsupervised machine learning, and the machine learning algorithm may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

It should be understood that, over time, the servers 110 may accumulate a large pool of data on an individual home or a group of homes.

The data described above may be used (e.g., with a machine learning algorithm described above or by any other technique) to generate a 3D home model for representing the home. The machine learning algorithm may be trained using previously known data.

Figure 4A:
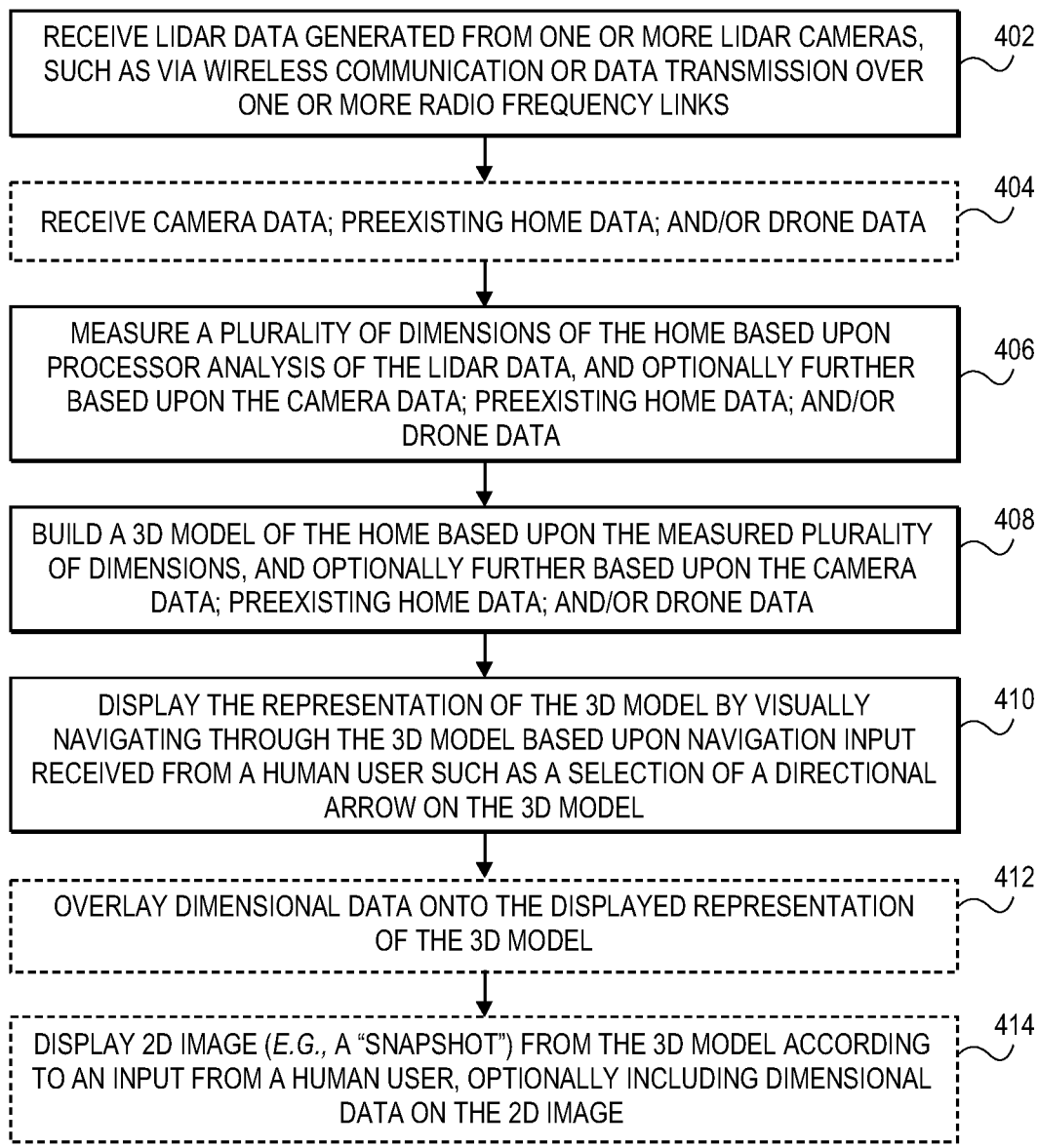
FIG. 4A shows a flowchart of an exemplary computer-implemented method for representation of a home, including navigating through a 3D model according to an input from a human user.

Exemplary Computer-Implemented Method of Generating a 3D Model for Representing a Home FIG. 4A shows a flowchart of an exemplary computer-implemented method 400A for representation of a home, including navigating through a 3D model according to an input from a human user. With reference thereto, at step 404, LIDAR data (e.g., from LIDAR camera 120) is received, such as via wireless communication or data transmission over one or more radio frequency links, by server 110. In some embodiments, the LIDAR data is transferred to the servers 110 from the LIDAR camera 120 via a physical memory device.

At optional step 404, the server 110 receives any of: camera data from camera 125; preexisting home data from database 130; and/or drone data from drone 140. At step 406, the servers 110 measure a plurality of dimensions of the home based upon processor analysis of the LIDAR data. In this respect, LIDAR data provides more accurate measurements than other measurement methods (e.g., measurement data from photographic camera data alone). The dimensions measured may include dimensions of any object and/or wall of a room.

At step 408, the servers 110 build a 3D model of the house or part of the house (e.g., one or more rooms, etc.) based upon the derived dimensions. The 3D model may further be based upon camera data from camera 125; preexisting home data from database 130; and/or drone data from drone 140. For instance, the model may include dimension data of an object from the LIDAR data, and color data of the object from the camera data.

In another aspect, structural data from database 130 may show where a beam needed for support is, and this may be depicted in the 3D model. For instance, the 3D model may show the wall with a cut out indicating where the necessary support beam is; or, the necessary support beam may be indicated by a different color that contrasts it from the wall covering the necessary support beam.

In another aspect, drone data (e.g., a LIDAR camera, a photographic camera, or any other data coming from a drone inside or outside of the building) may aide in building the 3D model. For instance, a drone flying exterior to the house may provide data verifying where a window or skylight is.

At step 410, the 3D model is displayed by visually navigating through the 3D model based upon navigation input received from a human user such as a selection of a directional arrow on the 3D model. In some embodiments, the human user input is received from 3D glasses of the human user.

At optional step 412, dimensional data, such as room dimensions or dimensions of an object in the room, is overlaid onto the displayed 3D model.

At optional step 414, a 2D image (e.g., a snapshot from the 3D model) is displayed. The 2D image may be displayed based upon a command from a human user. The displayed 2D image may include dimensional data, such as room dimensions or dimensions of an object in the room.

Figure 4B:
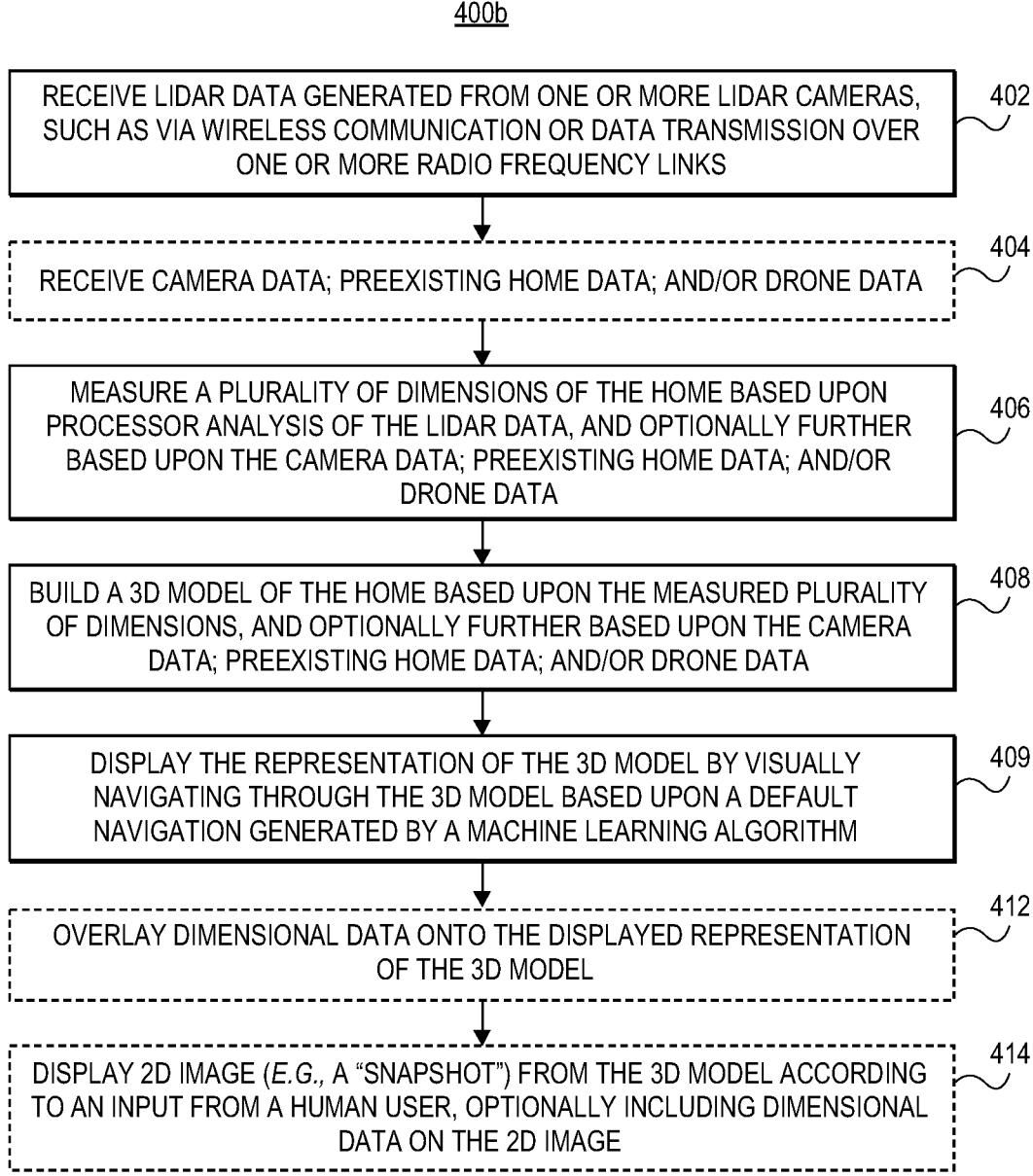
FIG. 4B shows a flowchart of an exemplary computer-implemented method for representation of a home, including navigating through a 3D model according to a default navigation generated by a machine learning program.

FIG. 4B shows a flowchart of an exemplary computer-implemented method 400B for representation of a home, including navigating through a 3D model according to a default navigation generated by a machine learning program. FIG. 4B is somewhat similar to FIG. 4A, except that step 410 from FIG. 4A is replaced by step 409. At step 409, the 3D model is displayed by visually navigating through the 3D model based upon a default navigation generated by a machine learning algorithm.

In some embodiments, the machine learning algorithm used to generate the default navigation may be a supervised learning algorithm, employ decision trees, make use of an artificial neural network, make use of Bayesian statistical analysis, or combinations thereof. In this regard, a processor or a processing element may be trained using supervised or unsupervised machine learning, and the machine learning algorithm may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

It should be noted that some known 3D models for representing a home comprise images placed on top of each other. Using LIDAR data for building a 3D model for representing a home advantageously improves on these known systems. For instance, LIDAR data provides more accurate dimensional data than the image data alone does.

Exemplary System for a 3D Model for Viewing Potential Placement of an Object

Figure 5:
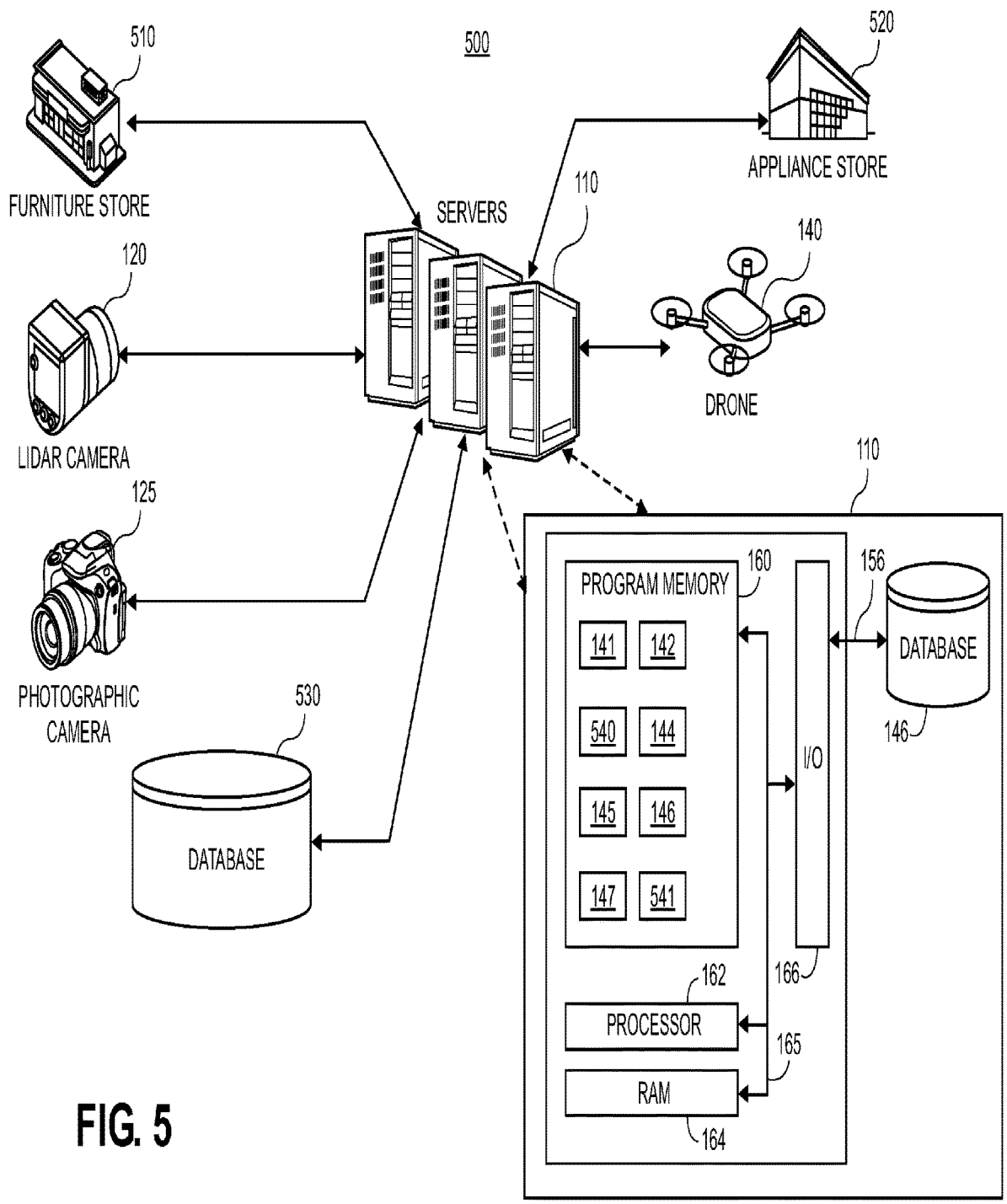
FIG. 5 shows an exemplary computer system for viewing potential placement of an object in a room.

FIG. 5 shows an exemplary computer system for viewing potential placement of an object in a room. With reference thereto, servers 110 are shown sending and receiving information with LIDAR camera 120. The gathered LIDAR data may be analyzed to determine the dimensions of an object (e.g., the length, width, and/or height of the object, etc.). The LIDAR data may be used to create a partial or complete 3D model of the object, and may include 3D point cloud(s) created from the LIDAR data. The LIDAR camera 120 may be operated by any human or machine.

In some embodiments, the LIDAR camera 120 may be operated by the owner of an object. For instance, an individual who is considering purchasing a house may wish to see how the furniture in her current house would look in the house she is considering purchasing. In accordance with the techniques described herein, the individual may operate the LIDAR camera 120 to generate LIDAR data of a piece of furniture of her current house. This LIDAR data may then be used to display a 3D model including the piece of furniture in a room of the house the individual is considering purchasing.

In some embodiments, the LIDAR camera 120 may be operated by a company employee. For instance, an employee of a furniture store (e.g., furniture store 510) may use the LIDAR camera to scan the furniture store's inventory. The LIDAR data may then be used to measure dimensional data of objects (e.g., pieces of furniture) of the store's inventory, which are then inserted into a 3D model of a room thereby allowing a customer of the furniture store to view an object in a room.

Somewhat analogously to the furniture store example, the LIDAR camera may be operated by an employee of appliance store 520 thus allowing customers of the appliance store 520 to view appliances in a 3D model of a room.

The LIDAR data may be sent to the servers 110 by any method. For instance, the LIDAR data may be sent to the servers 110 directly from the LIDAR camera 120 via the internet. In another example, the LIDAR data may be transferred from the LIDAR camera 120 to a computer (via, e.g., a cable, a USB device, or any other means), and then sent from the computer to the servers 110 by any methods (e.g., sent by the internet, by Ethernet connection, or so forth).

The servers 110 also gather data from other sources. For instance, the servers 110 may gather data from photographic camera 125 (e.g., an optical instrument used for photography or to record images, etc.). In some embodiments, the camera 125 is a camera on an individual's smartphone. The camera data gathered by camera 125 includes color data, pixel data, and so forth.

Moreover, the servers 110 may also gather data from preexisting sources that have data on homes, rooms, or objects. For instance, data may be gathered from public records, property deeds, government records, realtors (e.g., from websites and apps that realtors post information to), websites (e.g., websites that display information of houses for sale), previous insurance claims, and so forth. In some embodiments, this data is gathered from database 530. The database 530 may include 3D models of homes or rooms; or may include enough information about a home or room that the server 110 is able to construct a 3D model of the home or room from the information.

The servers 110 also gather data from a drone 140. Such data may include data from a camera on the drone, a LIDAR camera on the drone, radio detection and ranging (RADAR) data gathered by the drone, global positioning system (GPS) data gathered by the drone, information from an infrared camera of the drone, and so forth.

Each server 110 may include one or more computer processors adapted and configured to execute various software applications and components of the system for viewing potential placement of an object 500, in addition to other software applications. The server 110 may further include a database 146, which may be adapted to store data related to the LIDAR camera 120, as well as any other data. The server 110 may access data stored in the database 146 when executing various functions and tasks associated with LIDAR technology.

Although the exemplary system 500 is illustrated to include one LIDAR camera 120, one drone 140, and one group of servers 110 (FIG. 5 is illustrated to show three servers 110, but it should be understood that the server(s) 110 may be one or more server(s)), it should be understood that different numbers LIDAR camera 120, drone 140, servers 110 and/or any of the other elements shown in FIG. 5 may be utilized. For instance, the system 500 may include any number of servers 110 and hundreds of mobile LIDAR cameras 120 or drones 140.

Furthermore, the database storage or processing performed by the one or more servers 110 may be distributed among a plurality of servers 110 in an arrangement known as "cloud computing." This configuration may provide various advantages, such as enabling near real-time uploads and downloads of information as well as periodic uploads and downloads of information.

The server 110 may have a controller 155 that is operatively connected to the database 146 via a link 156. It should be noted that, while not shown, additional databases may be linked to the controller 155 in a known manner. For instance, separate databases may be used for storing different types of information and/or making different calculations. The controller 155 may include a program memory 160, a processor 162 (which may be called a microcontroller or a microprocessor), a random-access memory (RAM) 164, and an input/output (I/O) circuit 166, all of which may be interconnected via an address/data bus 165. It should be appreciated that although only one microprocessor 162 is shown, the controller 155 may include multiple microprocessors 162.

Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for instance.

The server 110 may further include a number of software applications stored in a program memory 160. The various software applications on the server 110 may include: a LIDAR data monitoring application 141 for receiving information from LIDAR camera 120; a drone data monitoring application 142 for monitoring drone data; a database application 540 for data from a database; camera data receiving application 144 for receiving camera data; a 3D model builder/modifier 145 for building and modifying a 3D model (e.g., of a home, room, object etc.); a display application 146 for displaying a representation of the 3D model; a navigation input receiver 147 for receiving navigation input; and/or object inserting application 541 for building and inserting a representation of an object into a 3D model. The various software applications may be executed on the same computer processor or on different computer processors.

A machine learning algorithm may be used to analyze any or all of the data held by servers 110. The machine learning algorithm may be a supervised learning algorithm, employ decision trees, make use of an artificial neural network, make use of Bayesian statistical analysis, or combinations thereof. In this regard, a processor or a processing element may be trained using supervised or unsupervised machine learning, and the machine learning algorithm may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

It should be understood that, over time, the servers 110 may accumulate a large pool of data on objects (e.g., furniture, appliances, etc.).

The data described above may be used (e.g., with a machine learning algorithm described above or by any other technique) to display a representation of the object on a 3D model. The machine learning algorithm may be trained using any previously known data.

Figure 6:
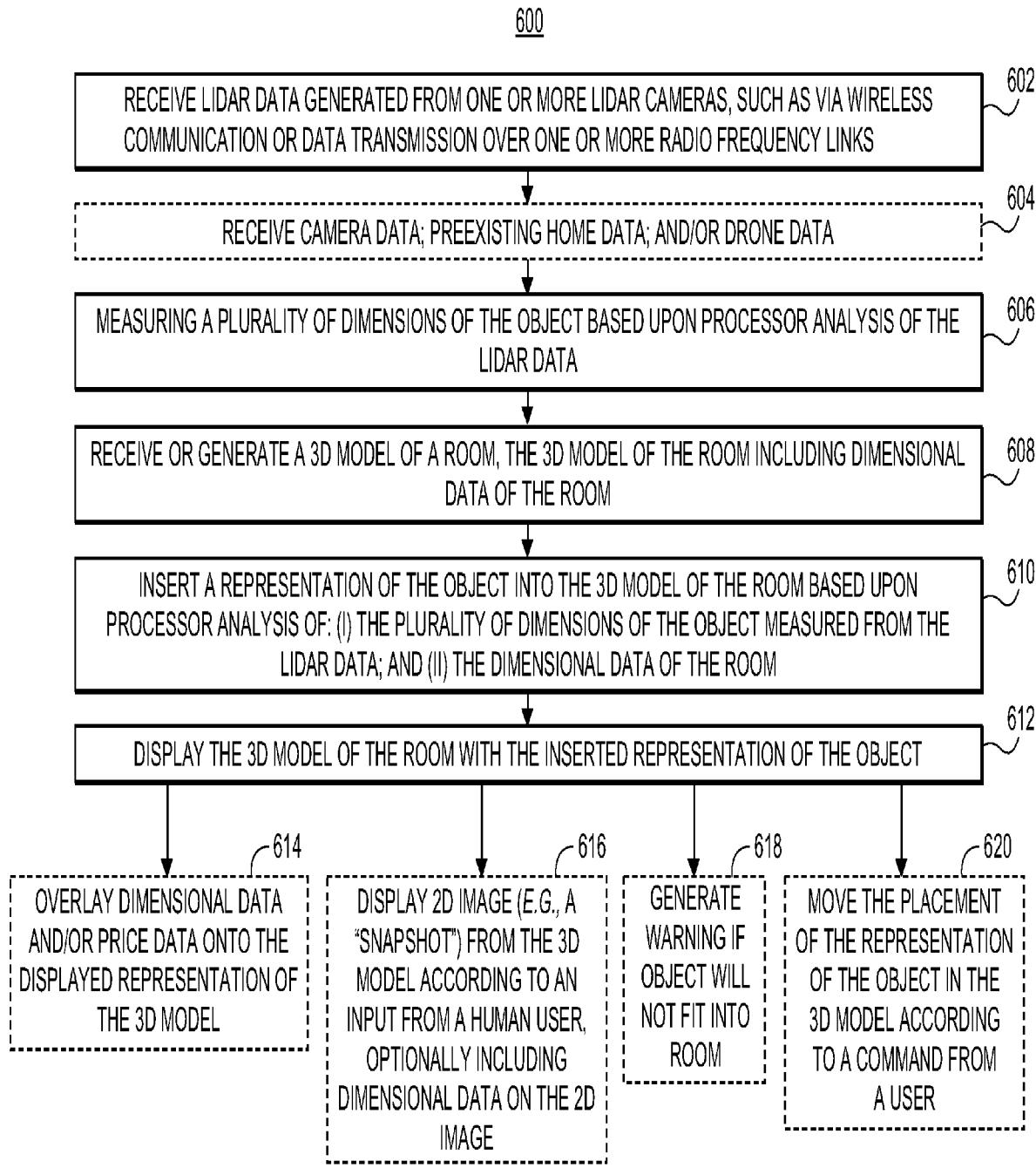
FIG. 6 shows a flowchart of an exemplary computer-implemented method for viewing potential placement of an object in a room.

Exemplary Computer-Implemented Method for Viewing Potential Placement of an Object FIG. 6 shows a flowchart of an exemplary computer-implemented method 600 for viewing potential placement of an object in a room. With reference thereto, at step 602, LIDAR data (e.g., from LIDAR camera 120) is received, such as via wireless communication or data transmission over one or more radio frequency links, by server 110. In some embodiments, the LIDAR data is transferred to the servers 110 from the LIDAR camera 120 via a physical memory device.

At optional step 604, the server 110 receives any of: camera data from camera 125; preexisting home data from database 530; and/or drone data from drone 140. At step 606, the servers 110 measure a plurality of dimensions of the object based upon processor analysis of the LIDAR data. In this respect, LIDAR data provides more accurate measurements than other measurement methods (e.g., measurement data from photographic camera data alone). The dimensions measured may include any dimensions of the object.

Exemplary objects include furniture such as chairs, couches, tables, desks and/or lamps. Further exemplary objects include appliances such as refrigerators, stoves, microwaves, dishwashers, air fryers, laundry machines, and/or dryers.

At step 608, the servers 110 receive or generate a 3D model of a room. The 3D model may include dimensional data of the room. The 3D model may be received from a database such as database 530, or received from any other source. Alternatively, the model may be generated by the servers 110 from information received from database 530, or received from any other source.

At step 610, a representation of the object is inserted into the 3D model of the room based upon processor analysis of: (i) the plurality of dimensions of the object measured from the LIDAR data; and (ii) the dimensional data of the room. The representation of the object may further be based upon camera data from camera 125; data from database 530; and/or drone data from drone 140. For instance, the model may include dimension data of an object from the LIDAR data, and color data and/or transparency data of the object from the camera data.

At step 612, a 3D model of the room is displayed with the inserted representation of the object. In some embodiments, the 3D model is displayed on a pair of computerized glasses.

At optional step 614, dimensional data, such as room dimensions or dimensions of an object in the room, is overlaid onto the displayed 3D model. For instance, the height and width of an object may be overlaid onto the representation of the object. Furthermore, price data of the object may also be overlaid onto the object.

At optional step 616, a 2D image (e.g., a snapshot from the 3D model) is displayed. The 2D image may be displayed based upon a command from a human user. The displayed 2D image may include dimensional data, such as room dimensions or dimensions of the object in the room.

At optional step 618, a warning is generated if the object will not fit into the room. For instance, based upon dimensional data of the 3D model of the room, the servers 110 may determine that a couch (e.g., the object) will not fit through the only doorway to the room, and thus cannot be placed inside the room. In another example, the servers 110 may determine that a refrigerator is taller than a ceiling of the room, and thus cannot be properly placed in the room.

In optional step 620, the representation of the object in the 3D model is moved according to a command from a human user.

It should be understood that steps of the exemplary process 500 may be repeated such that many objects are scanned with the LIDAR camera 120. Thus, in some embodiments, a user may be presented with a list of objects, and the user may make a selection from the list so that the system displays the selected object. In this regard, is desired, the user may go through the list of objects one by one. This list may also include prices of the objects.

Exemplary System for AI Based Recommendations for Object Placement in a Home

Figure 7:
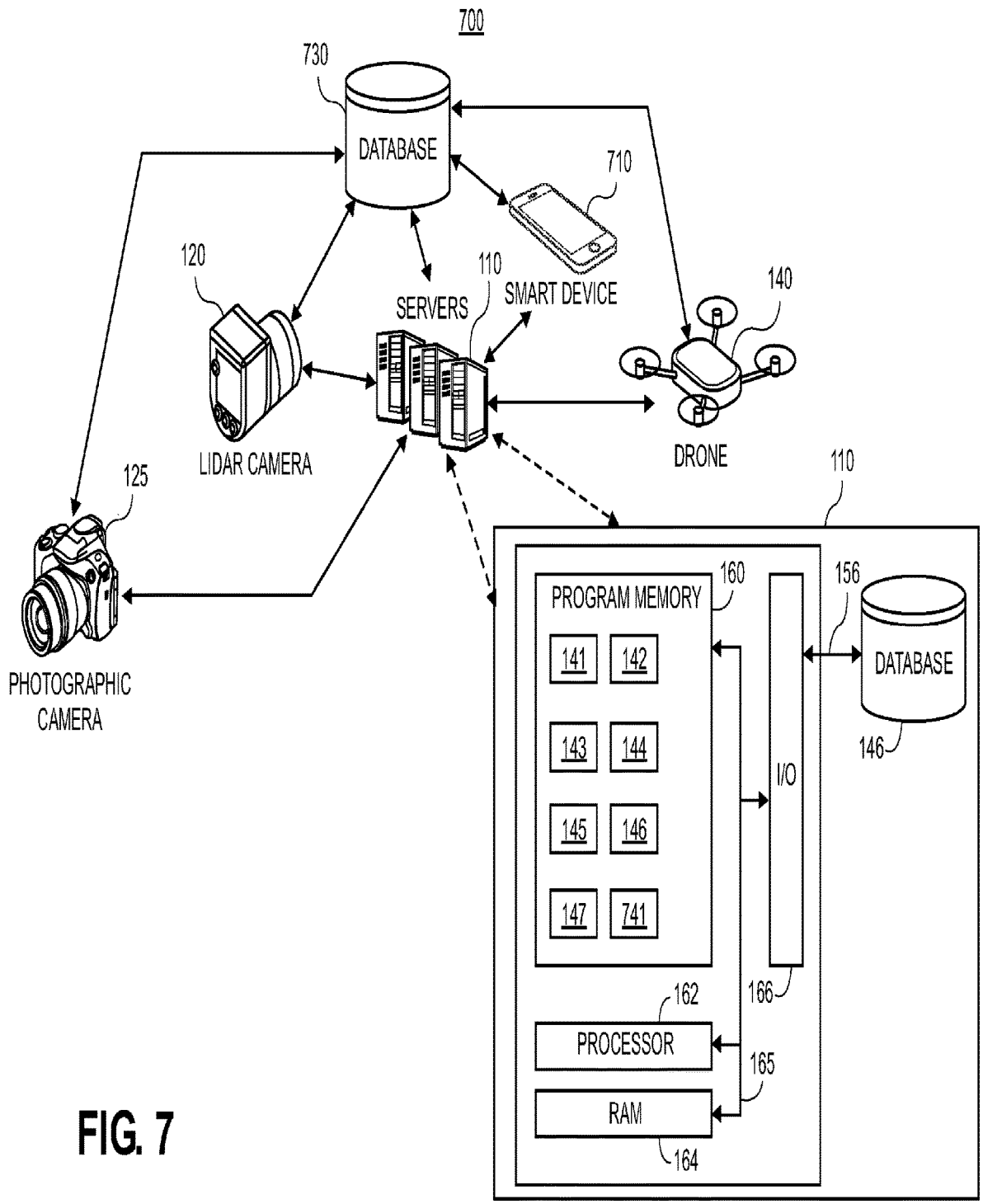
FIG. 7 shows an exemplary computer system for AI based recommendations for object placement in a home.

FIG. 7 shows an exemplary computer system for AI based recommendations for object placement in a home. With reference thereto, each server 110 may include one or more computer processors adapted and configured to execute various software applications and components of the system for AI based recommendations for object placement in a home. In particular, the server 110 may include virtual interior designer 741 (located, e.g., on program memory 160).

In some embodiments, the virtual interior designer 741 comprises a machine learning algorithm for recommending object placement in a home. Exemplary types of objects that the machine learning algorithm may provide a recommended placement for are: chairs, tables, desks, couches, lamps, bookshelves, pictures, paintings, etc. However, the machine learning algorithm may provide a recommendation for placement of any kind of object.

The machine learning algorithm may be trained using preexisting data (e.g., from database 730, or database 146, etc.). The preexisting data may include data of object placement in rooms. In some embodiments, this preexisting data is generated from analysis of home and/or reality websites (e.g., online websites used to advertise houses for sale). In some embodiments, the preexisting data may be generated from smart devices 710 of homeowners (e.g., smartphones, security cameras, etc.). In some embodiments, the preexisting data may be generated by LIDAR camera 120, photographic camera 125, and/or drone 140.

The machine learning algorithm may be used to analyze any or all of the data held by servers 110 and/or database 730. The machine learning algorithm may be a supervised learning algorithm, employ decision trees, make use of an artificial neural network, make use of Bayesian statistical analysis, or combinations thereof. In this regard, a processor or a processing element may be trained using supervised or unsupervised machine learning, and the machine learning algorithm may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs. In some embodiments, the machine learning algorithm is a convolutional neural network (CNN); in some embodiments, the machine learning algorithm is a deep neural network (DNN); in some embodiments, the machine learning algorithm is a recurrent neural network (RNN). It is advantageous to use machine learning algorithms that are particularly adept at finding patterns (e.g., CNNs).

Although the exemplary system 700 is illustrated to include one LIDAR camera 120, one drone 140, and one group of servers 110 (FIG. 7 is illustrated to show three servers 110, but it should be understood that the server(s) 110 may be one or more server(s)), it should be understood that different numbers LIDAR camera 120, drone 140, servers 110, and/or any of the other elements shown in FIG. 7 may be utilized. For instance, the system 700 may include any number of servers 110 and hundreds of mobile LIDAR cameras 120 or drones 140.

Furthermore, the database storage or processing performed by the one or more servers 110 may be distributed among a plurality of servers 110 in an arrangement known as "cloud computing." This configuration may provide various advantages, such as enabling near real-time uploads and downloads of information as well as periodic uploads and downloads of information.

The server 110 may have a controller 155 that is operatively connected to the database 146 via a link 156. It should be noted that, while not shown, additional databases may be linked to the controller 155 in a known manner. For instance, separate databases may be used for storing different types of information and/or making different calculations. The controller 155 may include a program memory 160, a processor 162 (which may be called a microcontroller or a microprocessor), a random-access memory (RAM) 164, and an input/output (I/O) circuit 166, all of which may be interconnected via an address/data bus 165. It should be appreciated that although only one microprocessor 162 is shown, the controller 155 may include multiple microprocessors 162.

Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for instance.

The server 110 may further include a number of software applications stored in a program memory 160. The various software applications on the server 110 may include: a LIDAR data monitoring application 141 for receiving information from LIDAR camera 120; a drone data monitoring application 142 for monitoring drone data; a receiving preexisting house data application 143 for receiving preexisting data; camera data receiving application 144 for receiving camera data; a 3D model builder/modifier 145 for building and modifying a 3D model (e.g., of a home, room, object etc.); a display application 146 for displaying a representation of the 3D model; a navigation input receiver 147 for receiving navigation input; and/or the virtual interior designer 741 for generating a recommendation of an object placement. The various software applications may be executed on the same computer processor or on different computer processors.

Furthermore, in the exemplary system of FIG. 7, the servers 110 are shown sending and receiving information with LIDAR camera 120. The gathered LIDAR data may be analyzed to determine the dimensions of an object (e.g., length, width, height, curvature, etc.).

The LIDAR data may also be used to determine the dimensions of a house, including dimensions of part or all of the interior and exterior of the house, as well as specific dimensions of any part of a room (e.g., the length, width, and/or height of a wall, or of an object in the room, etc.). The LIDAR data may be used to create a partial or complete home model, and/or a partial or complete room model. Furthermore, 3D point cloud(s) may be created from the LIDAR data. The LIDAR camera 120 may be operated by any human or machine.

In some embodiments, the LIDAR camera 120 may be operated by the owner of an object. For instance, the owner of a bookshelf may wish to be provided with a recommendation for placement of the bookshelf in a certain room. In accordance with the techniques described herein, the bookshelf owner may use the LIDAR camera 120 to obtain information of the bookshelf and/or the room that it is desired to place the bookshelf in. A machine learning algorithm may then use this information to provide a recommendation for placement of the bookshelf.

The LIDAR data may be sent to the servers 110 by any method. For instance, the LIDAR data may be sent to the servers 110 directly from the LIDAR camera 120 via the internet. In another example, the LIDAR data may be transferred from the LIDAR camera 120 to a computer (via, e.g., a cable, a USB device, or any other means), and then sent from the computer to the servers 110 by any methods (e.g., sent by the internet, by Ethernet connection, or so forth).

The servers 110 also gather data from other sources. For instance, the servers 110 may gather data from photographic camera 125 (e.g., an optical instrument used for photography or to record images, etc.). In some embodiments, the camera 125 is a camera on an individual's smartphone. The camera data gathered by camera 125 includes color data, pixel data, and so forth.

Moreover, the servers 110 may also gather data from preexisting sources that have data on the home. For instance, data may be gathered from public records, property deeds, government records, realtors (e.g., from websites and apps that realtors post information to), websites (e.g., websites that display information of houses for sale), previous insurance claims, and so forth. In some embodiments, this data is gathered from preexisting home database 730. In some embodiments, the database 730 may include structural data of the home.

The servers 110 also gather data from a drone 140. Such data may include data from a camera on the drone, a LIDAR camera on the drone, radio detection and ranging (RADAR) data gathered by the drone, global positioning system (GPS) data gathered by the drone, information from an infrared camera of the drone, and so forth.

Figure 8:
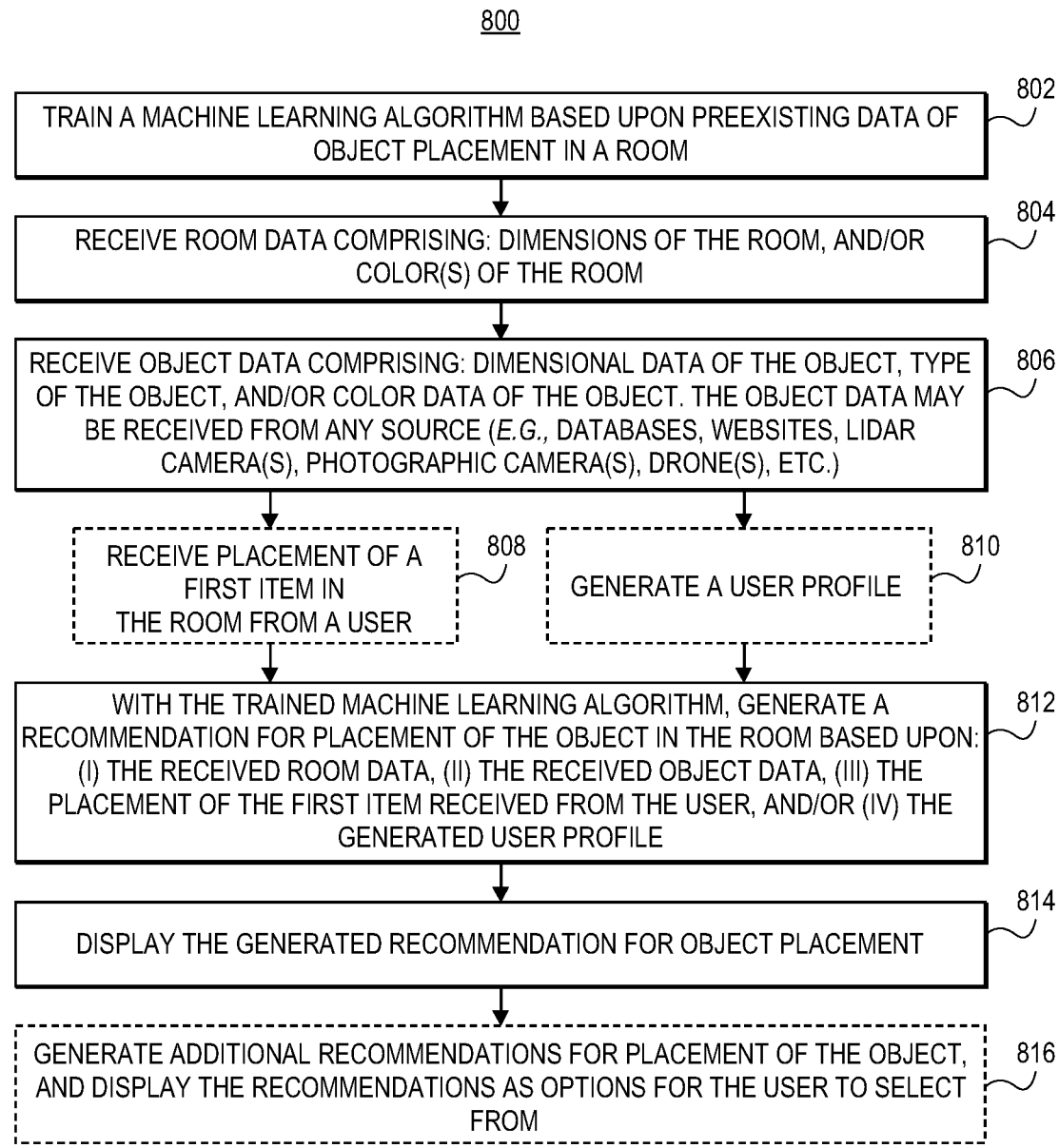
FIG. 8 shows a flowchart of an exemplary computer-implemented method for AI based recommendations for object placement in a home.

Exemplary Computer-Implemented Method for AI Based Recommendations for Object Placement in a Home FIG. 8 shows a flowchart of an exemplary computer-implemented method 800 for AI based recommendations for object placement in a home. With reference thereto, at step 802, a machine learning algorithm, such as a CNN, DNN, or RNN, is trained. The machine learning algorithm may be trained based upon any data, such as data of object placement in a room. This data may be gathered from, for example, database 730 and/or database 146.

At step 804, the system receives room data. The room data may comprise dimensional data of the room (e.g., length, width, and/or height of the room), color data of the room, and other data of the room (e.g., window, door, and/or skylight placement in the room; etc.).

At step 806, object data is received. The object data may comprise: dimensional data of the object, type of the object, and/or color data of the object, etc. The object data may be received from any source(s) (e.g., databases, websites, LIDAR camera(s), photographic camera(s), drone(s), etc.). In some embodiments, dimensional data of an object may be received from a LIDAR camera(s), and color data of the object may be received from photographic camera(s). In this regard, in some embodiments, the object may be a painting or photograph, and the color data of the painting or photograph may be from a photographic camera, and the dimensional data of the photograph may be from a LIDAR camera.

At optional step 808, a user sends, to the system, a placement of a first item in the room. The system may optionally (e.g., at step 812) use this placement of the first item in the room as part of determining the recommendation for the object placement. For instance, a user may look at an empty room, which she intends to set up a desk (e.g., the "first item") and a bookshelf (e.g., the "object") in; the user may know that she intends to place the desk in a particular corner of the room, but would like to consult the program on where to place the bookshelf; thus, the user may enter, into the system, the intended placement of the desk, and the system may then consider the desk placement when providing a recommendation for placement of the bookshelf.

At optional step 810, the system generates a user profile. The profile may be generated based upon any information of the user. For instance, the user profile may be based upon a placement of objects in the user's current house; in some embodiments, the user may send photographs (e.g., through an app or website) of the users current house to the system so that the system may determine the object placement in the user's current house. Additionally or alternatively, in some embodiments, the user profile may be based upon a survey given by the system to the user; the survey may be given in the form of displaying object placements in a room, and receiving selections of preferred object placements from the user.

At step 812, using the trained machine learning algorithm, the system generates a recommendation for placement of the object in the room based upon: (i) the received room data, (ii) the received object data, (iii) the placement of the first item received from the user, and/or (iv) the generated user profile. At step 814, the recommendation for placement of the object is displayed on a display device.

At optional step 816, the system generates additional recommendations (e.g., based upon: (i) the received room data, (ii) the received object data, (iii) the placement of the first item received from the user, and/or (iv) the generated user profile), and displays the recommendations as options for the user to select from.

Exemplary System for Visualization of Landscape Design

Figure 9:
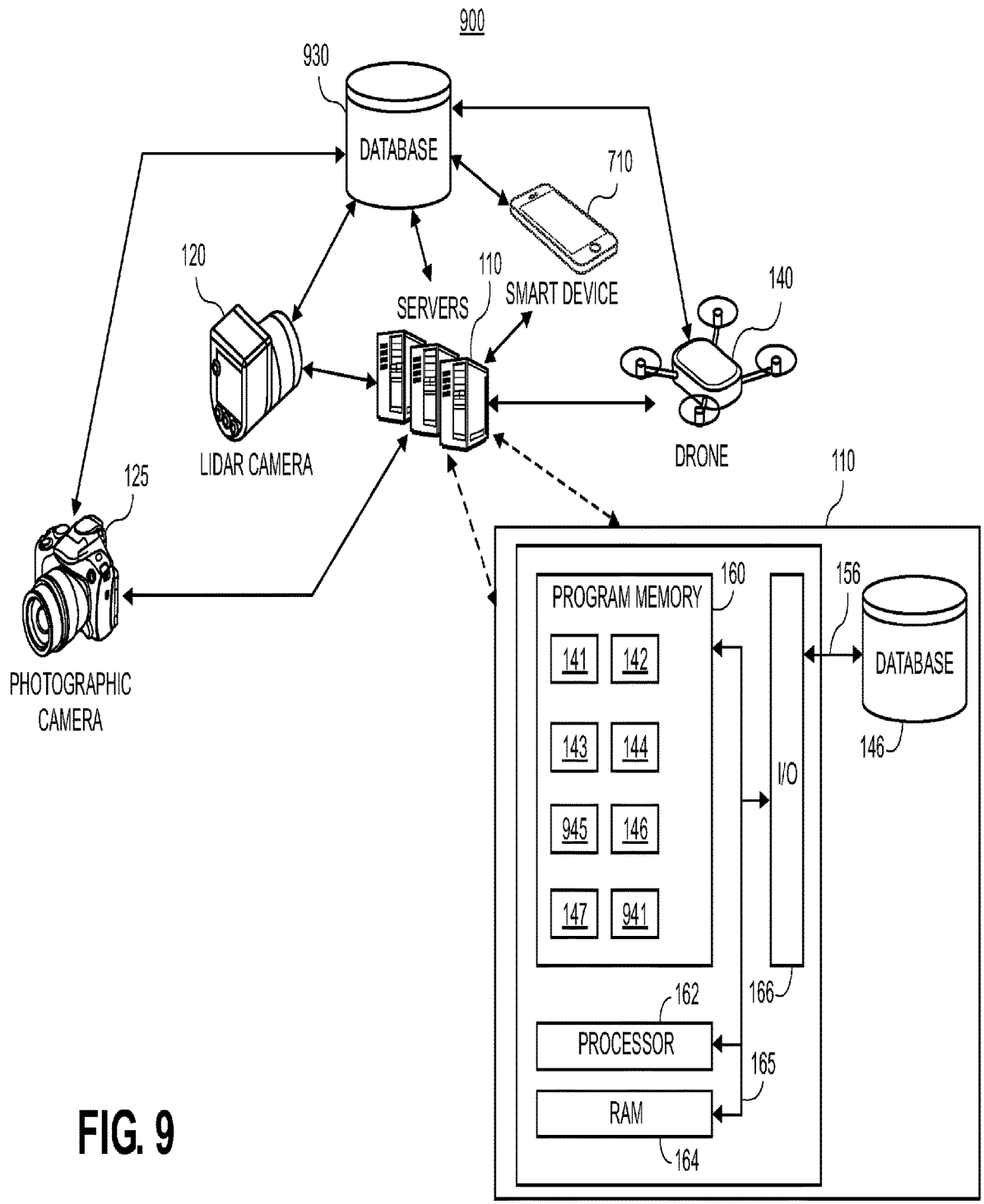
FIG. 9 shows an exemplary computer system for visualization of landscape design.

FIG. 9 shows an exemplary computer system for visualization of landscape design. With reference thereto, servers 110 are shown sending and receiving information with LIDAR camera 120. The gathered LIDAR data may be analyzed to determine the dimensions of a landscape, such as the dimensions of a landscape surrounding a house, as well as any objects in the landscape. The LIDAR data may be used to create a partial or complete landscape model. Furthermore, 3D point cloud(s) may be created from the LIDAR data.

The LIDAR camera 120 may be operated by any human or machine. In some embodiments, the LIDAR camera 120 may be operated by a homeowner. For instance, a home owner may wish to sell his home. In accordance with the techniques described herein, the homeowner may operate LIDAR camera 120 to generate data of the landscape, which may be used to create a 3D model of the landscape and further used to visualize the landscape (e.g., for advertisement on a real estate website). Additionally or alternatively, the system may provide the homeowner with a recommendation for placement of an object in the landscape.

In some embodiments, the LIDAR camera 120 may be operated by a real estate agent or a company employee (e.g., an employee of an online website for marketing houses). For instance, a real estate agent or a company employee may bring a LIDAR camera to an individual's property, and use the LIDAR camera 120 to gather LIDAR data from the landscape and/or home on the landscape. The LIDAR data may then be used to create a 3D model of the landscape, and display the 3D model on an online website.

The LIDAR data may be sent to the servers 110 by any method. For instance, the LIDAR data may be sent to the servers 110 directly from the LIDAR camera 120 via the internet. In another example, the LIDAR data may be transferred from the LIDAR camera 120 to a computer (via, e.g., a cable, a USB device, or any other means), and then sent from the computer to the servers 110 by any methods (e.g., sent by the internet, by Ethernet connection, or so forth).

The servers 110 also gather data from other sources. For instance, the servers 110 may gather data from photographic camera 125 (e.g., an optical instrument used for photography or to record images, etc.). In some embodiments, the camera 125 is a camera on an individual's smartphone. The camera data gathered by camera 125 includes color data, pixel data, and so forth.

The servers 110 also gather data from a drone 140. Such data may include data from a camera on the drone, a LIDAR camera on the drone, radio detection and ranging (RADAR) data gathered by the drone, global positioning system (GPS) data gathered by the drone, information from an infrared camera of the drone, and so forth.

Moreover, the servers 110 may also gather data from preexisting sources that have data on the landscape and/or home. For instance, data may be gathered from public records, property deeds, government records, realtors (e.g., from websites and apps that realtors post information to), websites (e.g., websites that display information of houses for sale), previous insurance claims, and so forth. In some embodiments, this data is gathered from database 930. In some embodiments, the database 930 may also include structural data of the home.

Although the exemplary system 900 is illustrated to include one LIDAR camera 120, one drone 140, and one group of servers 110 (FIG. 9 is illustrated to show three servers 110, but it should be understood that the server(s) 110 may be one or more server(s)), it should be understood that different numbers LIDAR camera 120, drone 140, servers 110, and/or any of the other elements shown in FIG. 9 may be utilized. For instance, the system 900 may include any number of servers 110 and hundreds of mobile LIDAR cameras 120 or drones 140.

Furthermore, the database storage or processing performed by the one or more servers 110 may be distributed among a plurality of servers 110 in an arrangement known as "cloud computing." This configuration may provide various advantages, such as enabling near real-time uploads and downloads of information as well as periodic uploads and downloads of information.

The server 110 may have a controller 155 that is operatively connected to the database 146 via a link 156. It should be noted that, while not shown, additional databases may be linked to the controller 155 in a known manner. For instance, separate databases may be used for storing different types of information and/or making different calculations. The controller 155 may include a program memory 160, a processor 162 (which may be called a microcontroller or a microprocessor), a random-access memory (RAM) 164, and an input/output (I/O) circuit 166, all of which may be interconnected via an address/data bus 165. It should be appreciated that although only one microprocessor 162 is shown, the controller 155 may include multiple microprocessors 162.

Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for instance.

The server 110 may further include a number of software applications stored in a program memory 160. The various software applications on the server 110 may include: a LIDAR data monitoring application 141 for receiving information from LIDAR camera 120; a drone data monitoring application 142 for monitoring drone data; a receiving preexisting house data application 143 for receiving preexisting data; camera data receiving application 144 for receiving camera data; a 3D model builder/modifier 945 for building and modifying a 3D model (e.g., of a landscape); a display application 146 for displaying a representation of the 3D model; a navigation input receiver 147 for receiving navigation input; and a landscape designer 941 for generating a recommendation of an object placement. The various software applications may be executed on the same computer processor or on different computer processors.

In some embodiments, the landscape designer 941 comprises a machine learning algorithm for recommending object placement on a landscape. Exemplary types of objects that the machine learning algorithm may provide a recommended placement for are: patios, sheds, garages, fences, trees, plants, flowers, and/or pathways, etc. However, the machine learning algorithm may provide a recommendation for placement of any kind of object.

The machine learning algorithm may be trained using preexisting data (e.g., from database 930, or database 146, etc.). The preexisting data may include data of object placement in landscapes (e.g., from images). In some embodiments, the preexisting data is generated from images of landscapes found on landscaping websites. Additionally or alternatively, this preexisting data is generated from analysis of home and/or reality websites (e.g., online websites used to advertise houses for sale). In some embodiments, the preexisting data may be generated from smart devices 710 of homeowners (e.g., smartphones, security cameras, etc.). In some embodiments, the preexisting data may be generated by LIDAR camera 120, photographic camera 125, and/or drone 140.

The machine learning algorithm may be used to analyze any or all of the data held by servers 110 and/or database 930. The machine learning algorithm may be a supervised learning algorithm, employ decision trees, make use of an artificial neural network, make use of Bayesian statistical analysis, or combinations thereof. In this regard, a processor or a processing element may be trained using supervised or unsupervised machine learning, and the machine learning algorithm may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs. In some embodiments, the machine learning algorithm is a convolutional neural network (CNN); in some embodiments, the machine learning algorithm is a deep neural network (DNN); in some embodiments, the machine learning algorithm is a recurrent neural network (RNN). It is advantageous to use machine learning algorithms that are particularly adept at finding patterns (e.g., CNNs).

Exemplary Computer-Implemented Method for Visualization of Landscape Design

Figure 10:
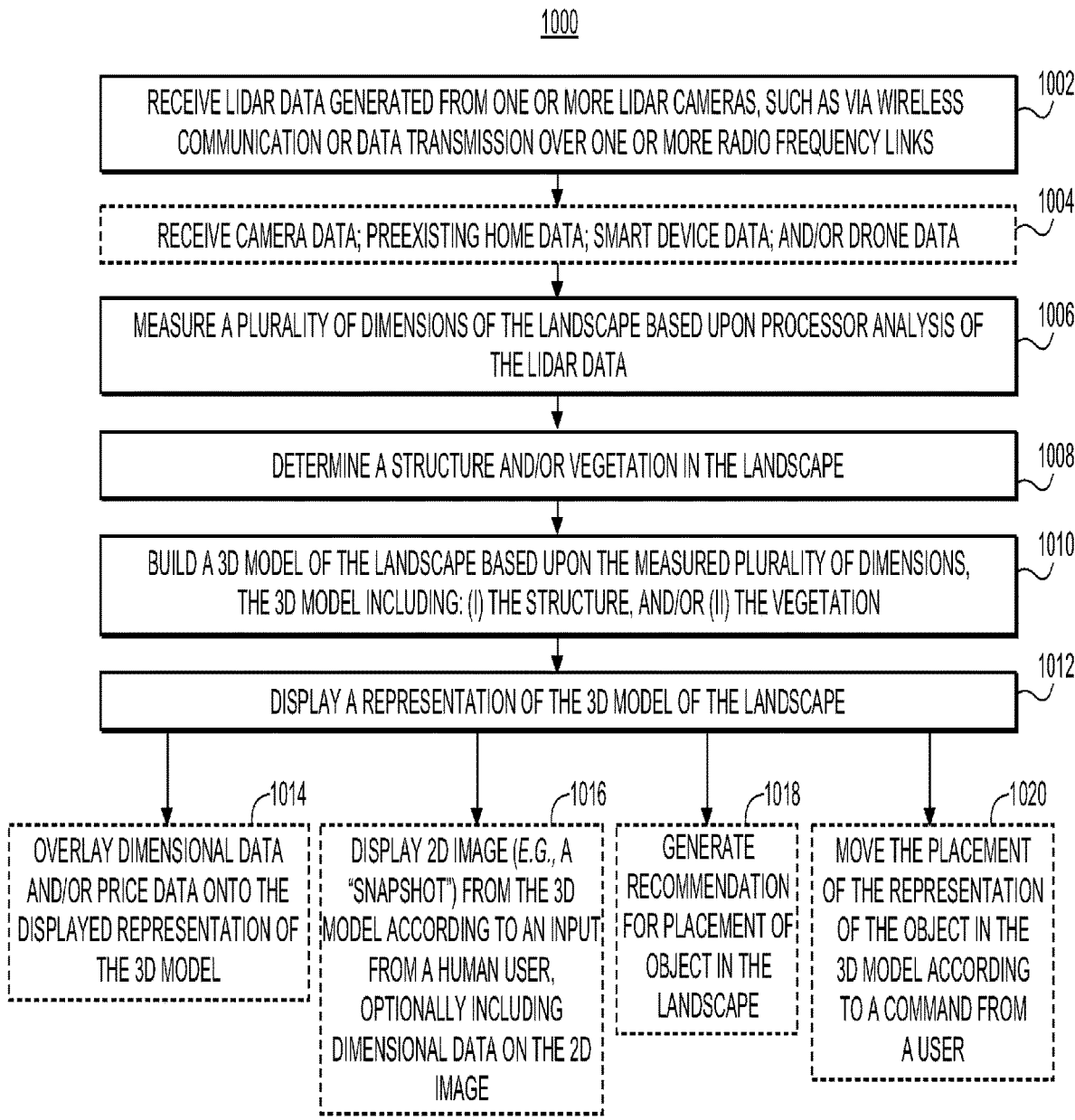
FIG. 10 shows a flowchart of an exemplary computer-implemented method for visualization of landscape design.

FIG. 10 shows a flowchart of an exemplary computer-implemented method 1000 for viewing potential placement of an object in a room. With reference thereto, at step 1002, LIDAR data (e.g., from LIDAR camera 120) is received, such as via wireless communication or data transmission over one or more radio frequency links, by server 110. In some embodiments, the LIDAR data is transferred to the servers 110 from the LIDAR camera 120 via a physical memory device.

At optional step 1004, the server 110 receives any of: camera data from camera 125; smart device data from smart devices 710; data from database 930; and/or drone data from drone 140. At step 1006, the servers 110 measure a plurality of dimensions of the landscape and/or object(s) on the landscape based upon processor analysis of the LIDAR data. In this respect, LIDAR data provides more accurate measurements than other measurement methods (e.g., measurement data from photographic camera data alone). The dimensions measured may include any dimensions of the landscape and/or object on the landscape.

At step 1008, a structure and/or vegetation is determined in the landscape. In some embodiments, the structure is a home on the landscape. The structure and/or vegetation may be determined from any of the LIDAR data, the camera data, the smart device data, the database data (e.g., from database 930) and/or the drone data. In some embodiments, the structure and/or vegetation is determined by using a machine learning algorithm in conjunction with the above-mentioned data.

At step 1010, the system builds a 3D model of the landscape based upon the measured plurality of dimensions. The 3D model may further be based upon the camera data, the smart device data, the database data (e.g., from database 930) and/or the drone data. The 3D model may include the structure and/or the vegetation.

At step 1012, a representation of the 3D model is displayed.

At optional step 1014, dimensional data may be displayed. For instance, dimensional data of the property boundaries may be overlaid onto the displayed 3D model. Additionally or alternatively, dimensional data of an object (e.g., a shed, garage, house, etc.) may be displayed. In some embodiments, the dimensional data may be determined from any of the LIDAR data, the camera data, the smart device data, the database data (e.g., from database 930) and/or the drone data.

At optional step 1016, a 2D image (e.g., a snapshot from the 3D model) is displayed. The 2D image may be displayed based upon a command from a human user. The displayed 2D image may include dimensional data, such as the dimensions mentioned above with respect to step 1014.

At optional step 1018, the system generates a recommendation for placement of an object in the landscape. In some embodiments, as mentioned above, the recommendation may be provided by a machine learning algorithm of the landscape designer 941.

At optional step 1020, the representation of an object in the 3D model is moved according to a command from a human user. For instance, a user may be considering where to build a shed on the landscape, and use this optional step to view different potential placements of the shed.

Exemplary System for Visualization of a Utility Line

Figure 11:
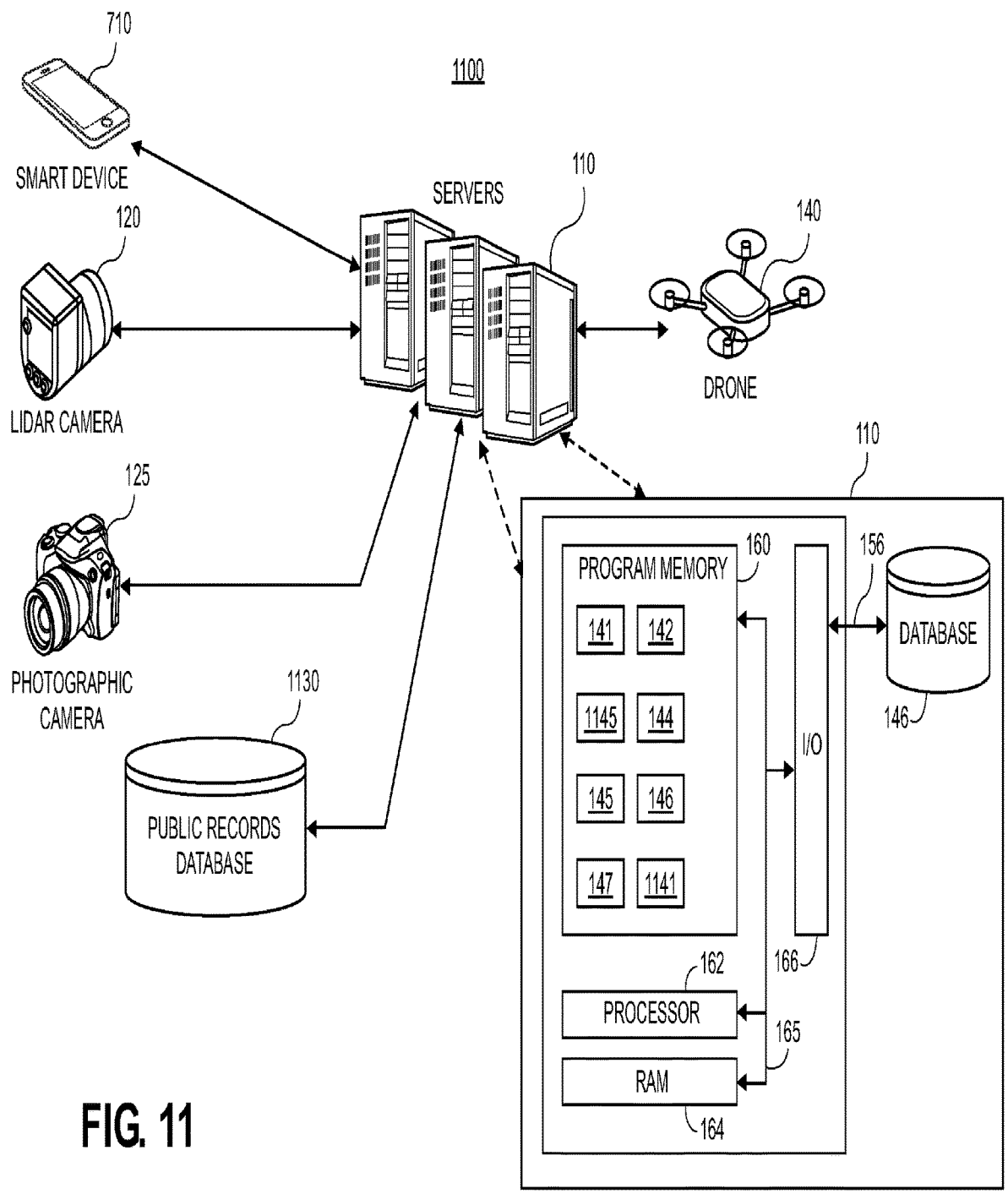
FIG. 11 shows an exemplary computer system for visualization of a utility line.

FIG. 11 shows an exemplary computer system for visualization of a utility line. With reference thereto, servers 110 are shown sending and receiving information with LIDAR camera 120. The gathered LIDAR data may be analyzed in conjunction with other data (e.g., from public records database 1130) to determine a location of a utility line (e.g., a power line, a water line, a gas line, a cable line, a fiber optic line, etc.).

For instance, the LIDAR data may be used to determine the location and dimensions of a house. Then, the determined location and dimensions of the house may be matched with data from a public records database including data showing a location of a utility line. The matching of this data advantageously allows for simple and precise marking or determination of a location of a utility line. For instance, previous methods required a utility company employee to come to the property to mark the location of the utility line either with paint or small flags. However, with the systems and methods described herein, a homeowner could—simply with a LIDAR camera and smartphone—determine the location of a utility line, and there would be no need for the utility company employee to come to the property. This is quite advantageous when the home owner wishes to put a sign (e.g., a "for sale" sign) on the property, or when the homeowner wishes to do repairs/renovations/additions to the home that require knowledge of the locations of the utility lines.

The LIDAR camera 120 may be operated by any human or machine. In some embodiments, the LIDAR camera 120 may be operated by the homeowner. In some embodiments, the LIDAR camera 120 may be operated by a company employee, such as an employee of a construction company building an addition onto a house. In some embodiments, the LIDAR camera 120 is operated by an employee of a company placing a for sale sign on a yard.

The LIDAR data may be sent to the servers 110 by any method. For instance, the LIDAR data may be sent to the servers 110 directly from the LIDAR camera 120 via the internet. In another example, the LIDAR data may be transferred from the LIDAR camera 120 to a computer (via, e.g., a cable, a USB device, or any other means), and then sent from the computer to the servers 110 by any methods (e.g., sent by the internet, by Ethernet connection, or so forth).

The servers 110 also gather data from other sources. For instance, the servers 110 may gather data from photographic camera 125 (e.g., an optical instrument used for photography or to record images, etc.). In some embodiments, the camera 125 is a camera on an individual's smartphone. The camera data gathered by camera 125 includes color data, pixel data, and so forth.

Moreover, the servers 110 may also gather data from preexisting sources that have data on the landscape and/or home. For instance, data may be gathered from public records, property deeds, government records, realtors (e.g., from websites and apps that realtors post information to), websites (e.g., websites that display information of houses for sale), previous insurance claims, and so forth. In some embodiments, this data is gathered from public records database 1130. The public records database 1130 may include structural data of the home.

The servers 110 also gather data from a drone 140. Such data may include data from a camera on the drone, a LIDAR camera on the drone, radio detection and ranging (RADAR) data gathered by the drone, global positioning system (GPS) data gathered by the drone, information from an infrared camera of the drone, and so forth.

Each server 110 may include one or more computer processors adapted and configured to execute various software applications and components of the system for a 3D home model for visualization of utility lines 1100, in addition to other software applications. The server 110 may further include a database 146, which may be adapted to store data related to the LIDAR camera 120, as well as any other data. The server 110 may access data stored in the database 146 when executing various functions and tasks associated with LIDAR technology.

Although the exemplary system 1100 is illustrated to include one LIDAR camera 120, one drone 140, and one group of servers 110 (FIG. 11 is illustrated to show three servers 110, but it should be understood that the server(s) 110 may be one or more server(s)), it should be understood that different numbers LIDAR camera 120, drone 140, servers 110, and/or any of the other elements shown in FIG. 11 may be utilized. For instance, the system 1100 may include any number of servers 110 and hundreds of mobile LIDAR cameras 120 or drones 140. Furthermore, the database storage or processing performed by the one or more servers 110 may be distributed among a plurality of servers 110 in an arrangement known as "cloud computing." This configuration may provide various advantages, such as enabling near real-time uploads and downloads of information as well as periodic uploads and downloads of information.

The server 110 may have a controller 155 that is operatively connected to the database 146 via a link 156. It should be noted that, while not shown, additional databases may be linked to the controller 155 in a known manner. For instance, separate databases may be used for storing different types of information and/or making different calculations. The controller 155 may include a program memory 160, a processor 162 (which may be called a microcontroller or a microprocessor), a random-access memory (RAM) 164, and an input/output (I/O) circuit 166, all of which may be interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for instance.

The server 110 may further include a number of software applications stored in a program memory 160. The various software applications on the server 110 may include: a LIDAR data monitoring application 141 for receiving information from LIDAR camera 120; a drone data monitoring application 142 for monitoring drone data; a data receiving application 1145 for receiving data such as preexisting utility line data; camera data receiving application 144 for receiving camera data; a 3D model builder/modifier 145 for building and modifying a 3D model (e.g., of a landscape surrounding a utility line etc.); a display application 146 for displaying a representation of the 3D model; a navigation input receiver 147 for receiving navigation input; and/or a utility line determination application 1141 for determining the location of a utility line. The various software applications may be executed on the same computer processor or on different computer processors.

A machine learning algorithm may be used to analyze any or all of the data held by servers 110. The machine learning algorithm may be a supervised learning algorithm, employ decision trees, make use of an artificial neural network, make use of Bayesian statistical analysis, or combinations thereof. In this regard, a processor or a processing element may be trained using supervised or unsupervised machine learning, and the machine learning algorithm may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

It should be understood that, over time, the servers 110 may accumulate a large pool of data on an individual home or a group of homes.

The data described above may be used (e.g., with a machine learning algorithm described above or by any other technique) to determine and/or visualize the location of a utility line.

Exemplary Computer-Implemented Method for Visualization of a Utility Line

Figure 12:
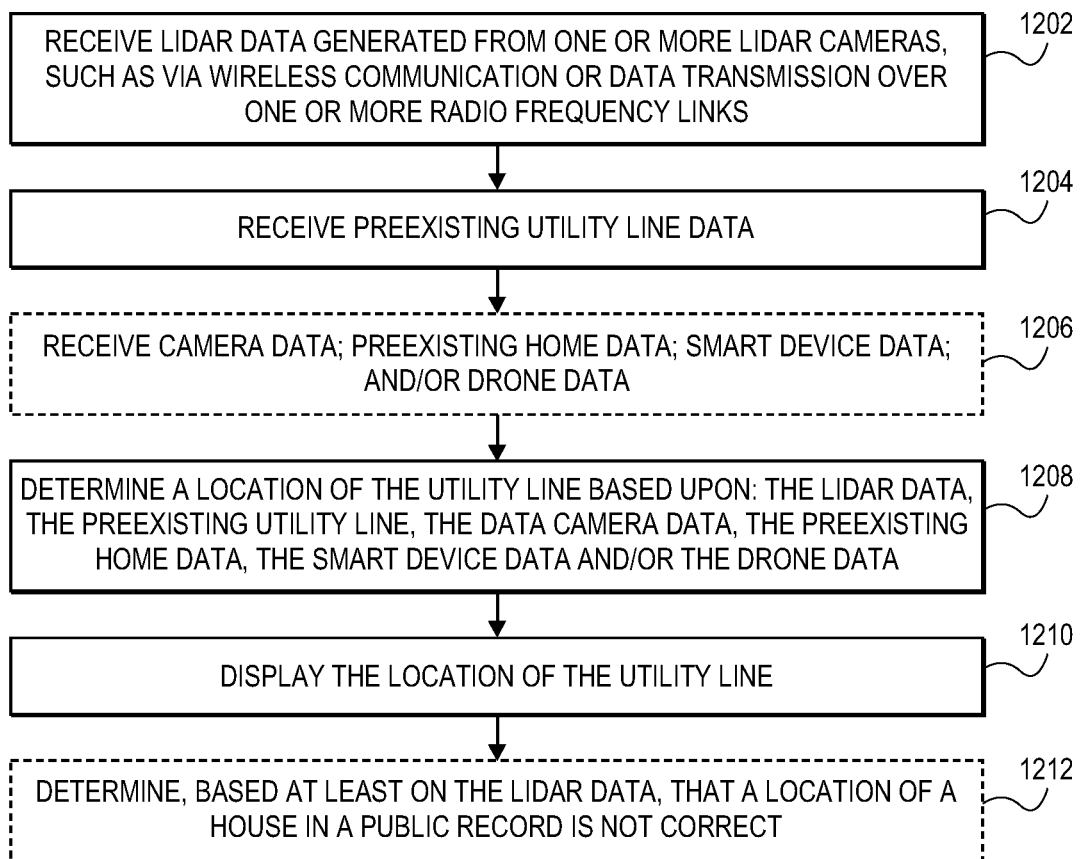
FIG. 12 shows a flowchart of an exemplary computer-implemented method for visualization of a utility line.

FIG. 12 shows a flowchart of an exemplary computer-implemented method 1200 for viewing potential placement of an object in a room. With reference thereto, at step 1202, LIDAR data (e.g., from LIDAR camera 120) is received, such as via wireless communication or data transmission over one or more radio frequency links, by server 110. In some embodiments, the LIDAR data is transferred the servers 110 from the LIDAR camera 120 via a physical memory device.

At step 1204, the system receives preexisting utility line data (e.g., from a public records database or from any other source). In some embodiments, the preexisting utility line data is part of geographic data of an area proximate to the utility line, and the geographic data of the area proximate to the utility line also includes data of a structure in the area proximate to the utility line.

At optional step 1206, the system receives any of: camera data from camera 125; smart device data from smart devices 710; data from database 1130; and/or drone data from drone 140.

At step 1208, the system determines a location of the utility line based upon: the LIDAR data, the preexisting utility line, the data camera data, the preexisting home data, the smart device data and/or the drone data. In some embodiments, this is done by matching the LIDAR data with the preexisting utility line data. For instance, the LIDAR data may indicate that there is an object, such as the home, a tree, etc., at a particular location.

The location of the object determined from the LIDAR data may then be matched with a location of the object from the preexisting utility line data (e.g., a map of the property including locations of the utility lines and locations of objects). Based upon this matching, the system then may know that the utility line is a certain distance and direction from the object, and thereby is able to provide the user with an indication of the location of the utility line.

At step 1210, the system displays a location of the utility line (e.g., on a user's smartphone or on any other device). In this regard, a user may hold a display device, such as the display on a smartphone, towards the ground, and receive an indication of the location of the utility line. For instance, in real time, while the smartphone is pointed towards the ground, the smartphone may show images or video of the ground (e.g., from a camera of the smartphone), and overly the location of the utility line onto the images or video of the ground.

At optional step 1212, the system may determine that there is a mistake in a public record. In one aspect, this is made possible because of the high accuracy of LIDAR data. For instance, the system may use the LIDAR data to determine that the location of a home, garage, and/or shed is slightly incorrect in a property record. The system may determine that a house is one foot larger or smaller than indicated in a property record. In another example, the system may determine that a house is closer to or farther away from a property boundary as indicated by a property record. This is made possible by the high accuracy of the LIDAR data.

Exemplary System for Commercial Inventory Mapping

Figure 13:
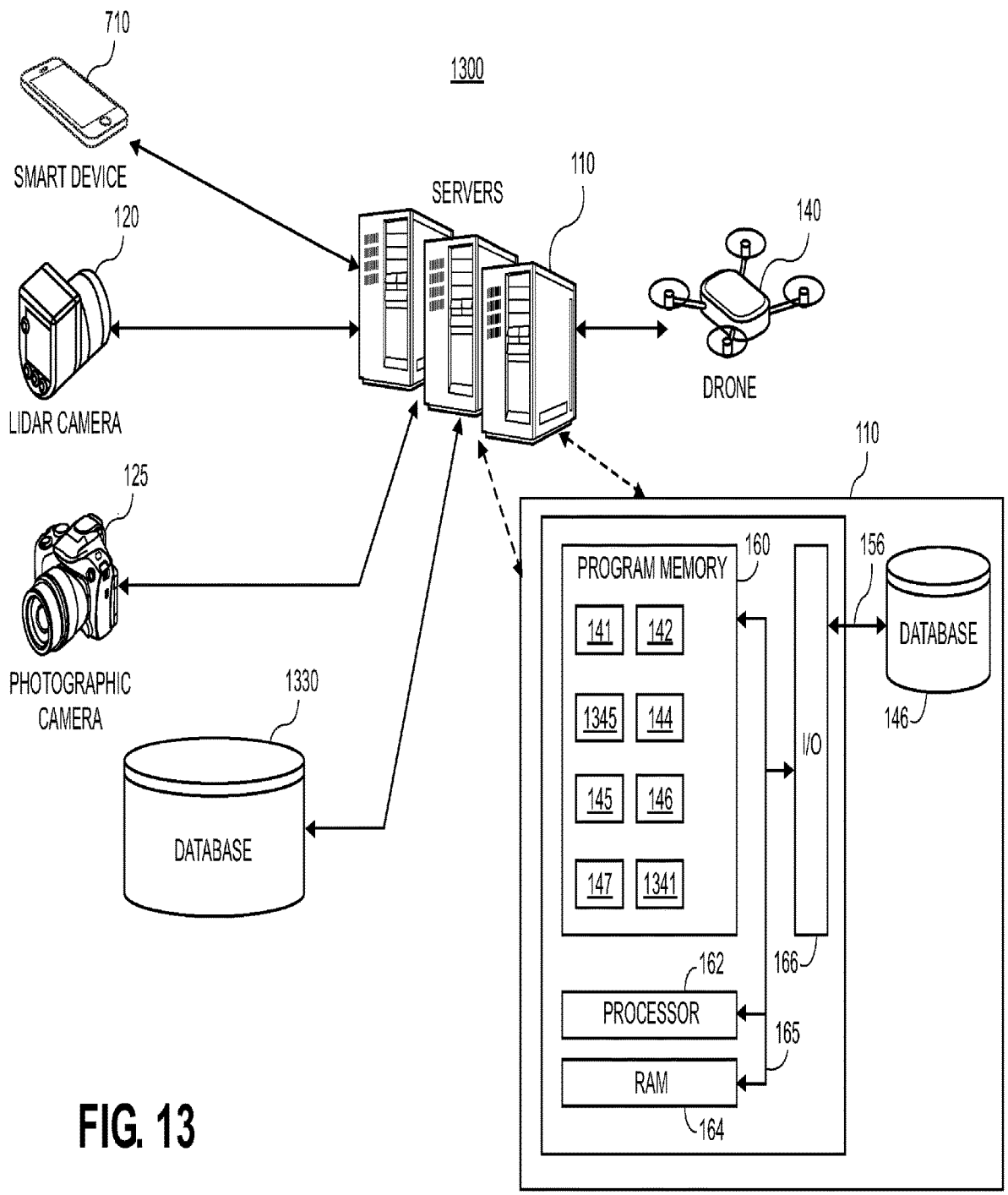
FIG. 13 shows an exemplary computer system for commercial inventory mapping.

FIG. 13 shows an exemplary computer system for commercial inventory mapping. With reference thereto, servers 110 are shown sending and receiving information with LIDAR camera 120. The gathered LIDAR data may be analyzed in conjunction with other data (e.g., from camera 125, drone 14, database 1330, etc.) to create or add to a commercial inventory.

For instance, the LIDAR data may be used to determine dimensional data of an object and/or a type of the object. The object may be any kind of object. For instance, the object may be any type including an object sold online, an object sold in a "brick and mortar" store, an object housed in a warehouse, etc. In some embodiments, the object may be an object commercially for sale. For instance, the object may be an electronics item, a grocery item, a furniture item, a vehicle, exercise equipment, etc.

In some embodiments, the LIDAR data is analyzed to determine the dimensional data of the object, and the type of object is then determined wholly or partially from the dimensional data. For instance, the object type may further be determined based upon photographic camera data, data from database 1330, drone data, and/or data from smart devices. In some embodiments, the type of the object is further determined based upon barcode data or quick response (QR) code data found in the photographic camera data.

The LIDAR camera 120 may be operated by any human or machine. In some embodiments, the LIDAR camera 120 may be operated by an employee of a company, such as a company that seeks to create an inventory of commercial items.

The LIDAR data may be sent to the servers 110 by any method. For instance, the LIDAR data may be sent to the servers 110 directly from the LIDAR camera 120 via the internet. In another example, the LIDAR data may be transferred from the LIDAR camera 120 to a computer (via, e.g., a cable, a USB device, or any other means), and then sent from the computer to the servers 110 by any methods (e.g., sent by the internet, by Ethernet connection, or so forth).

The servers 110 also gather data from other sources. For instance, the servers 110 may gather data from photographic camera 125 (e.g., an optical instrument used for photography or to record images, etc.). In some embodiments, the camera 125 is a camera on an individual's smartphone. The camera data gathered by camera 125 includes color data, pixel data, and so forth.

Moreover, the servers 110 may also gather data from sources that have data on a commercial inventory, such as database 1330. For instance, database 1330 may store commercial inventory lists that the gathered LIDAR data is used to add to or correct.

The servers 110 may also gather data from a drone 140 or a number of drones. Such data may include data from a camera on the drone, a LIDAR camera on the drone, radio detection and ranging (RADAR) data gathered by the drone, global positioning system (GPS) data gathered by the drone, information from an infrared camera of the drone, and so forth.

Each server 110 may include one or more computer processors adapted and configured to execute various software applications and components of the system for commercial inventory mapping 1300, in addition to other software applications. The server 110 may further include a database 146, which may be adapted to store data related to the LIDAR camera 120, as well as any other data. The server 110 may access data stored in the database 146 when executing various functions and tasks associated with LIDAR technology.

Although the exemplary system 1300 is illustrated to include one LIDAR camera 120, one drone 140, and one group of servers 110 (FIG. 13 is illustrated to show three servers 110, but it should be understood that the server(s) 110 may be one or more server(s)), it should be understood that different numbers LIDAR camera 120, drone 140, servers 110, and/or any of the other elements shown in FIG. 13 may be utilized. For instance, the system 1300 may include any number of servers 110 and hundreds of mobile LIDAR cameras 120 or drones 140. Furthermore, the database storage or processing performed by the one or more servers 110 may be distributed among a plurality of servers 110 in an arrangement known as "cloud computing." This configuration may provide various advantages, such as enabling near real-time uploads and downloads of information as well as periodic uploads and downloads of information.

The server 110 may have a controller 155 that is operatively connected to the database 146 via a link 156. It should be noted that, while not shown, additional databases may be linked to the controller 155 in a known manner. For instance, separate databases may be used for storing different types of information and/or making different calculations. The controller 155 may include a program memory 160, a processor 162 (which may be called a microcontroller or a microprocessor), a random-access memory (RAM) 164, and an input/output (I/O) circuit 166, all of which may be interconnected via an address/data bus 165. It should be appreciated that although only one microprocessor 162 is shown, the controller 155 may include multiple microprocessors 162.

Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for instance.

The server 110 may further include a number of software applications stored in a program memory 160. The various software applications on the server 110 may include: a LIDAR data monitoring application 141 for receiving information from LIDAR camera 120; a drone data monitoring application 142 for monitoring drone data; a data receiving application 1345 for receiving data such as inventory data; camera data receiving application 144 for receiving camera data; a 3D model builder/modifier 145 for building and modifying a 3D model (e.g., of an object to be included in a commercial inventory etc.); a display application 146 for displaying a representation of the 3D model; a navigation input receiver 147 for receiving navigation input; and/or a commercial inventory determination application 1341 for determining an inventory. The various software applications may be executed on the same computer processor or on different computer processors.

A machine learning algorithm may be used to analyze any or all of the data held by servers 110. The machine learning algorithm may be a supervised learning algorithm, employ decision trees, make use of an artificial neural network, make use of Bayesian statistical analysis, or combinations thereof. In this regard, a processor or a processing element may be trained using supervised or unsupervised machine learning, and the machine learning algorithm may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

The data described above may be used (e.g., with a machine learning algorithm described above or by any other technique) to create and/or add to a commercial inventory list.

Exemplary Computer-Implemented Method for Commercial Inventory Mapping

Figure 14A:
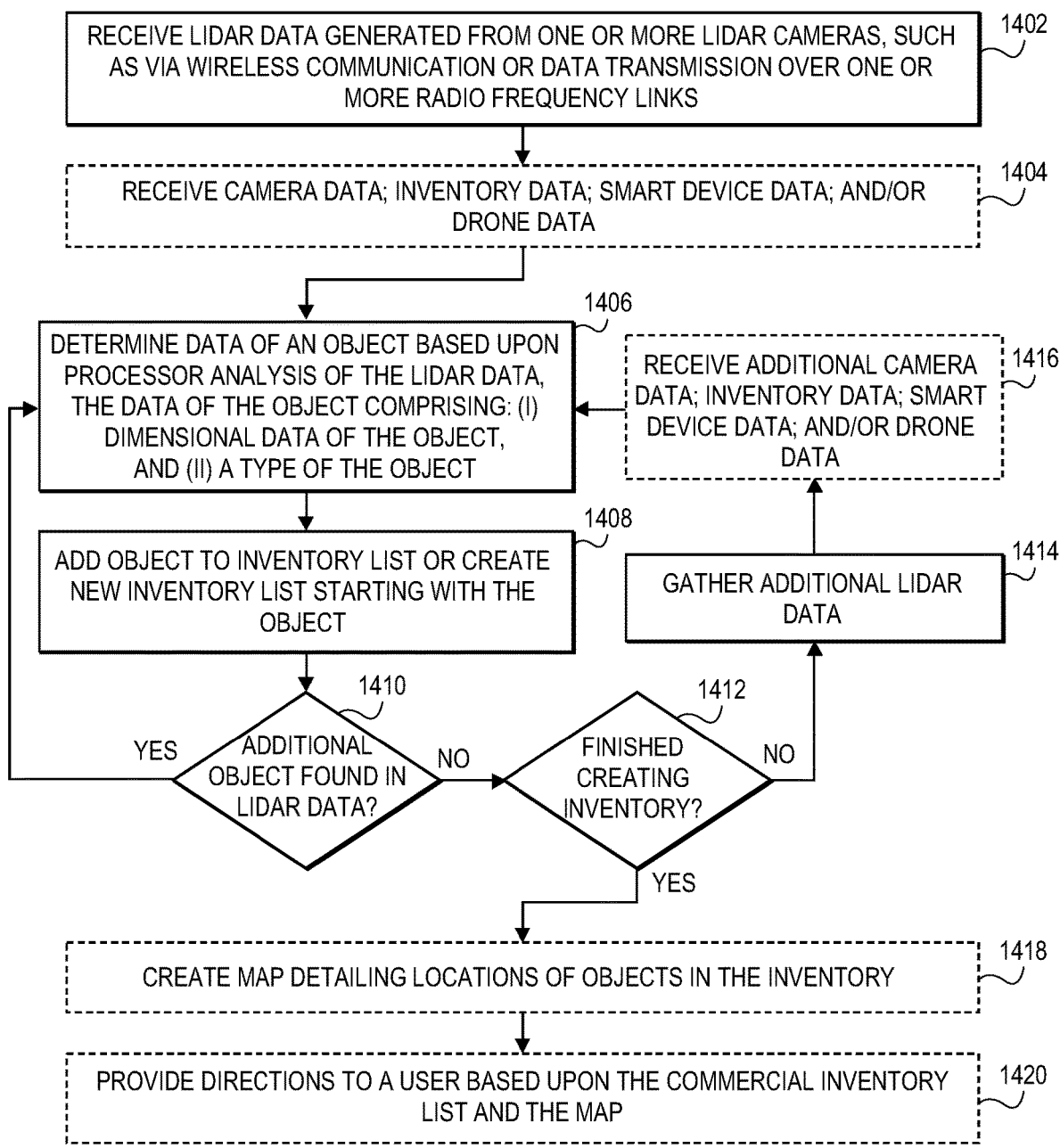
FIG. 14A shows a flowchart of an exemplary computer-implemented method for commercial inventory mapping.

FIG. 14A shows a flowchart of an exemplary computer-implemented method 1400 for viewing potential placement of an object in a room. With reference thereto, at step 1402, LIDAR data (e.g., from LIDAR camera 120) is received, such as via wireless communication or data transmission over one or more radio frequency links, by server 110. In some embodiments, the LIDAR data is transferred to the servers 110 from the LIDAR camera 120 via a physical memory device.

At optional step 1404, the system receives additional data that may be used to augment the LIDAR data. The additional data may include, for instance, camera data from camera 125, inventory data or other data from database 1330, drone data from drone 140, smart device data from smart device 710, and so forth.

At step 1406, data of an object is determined based upon processor analysis of the LIDAR data. The data of the object may include: (i) dimensional data of the object, and (ii) a type of the object. The determination of data of the object (especially the type of object) may further be made based upon any or all of the data gathered at step 1404. It should be understood that object(s) may be found in LIDAR data using machine learning algorithms, such as a CNN, DNN, etc., or by any other technique.

The determined data of the object may also include a location of the object, which may be determined by any suitable technique. For instance, the location of an object may be determined from the LIDAR data alone (e.g., processor analysis determines that an object is five feet from a wall). In some embodiments, the LIDAR data is married with other data to determine the object's location (e.g., the LIDAR data is married with camera data, GPS data, RADAR data, drone data, bar code data, quick response (QR) code data, radio frequency ID (RFID) tag data, data of the layout of a building, preexisting data of the object's location, etc.).

At step 1408, based upon the determined object data, the object is added to an existing inventory list or used to create a new inventory list.

At step 1410, the system searches for an additional object (e.g., a second object) in the LIDAR data. If there is a second object in the LIDAR data, the system returns to step 1406, and the system determines object data of the additional object.

If no additional object is found, the system proceeds to step 1412, where the system determines if it is finished creating the inventory. If the system is not finished creating the inventory, additional LIDAR data is gathered at step 1414 (e.g., a company employee scans the next object with LIDAR camera 120). And, optionally at step 1416, somewhat similarly to step 1404, additional data used to augment the additional LIDAR data is received. The system then proceeds/returns to step 1406 where data of an object from the additional LIDAR data is determined.

If the system is finished creating the inventory at step 1412, the system then optionally creates a map detailing locations of objects in the inventory. It should be understood that the method of FIG. 14A is only an example, and, in some embodiments, the system may create the map even if the system is not finished creating the inventory. At optional step 1420, the map may be used to provide navigation instructions to, for example, a customer or employee of a store, or a customer or employee of a warehouse. For instance, the system may display the map with the route to a particular item indicated on the map. In some embodiments, the system provides an aisle number or other indicator of the item's location to the user.

Figure 14B:
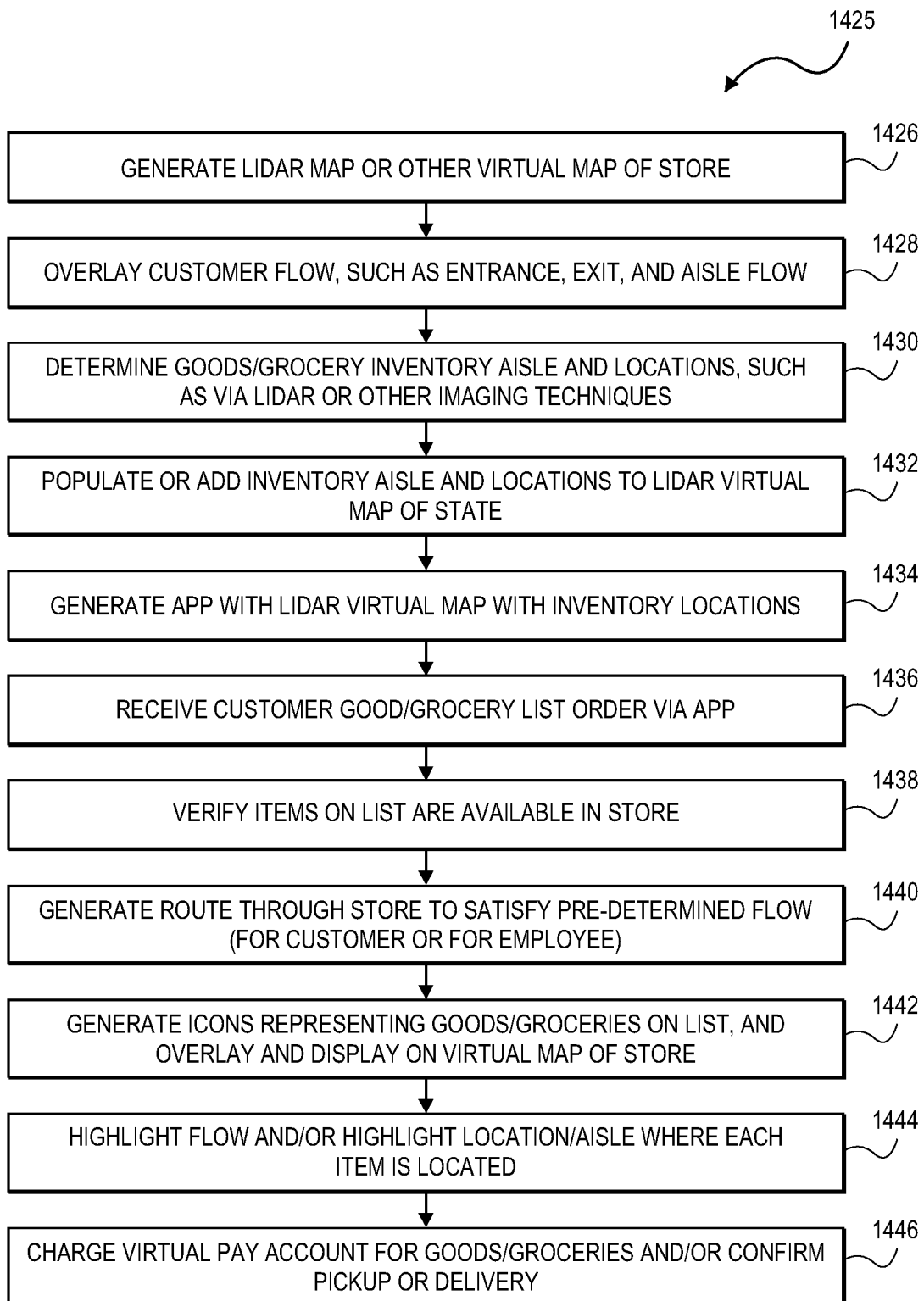
FIG. 14B shows a flowchart of another exemplary computer-implemented method for commercial inventory mapping.

FIG. 14B shows a flowchart of another exemplary computer-implemented method for commercial inventory mapping 1425. The computer-implemented method 1425 may be implemented via one or more local or remote processors, servers, transceivers, sensors, and/or LIDAR devices. The method 1425 may include generating a LIDAR-based or other virtual map of a store 1426. For instance, a virtual map of a store may be completely based upon LIDAR data. Additionally or alternatively, a high level virtual map of a store may be generated, and more detailed LIDAR data may be used to refine the accuracy of the high level virtual map of the store.

The computer-implemented method 1425 may include overlaying, via one or more local or remote processors, customer aisle flow on top of the virtual LIDAR map of the store 1428. For instance, grocery stores, department stores, hardware stores, restaurants, and other places of business may prefer that customers enter and exit certain doors into and out of the store, and request that customers and employees follow certain flows when moving about the store, such as to allow for social distancing and/or to allow customers minimize their time within the store.

The computer-implemented method 1425 may include determining, via one or more local or remote processors, a location of each good or grocery item within a store 1430. For instance, LIDAR or other imaging techniques may be used to gather data on each item within a store, identify the type of item, and identify the location of each item. The location of each item may include an aisle of the item, a shelf or row of the item, a bin of the item, an area of the store in which the item is located, or other location of the item within the store. Additionally or alternatively, sensors and/or cameras may be used to determine the location of each good or grocery item within a store. For instance, each good may have its own chip/processor and/or sensor, such as a GPS (Global Positioning System) unit, RFID tag, or other type of sensor or transceiver to communicate with other processors or nodes about a store. Additionally or alternatively, each shelf or bay within a store may have its own sensor(s) and/or camera(s) to facilitate good identification and/or locationing.

The computer-implemented method 1425 may include adding, via one or more local or remote processors, the location of each item within the store to the LIDAR-based or other virtual map of the store 1432. For instance, the method 1425 may include populating or overlaying the location of each item on the LIDAR-based or other virtual map of the store.

The computer-implemented method 1425 may include generating, via one or more local or remote processors, an App for download that includes the LIDAR-based or other virtual map of the store 1434, along with locations of items throughout the store, including icons designating each type of item (such as icons representing grocery/food items—chicken, bacon, eggs, milk, cat food, etc., or icons representing other goods—such as tools, paint, plants, gloves, saws, clothing, socks, laundry detergent, paper towels, etc.).

The computer-implemented method 1425 may include receiving, such as at a remote or local server associated with a store, a virtual order from a mobile device of a customer on which the App is installed 1436. The virtual order may be a virtual order for a list of groceries or other goods (such as clothing, tools, etc.), for example.

The computer-implemented method 1425 may include verifying, via one or more local or remote processors, that one or more of items on the customer's virtual order or list of items are currently available in the store 1438. For instance, a processor may update the list of items currently in the store every morning, and then compare the customer's list of items with the updated list of items, and also with other customer orders and purchases throughout the day to provide real time availability. Once an item is purchased, the processor may block additional orders of the item by other customers, or otherwise reserve the item for the customer that purchased the item first.

The computer-implemented method 1425 may include generating, via one or more local or remote processors, a route through the store for the customer, or an employee to follow (for instance, to facilitate curb-side pick-up or delivery to the customer's location), to pick up all of the items in the store that are currently available and to satisfy predetermined flow through the store 1440. For instance, aisles may be intended for one-way traffic or people movement to facilitate social distancing and/or minimizing time within the store.

The computer-implemented method 1425 may include generating, via one or more local or remote processors, icons representing each item on the customer's list of groceries or other goods, and overlaying those icons on the LIDAR-based or other virtual map of the store 1442. Additionally or alternatively, the computer-implemented method 1425 may include highlighting, via one or more processors, the person flow through the store, and/or highlighting the location and/or location of where each item on the customer's list is located within the store 1444.

The computer-implemented method 1425 may include charging, via one or more local or remote processors, a virtual pay account of the customer for the goods/groceries, and/or confirm pick up or delivery of the goods and/or groceries 1446. The method may include additional, less, or alternate actions, including those discussed elsewhere herein, including those actions discussed with respect to FIG. 14A above, or with respect to FIG. 14C below. Although the focus of the foregoing discussion has been on groceries, the present embodiments also apply to other goods and stores, such as clothing and department or retail stores.

Figure 14C:
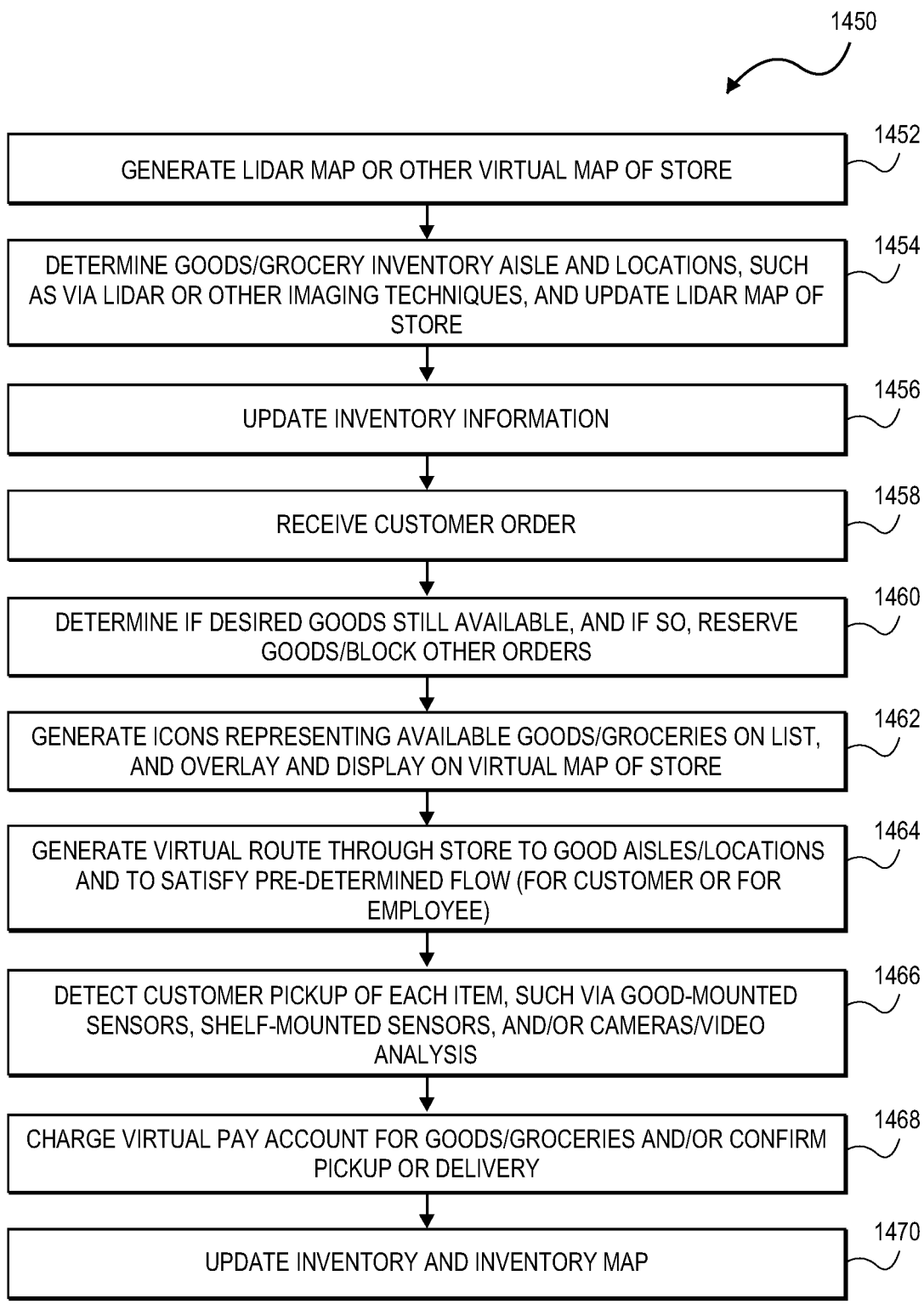
FIG. 14C shows a flowchart of another exemplary computer-implemented method for commercial inventory mapping.

FIG. 14C shows a flowchart of another exemplary computer-implemented method for commercial inventory mapping 1450. The computer-implemented method 1450 may be implemented via one or more local or remote processors, servers, transceivers, sensors, and/or LIDAR devices. The method 1450 may include generating a LIDAR-based or other virtual map of a store 1452. For instance, a virtual map of a store may be completely based upon LIDAR data. Additionally or alternatively, a high level virtual map of a store may be generated, and more detailed LIDAR data may be used to refine the accuracy of the high level virtual map of the store.

The computer-implemented method 1450 may include determining, via one or more local or remote processors, a location of each good or grocery item within a store 1454. For instance, LIDAR or other imaging techniques may be used to gather data on each item within a store, identify the type of item, and identify the location of each item. The location of each item may include an aisle of the item, a shelf or row of the item, a bin of the item, an area of the store in which the item is located, or other location of the item within the store. Additionally or alternatively, sensors and/or cameras may be used to determine the location of each good or grocery item within a store. For instance, each good may have its own chip/processor and/or sensor, such as a GPS (Global Positioning System) unit, RFID tag, or other type of sensor or transceiver to communicate with other processors or nodes about a store. Additionally or alternatively, each shelf or bay within a store may have its own sensor(s) and/or camera(s) to facilitate good identification and/or location identification. The location of each item may also be performed by manually scanning the RFID tag on each item, and sending the data to an inventory database.

The computer-implemented method 1450 may include updating or maintaining, via one or more local or remote processors, inventory information and/or good location and availability information 1456. For instance, an inventory database may be maintained, and as orders received and/or confirmed, the inventory of goods may be updated.

The computer-implemented method 1450 may include receiving, via one or more local or remote processors, a virtual or electronic customer order 1458 via wireless communication or data transmission over one or more radio frequency links. For instance, a customer may enter an order for groceries via an App installed on their mobile device, and transmit the order via their mobile device to a server associated with the respective store for processing and virtual map generation.

The computer-implemented method 1450 may include determining, via one or more local or remote processors, whether the desired goods on the customer's virtual list of goods are still available within the store's inventory 1460, and if so, then reserving the goods that are available for the customer and/or otherwise blocking orders from other customers for the desired goods.

The computer-implemented method 1450 may include generating, via one or more local or remote processors, icons representing each item on the customer's list of groceries or other goods that are currently available, and overlaying those icons on the LIDAR-based or other virtual map of the store 1462. Additionally or alternatively, the computer-implemented method 1450 may include highlighting, via one or more local or remote processors, the person flow through the store, and/or highlighting the location and/or location of where each available item on the customer's list is located within the store.

The computer-implemented method 1450 may include generating, via one or more local or remote processors, a route through the store for the customer, or an employee to follow (for instance, to facilitate curb-side pick-up or delivery to the customer's location), to pick up all of the items in the store that are currently available and to satisfy predetermined flow through the store 1464. For instance, aisles may be intended for one-way traffic or people movement to facilitate social distancing and/or minimizing time within the store.

The computer-implemented method 1450 may include determining, via one or more local or remote processors, transceivers, and/or sensors, that one or more of the available items have been picked up by the customer 1466. For instance, good-mounted or shelf-mounted sensors may detect that an item has moved, and/or cameras may detect that a customer has placed an item in their cart. Additionally or alternatively, sensors at an exit of the store may automatically log the items in the customer's bag or cart, and automatically charge a financial account associated with the customer.

The computer-implemented method 1450 may include charging, via one or more local or remote processors, a virtual pay account of the customer for the goods/groceries, and/or confirm pick up or delivery of the goods and/or groceries 1468. The method 1450 may include updating the electronic inventory of the store and/or updating the inventory icons within the LIDAR-based virtual map of the store. The method may include additional, less, or alternate actions, including those discussed elsewhere herein, including those actions discussed with respect to FIGS. 14A & 14B above.

In one aspect, a computer-implemented method for commercial inventory mapping may be provided. The method may include, via one or more local or remote processors, sensors, servers, LIDAR devices, and/or transceivers: (1) receiving light detection and ranging (LIDAR) data generated from a LIDAR camera, the LIDAR data associated with a store or a store layout; (2) generating a LIDAR-based virtual map of the store from processor analysis of the LIDAR data; (3) determining locations of individual goods in the store; (4) the locations of individual goods onto the LIDAR-based virtual map; and/or (5) generating an updated LIDAR-based virtual map of the store displaying aisles of the store and the overlaid locations of the individual goods within the store. The method may include additional, less, or alternate actions, including those discussed elsewhere herein.

For instance, the method may include, via one or more local or remote processors, sensors, servers, LIDAR devices, and/or transceivers: (a) overlaying customer flow through the store on top of the updated LIDAR-based virtual map; and/or (b) displaying the updated LIDAR-based virtual map including the overlaid customer flow though the store on a mobile device of the customer.

The method may include, via the one or more local or remote processors, sensors, servers, LIDAR devices, and/or transceivers, receiving a virtual or electronic customer list for items to be purchased from an App installed on a customer mobile device via one or more radio frequency links, and/or via wireless communication or data transmission. The method may also include, via the one or more local or remote processors, sensors, servers, LIDAR devices, and/or transceivers, verifying that one or more of the items on the virtual or electronic customer list of items are currently available for purchase, such as by accessing a list of current inventory within the store.

The method may include, via the one or more local or remote processors, sensors, servers, LIDAR devices, and/or transceivers, verifying that one or more of the items on the virtual or electronic list of items will be available for purchase when the customer arrives at the store at a subsequent hour, such as by comparing the virtual or electronic list of items with current electronic orders received from other customers. The method may also include, via one or more local or remote processors, sensors, servers, LIDAR devices, and/or transceivers, generating a virtual route through the store on top of the updated LIDAR-based virtual map that displays locations of items on the virtual or electronic customer list of items received from the customer's mobile device; and/or displaying the virtual route on top of the updated LIDAR-based virtual map of store so as to depict the route for a customer or employee to travel though the store, such as on a mobile device of the customer, and pick up the desired items.

The method may include, via one or more local or remote processors, sensors, servers, LIDAR devices, and/or transceivers, further updating the updated LIDAR-based virtual map to depict a route through the store for the customer or an employee to pick up one or more items on the customer's electronic list. The method may also include, via the one or more local or remote processors, sensors, servers, LIDAR devices, and/or transceivers, further updating the updated LIDAR-based virtual map to depict a route through the store for the customer or an employee to pick up one or more items on the customer's electronic list, and displaying the route on top of the updated LIDAR-based virtual map of the store on a mobile device, wherein the route is highlighted and reflects pre-determined flow through the store and icons representing aisle or other locations of items on the customer's electronic list are also virtually depicted.

In another aspect, a computer system configured for commercial inventory mapping may be provided. The computer system may include one or more local or remote processors, sensors, servers, LIDAR devices, and/or transceivers configured to: (1) receive light detection and ranging (LIDAR) data generated from a LIDAR camera, such as via wireless communication or data transmission over one or more radio frequency links, the LIDAR data associated with a store or a store layout; (2) generate a LIDAR-based virtual map of the store from processor analysis of the LIDAR data; (3) determine locations of individual goods in the store; (4) overlay the locations of the individual goods onto the LIDAR-based virtual map; and/or (5) generate an updated LIDAR-based virtual map of the store displaying aisles of the store and the overlaid locations of individual goods within the store. The computer system may include additional, less, or alternate functionality, including that discussed elsewhere herein.

For instance, the computer system and/or the one or more local or remote processors, sensors, servers, LIDAR devices, and/or transceivers may be configured to: overlay customer flow through the store on top of the updated LDIAR-based virtual map; and/or display the updated LIDAR-based virtual map including the overlaid customer flow though the store on a mobile device of the customer or an employee.

The computer system and/or the one or more local or remote processors, sensors, servers, LIDAR devices, and/or transceivers may be configured to receive a virtual or electronic customer list for items to be purchased from an App installed on a customer mobile device via one or more radio frequency links, and/or via wireless communication or data transmission.

The computer system and/or the one or more local or remote processors, sensors, servers, LIDAR devices, and/or transceivers may be configured to verify that one or more of the items on the virtual or electronic customer list of items are currently available for purchase, such as by accessing a list of current inventory within the store.

The computer system and/or the one or more local or remote processors, sensors, servers, LIDAR devices, and/or transceivers may be configured to verify that one or more of the items on the virtual or electronic customer list of items will be available for purchase when the customer arrives at the store at a subsequent hour, such as by comparing the virtual or electronic list of items with current electronic orders received from other customers.

The computer system and/or the one or more local or remote processors, sensors, servers, LIDAR devices, and/or transceivers may be configured to generate a virtual route through the store on top of the updated LIDAR-based virtual map that displays a location of each of the items on the virtual or electronic customer list of items received from the customer's mobile device; and/or display the virtual route on top of the updated LIDAR-based virtual map of store so as to depict the route for a customer or employee to travel though the store, such as on a mobile device of the customer, and pick up the desired items.

The computer system and/or the one or more local or remote processors, sensors, servers, LIDAR devices, and/or transceivers may be configured to update the updated LIDAR-based virtual map to depict a route through the store for the customer or an employee to pick up one or more items on the virtual or electronic customer list.

The computer system and/or the one or more local or remote processors, sensors, servers, LIDAR devices, and/or transceivers may be configured to update the updated LIDAR-based virtual map to depict a route through the store for the customer or an employee to pick up one or more items on the customer's electronic list, and display the route on top of the updated LIDAR-based virtual map of the store on a mobile device, wherein the route is highlighted and reflects pre-determined flow through the store and icons representing aisle or other locations of items on the customer's electronic list are also virtually depicted.

In yet another aspect, there is a computer system configured for commercial inventory mapping. The computer system may include: one or more processors; and a program memory coupled to the one or more processors and storing executable instructions that when executed by the one or more processors cause the computer system to: (1) receive light detection and ranging (LIDAR) data generated from a LIDAR camera via wireless communication or data transmission over one or more radio frequency links, the LIDAR data associated with a store or a store layout; (2) generate a LIDAR-based virtual map of the store from processor analysis of the LIDAR data; (3) determine locations of individual goods in the store; (4) overlay the locations of the individual goods onto the LIDAR-based virtual map; and (5) generate an updated LIDAR-based virtual map of the store displaying aisles of the store and the overlaid locations of the individual goods within the store. The computer system may include additional, less, or alternate functionality, including that discussed elsewhere herein.

For instance, the executable instructions may further cause the computer system to: overlay customer flow through the store on top of the updated LIDAR-based virtual map; and display the updated LIDAR-based virtual map including the overlaid customer flow though the store on a mobile device of the customer or an employee.

The executable instructions may further cause the computer system to: receive a virtual or electronic customer list for items to be purchased from an App installed on a customer mobile device via one or more radio frequency links, and/or via wireless communication or data transmission.

The executable instructions may further cause the computer system to: receive confirmation that items of the virtual or electronic customer list have been picked up or delivered; charge a virtual pay account for the picked up or delivered items; and receive payment for the picked up or delivered items from the virtual pay account.

In another aspect, a computer-implemented method for commercial inventory mapping may be provided. The method may include, via one or more local or remote processors, sensors, servers, LIDAR devices, and/or transceivers: (1) receiving sensor data via wireless communication or data transmission over one or more radio frequency links, the sensor data associated with item movement or purchase, the sensor data being generated from a good-mounted sensor, shelf-mounted sensor, a camera, or a self-check device; (2) updating an electronic inventory of goods within a store based upon the received sensor data associated with item movement or purchase; (3) receiving an electronic order of goods from a customer mobile device via wireless communication or data transmission over one or more radio frequency links; (4) determining goods in the electronic order received from the customer that are still available by comparing the updated electronic inventory of goods with the electronic order of goods and/or comparing the electronic order of goods with other incoming electronic orders from other customers; (5) generating a LIDAR-based virtual map of the store from processor analysis of LIDAR data; (6) determining a location of goods in the electronic order that are still available; (7) overlaying the determined location of the goods to the LIDAR-based virtual map of the store; and/or (8) generating an updated LIDAR-based virtual map of the store displaying aisles of the store and the determined locations of the goods within the store. The method may include additional, less, or alternate actions, including those discussed elsewhere herein.

For instance, the updated LIDAR-based virtual map may also depict a pre-determined flow through the store to maintain customer traffic uniform or spaced out.

The method may include, via the one or more local or remote processors, servers, transceivers, and/or sensors, receiving sensor data indicating that the customer has picked up aspecific item or placed the specific item in a cart, the sensor data being associated with the specific item; and/or updating an electronic or virtual inventory of the store based upon the sensor data to indicate that the specific item has been picked up by a customer, or placed in the cart.

The location of the goods in the electronic order may be determined from processor analysis of the LIDAR data. The method further may further include, via the one or more local or remote processors, sensors, servers, and/or transceivers: in response to the determination that the goods in the electronic order are still available, reserving, for the customer, the goods in the electronic order that are still available.

The method may further include, via the one or more local or remote processors, sensors, servers, and/or transceivers: generating icons corresponding to the goods in the electronic order are that are still available; and overlaying the icons onto the LIDAR-based virtual map of the store.

The method may further include, via the one or more local or remote processors, sensors, servers, and/or transceivers: receiving confirmation that items of the virtual or electronic customer list have been picked up or delivered; charging a virtual pay account for the picked up or delivered items; and receiving payment for the picked up or delivered items from the virtual pay account.

In another aspect, a computer system configured for commercial inventory mapping may be provided. The computer system may include one or more local or remote processors, sensors, servers, LIDAR devices, and/or transceivers configured to: (1) receive sensor data via wireless communication or data transmission over one or more radio frequency links, the sensor data associated with item movement or purchase, the sensor data being generated from a good-mounted sensor, shelf-mounted sensor, a camera, or a self-check device; (2) update an electronic inventory of goods within a store based upon the received sensor data associated with the item movement or purchase; (3) receive an electronic order of goods from a customer mobile device via wireless communication or data transmission over one or more radio frequency links; (4) determine if the goods in the electronic order received from the customer are still available by comparing the updated electronic inventory of goods with the electronic order of goods and/or comparing the electronic order of goods with other incoming electronic orders from other customers; (5) generate a LIDAR-based virtual map of the store from processor analysis of LIDAR data; (6) determine a location of the goods in the electronic order that are still available; (7) overlay the determined location of the individual goods onto the LIDAR-based virtual map of the store; and/or (8) generate and display an updated LIDAR-based virtual map of the store displaying aisles of the store and the determined location of the goods within the store. The system may be configured with additional, less, or alternate functionality, including that discussed elsewhere herein.

For instance, the updated LIDAR-based virtual map may also depict a pre-determined flow through the store for customers to follow, such as to facilitate social distancing.

The system and/or one or more local or remote processors, servers, transceivers, and/or servers may also be configured to: receive sensor data indicating that the customer has picked up a specific item or placed the specific item in a cart via wireless communication or data transmission over one or more radio frequency links, the sensor data being associated with the specific item; and/or update an electronic inventory of items within the store based upon the sensor data to indicate that the item has been picked up by a customer, or placed in the cart.

The location of the goods in the electronic order may be determined from processor analysis of the LIDAR data.

The system may be further configured to: in response to the determination that the goods in the electronic order are still available, reserve, for the customer, the goods in the electronic order that are still available.

The system may be further configured to: generate icons corresponding to the goods in the electronic order are that are still available; and overlay the icons onto the LIDAR-based virtual map of the store.

The system may be further configured to: receive confirmation that items of the virtual or electronic customer list have been picked up or delivered; charge a virtual pay account for the picked up or delivered items; and receive payment for the picked up or delivered items from the virtual pay account.

In another aspect, a computer system configured for commercial inventory mapping may be provided. The computer system may include: one or more processors; and a program memory coupled to the one or more processors and storing executable instructions that when executed by the one or more processors cause the computer system to: (1) receive sensor data via wireless communication or data transmission over one or more radio frequency links, the sensor data associated with item movement or purchase, the sensor data being generated from a good-mounted sensor, shelf-mounted sensor, a camera, or a self-check device; (2) update an electronic inventory of goods within a store based upon the received sensor data associated with the item movement or purchase; (3) receive an electronic order of goods from a customer mobile device via wireless communication or data transmission over one or more radio frequency links; (4) determine if the goods in the electronic order received from the customer are still available by comparing the updated electronic inventory of goods with the electronic order of goods and/or comparing the electronic order of goods with other incoming electronic orders from other customers; (5) generate a LIDAR-based virtual map of the store from processor analysis of LIDAR data; (6) determine a location of the goods in the electronic order that are still available; (7) overlay the determined location of the goods onto the LIDAR-based virtual map of the store; and (8) generate and display an updated LIDAR-based virtual map of the store displaying aisles of the store and the determined location of the goods within the store. The computer system may include additional, less, or alternate functionality, including that discussed elsewhere herein.

For instance, the updated LIDAR-based virtual map may also depict a pre-determined flow through the store for customers to follow.

The executable instructions may further cause the computer system to: receive sensor data indicating that the customer has picked up a specific item or placed the specific item in a cart via wireless communication or data transmission over one or more radio frequency links, the sensor data being associated with the specific item; and update an electronic inventory of items within the store based upon the sensor data to indicate that the item has been picked up by a customer, or placed in the cart.

The location of the goods in the electronic order may be determined from processor analysis of the LIDAR data.

The executable instructions may further cause the computer system to: in response to the determination that the goods in the electronic order are still available, reserve, for the customer, the goods in the electronic order that are still available.

The executable instructions may further cause the computer system to: generate icons corresponding to the goods in the electronic order are that are still available; and overlay the icons onto the LIDAR-based virtual map of the store.

In another aspect, a computer-implemented method for inventory mapping may be provided. The method may include, via one or more local or remote processors, sensors, servers, transceivers, and/or LIDAR devices, (1) receiving a customer virtual order form their mobile device; (2) verifying which items are still available for purchase (such as by comparing the virtual order with an up-to-date inventory list and/or with other customer orders arriving near simultaneously); (3) holding or reserving the items currently available for the customer and blocking other orders for the same items; (4) generating a LIDAR-based virtual map of the store with the locations and/or aisles of each available item being graphically depicted (such as by an icon); (5) displaying the LIDAR-based map along with the good icons on the mobile device of the customer (or an employee, such as in the case of curb-side pickup); remotely verifying pickup of the desired goods by the customer (such as via cameras, or good-mounted sensors or shelf-mounted sensors); and/or processing payment from a financial account of the customer. The method may include additional, less, or alternate actions, including those discussed elsewhere herein.

Exemplary System for 3D Generation of a Floor Plan for a Commercial Building

Figure 15:
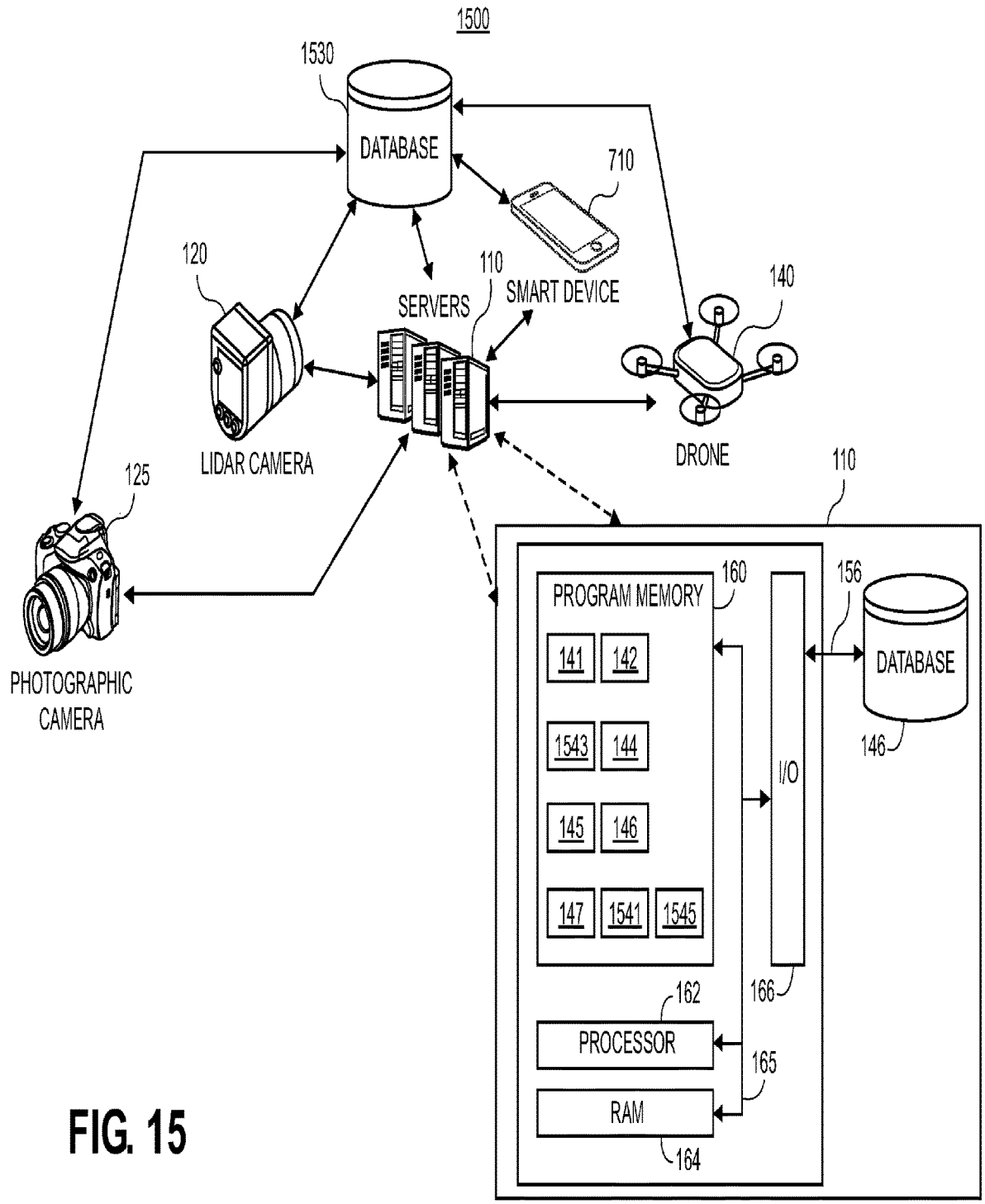
FIG. 15 shows an exemplary computer system for 3D generation of a floor plan for a commercial building.

FIG. 15 shows an exemplary computer system for 3D generation of a floor plan for a commercial building. With reference thereto, each server 110 may include one or more computer processors adapted and configured to execute various software applications and components of the system for 3D generation of a floor plan for a commercial building. In particular, the server 110 may include commercial building designer 1541 (located, e.g., on program memory 160).

In some embodiments, the commercial building designer 1541 comprises a machine learning algorithm for 3D generation of a floor plan for a commercial building. Exemplary types of buildings include office buildings, stores, warehouses, etc. However, the machine learning algorithm may provide 3D generation of a floor plan for a commercial building of any kind.

The machine learning algorithm may be trained using preexisting data (e.g., from database 1530, or database 146, etc.). The preexisting data may include general data of commercial building layouts, 3D models of floor plans, 3D models of floor plans of a specific company, data of how a floor plan effects a company's efficiency or profits, etc. In some embodiments, this preexisting data is gathered from websites or from databases of individual companies. In some embodiments, the preexisting data may be generated from various devices illustrated in FIG. 15 (e.g., LIDAR camera 120, photographic camera 125, drone 140, smart device 710, etc.); for instance, the data gathered from these devices may be used to build 3D models of floor plans which are stored in database 1530. Furthermore, the machine learning algorithm may be trained based upon knowledge of correlations between floorplans and a company's efficiency or profits.

Furthermore, the machine learning algorithm may create a profile for a particular company. The profile may be based upon, for instance, floor plans in other buildings of the company. In this way, the system may generate a recommended floor plan in a style that may be preferred by the company. The profile may be created as part of the training phase.

The machine learning algorithm may be used to analyze any or all of the data held by servers 110 and/or database 1530. The machine learning algorithm may be a supervised learning algorithm, employ decision trees, make use of an artificial neural network, make use of Bayesian statistical analysis, or combinations thereof. In this regard, a processor or a processing element may be trained using supervised or unsupervised machine learning, and the machine learning algorithm may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs. In some embodiments, the machine learning algorithm is a convolutional neural network (CNN); in some embodiments, the machine learning algorithm is a deep neural network (DNN); in some embodiments, the machine learning algorithm is a recurrent neural network (RNN). It is advantageous to use machine learning algorithms that are particularly adept at finding patterns (e.g., CNNs).

Although the exemplary system 1500 is illustrated to include one LIDAR camera 120, one drone 140, and one group of servers 110 (FIG. 15 is illustrated to show three servers 110, but it should be understood that the server(s) 110 may be one or more server(s)), it should be understood that different numbers LIDAR camera 120, drone 140, servers 110, and/or any of the other elements shown in FIG. 15 may be utilized. For instance, the system 1500 may include any number of servers 110 and hundreds of mobile LIDAR cameras 120 or drones 140. Furthermore, the database storage or processing performed by the one or more servers 110 may be distributed among a plurality of servers 110 in an arrangement known as "cloud computing." This configuration may provide various advantages, such as enabling near real-time uploads and downloads of information as well as periodic uploads and downloads of information.

The server 110 may have a controller 155 that is operatively connected to the database 146 via a link 156. It should be noted that, while not shown, additional databases may be linked to the controller 155 in a known manner. For instance, separate databases may be used for storing different types of information and/or making different calculations. The controller 155 may include a program memory 160, a processor 162 (which may be called a microcontroller or a microprocessor), a random-access memory (RAM) 164, and an input/output (I/O) circuit 166, all of which may be interconnected via an address/data bus 165. It should be appreciated that although only one microprocessor 162 is shown, the controller 155 may include multiple microprocessors 162.

Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for instance.

The server 110 may further include a number of software applications stored in a program memory 160. The various software applications on the server 110 may include: a LIDAR data monitoring application 141 for receiving information from LIDAR camera 120; a drone data monitoring application 142 for monitoring drone data; a database data receiving application 1543 for receiving data from a database such as database 1530; camera data receiving application 144 for receiving camera data; a 3D model builder/modifier 145 for building and modifying a 3D model (e.g., of a commercial building with a commercial inventory etc.); a display application 146 for displaying a representation of the 3D model; a navigation input receiver 147 for receiving navigation input; a commercial building designer 1541 for generating a design for a commercial building, such as a floor plan of a commercial building; and/or a directions providing application 1545 for providing directions, such as directions to an object in a commercial building. The various software applications may be executed on the same computer processor or on different computer processors.

Furthermore, in the exemplary system of FIG. 15, the servers 110 are shown sending and receiving information with LIDAR camera 120. The gathered LIDAR data may be analyzed to determine the dimensions of an object (e.g., length, width, height, curvature, etc.) and/or the interior of a commercial building.

The LIDAR data may also be used to determine interior and/or exterior dimensions of the commercial building. For instance, interior dimensions of hallways, offices, meeting rooms, etc. may be measured by the LIDAR data. The LIDAR data may be used to create a partial or complete floor plan and/or 3D model of the commercial building. Furthermore, 3D point cloud(s) may be created from the LIDAR data. The LIDAR camera 120 may be operated by any human or machine.

In some embodiments, the LIDAR camera 120 may be operated by the owner of a company and/or commercial building. For instance, an individual who owns both a company and a commercial building that the company operates in may wish to improve the company's efficiency by rearranging office space in the commercial building. In accordance with the techniques described herein, the individual may operate LIDAR camera 120 to create a 3D model of a floor of the commercial building. The system, using a trained machine learning algorithm, may then provide suggestions about how to rearrange the office space on the floor to improve efficiency and/or profits.

The LIDAR data may be sent to the servers 110 by any method. For instance, the LIDAR data may be sent to the servers 110 directly from the LIDAR camera 120 via the internet. In another example, the LIDAR data may be transferred from the LIDAR camera 120 to a computer (via, e.g., a cable, a USB device, or any other means), and then sent from the computer to the servers 110 by any methods (e.g., sent by the internet, by Ethernet connection, or so forth).

The servers 110 also gather data from other sources. For instance, the servers 110 may gather data from photographic camera 125 (e.g., an optical instrument used for photography or to record images, etc.). In some embodiments, the camera 125 is a camera on an individual's smartphone. The camera data gathered by camera 125 includes color data, pixel data, and so forth.

Moreover, the servers 110 may also gather data from preexisting sources that have data on the commercial building and/or company. For instance, data may be gathered from public records, property deeds, government records, websites, previous insurance claims, and so forth. In some embodiments, this data is gathered from database 1530.

The servers 110 also gather data from a drone 140. Such data may include data from a camera on the drone, a LIDAR camera on the drone, radio detection and ranging (RADAR) data gathered by the drone, global positioning system (GPS) data gathered by the drone, information from an infrared camera of the drone, and so forth.

Figure 16:
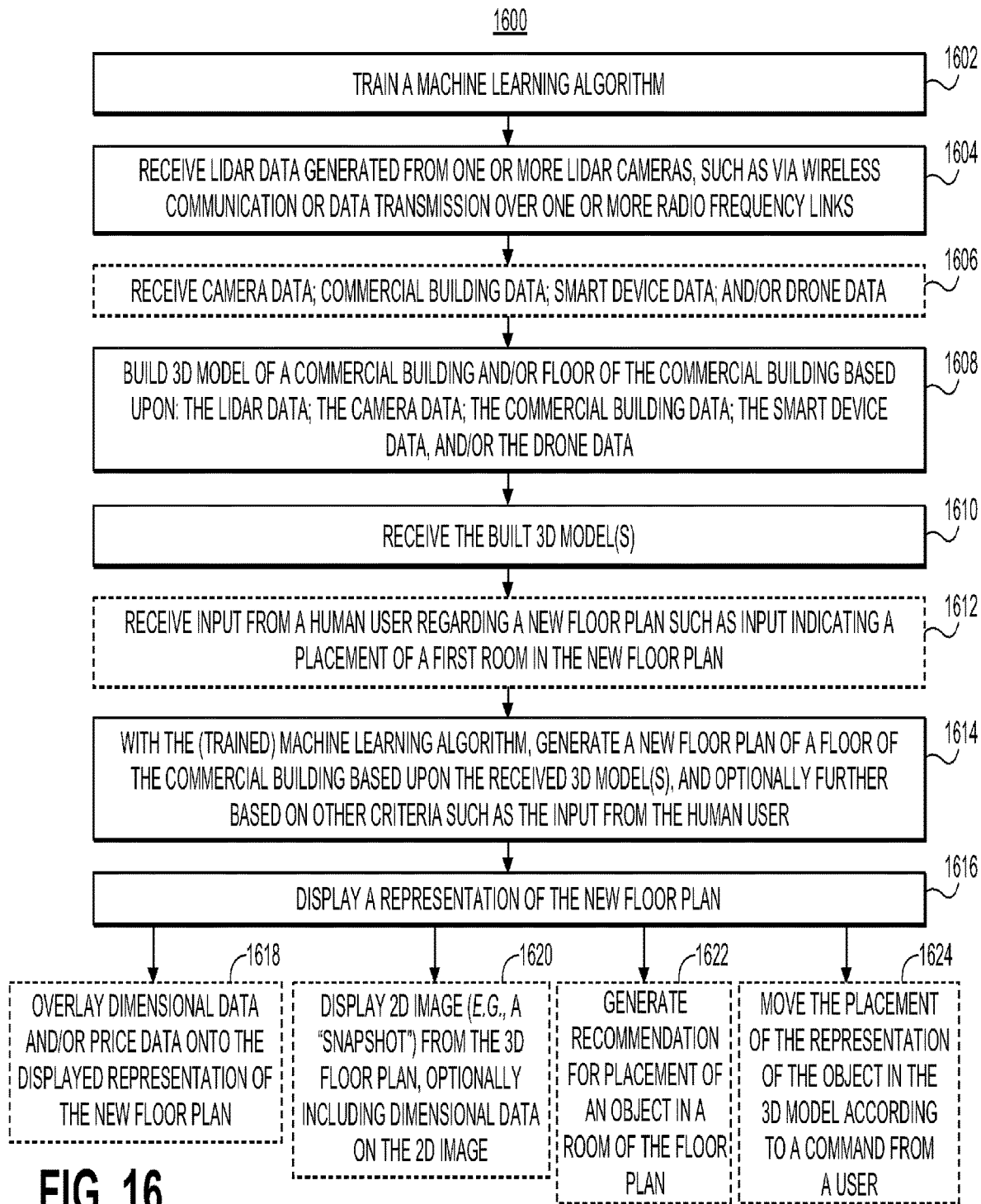
FIG. 16 shows a flowchart of an exemplary computer-implemented method 3D generation of a floor plan for a commercial building.

Exemplary Computer-Implemented Method for 3D Generation of a Floor Plan for a Commercial Building FIG. 16 shows a flowchart of an exemplary computer-implemented method 1600 for viewing potential placement of an object in a room. With reference thereto, at optional step 1602, as described above, the system may train a machine learning algorithm, such as a machine learning algorithm comprised on commercial building designer 1541.

At step 1604, LIDAR data (e.g., from LIDAR camera 120) is received, such as via wireless communication or data transmission over one or more radio frequency links, by server 110. In some embodiments, the LIDAR data is transferred to the servers 110 from the LIDAR camera 120 via a physical memory device.

At optional step 1606, the server 110 receives any of: camera data from camera 125; smart device data from smart devices 710; data from database 1530; and/or drone data from drone 140.

At step 1608, the system builds (e.g., with 3D model builder/modifier 145) a 3D model of a commercial building and/or floor of the commercial building based upon: the LIDAR data; the camera data; the commercial building data; the smart device data, and/or the drone data.

At step 1610, the commercial building designer 1541 receives the 3D model of a commercial building and/or floor of the commercial building (e.g., from the 3D model builder/modifier 145, or from another source such as database 1530 or database 146).

At optional step 1612, input from a human user is received regarding a new floor plan. For instance, a user may know that she will place a particular office (or any other kind of room such as a meeting room, kitchen, etc.) in a particular location on a floor; the user may then input the location of this office, and the system will then create the new floor plan based upon the input location of this office. In other words, the user may input the first part of a floor plan, and the system will fill in the rest.

At step 1614, using the (trained) machine learning algorithm, a new floor plan of a floor of the commercial building is generated. The new floor plan may be based upon the received 3D model(s), and optionally further based upon other criteria such as the input from the human user received at step 1612. The new floor plan may comprise changes to an existing floor plan that improve company efficiency and/or profits (e.g., a change to office locations, or a change to a layout of a meeting room).

At step 1616, a representation of the new floor plan is displayed.

At optional step 1618, dimensional data may be displayed. For instance, dimensional data of room(s) in the floor plan may be overlaid onto the displayed representation of the new floor plan. Additionally or alternatively, dimensional data of an object (e.g., table, desk, electronic equipment, etc.) may be displayed. In some embodiments, the dimensional data may be determined from any of the LIDAR data, the camera data, the smart device data, the database data (e.g., from database 1530) and/or the drone data.

At optional step 1620, a 2D image (e.g., a snapshot from a 3D floor plan) is displayed. The 2D image may be displayed based upon a command from a human user. The displayed 2D image may include dimensional data, such as the dimensions mentioned above with respect to step 1618.

At optional step 1622, the system generates a recommendation for placement of an object in a room of the floorplan. In some embodiments, as mentioned above, the recommendation may be provided by a machine learning algorithm of commercial building designer 1541.

At optional step 1624, a representation of an object in the floor plan is moved according to a command from a human user. For instance, a user may be considering where to place electronic equipment, such as a monitor, in a conference room, and may use this option to consider or visualize different placements of the electronic equipment.

Exemplary System for 3D Navigation of an Interior of a Building

Figure 17:
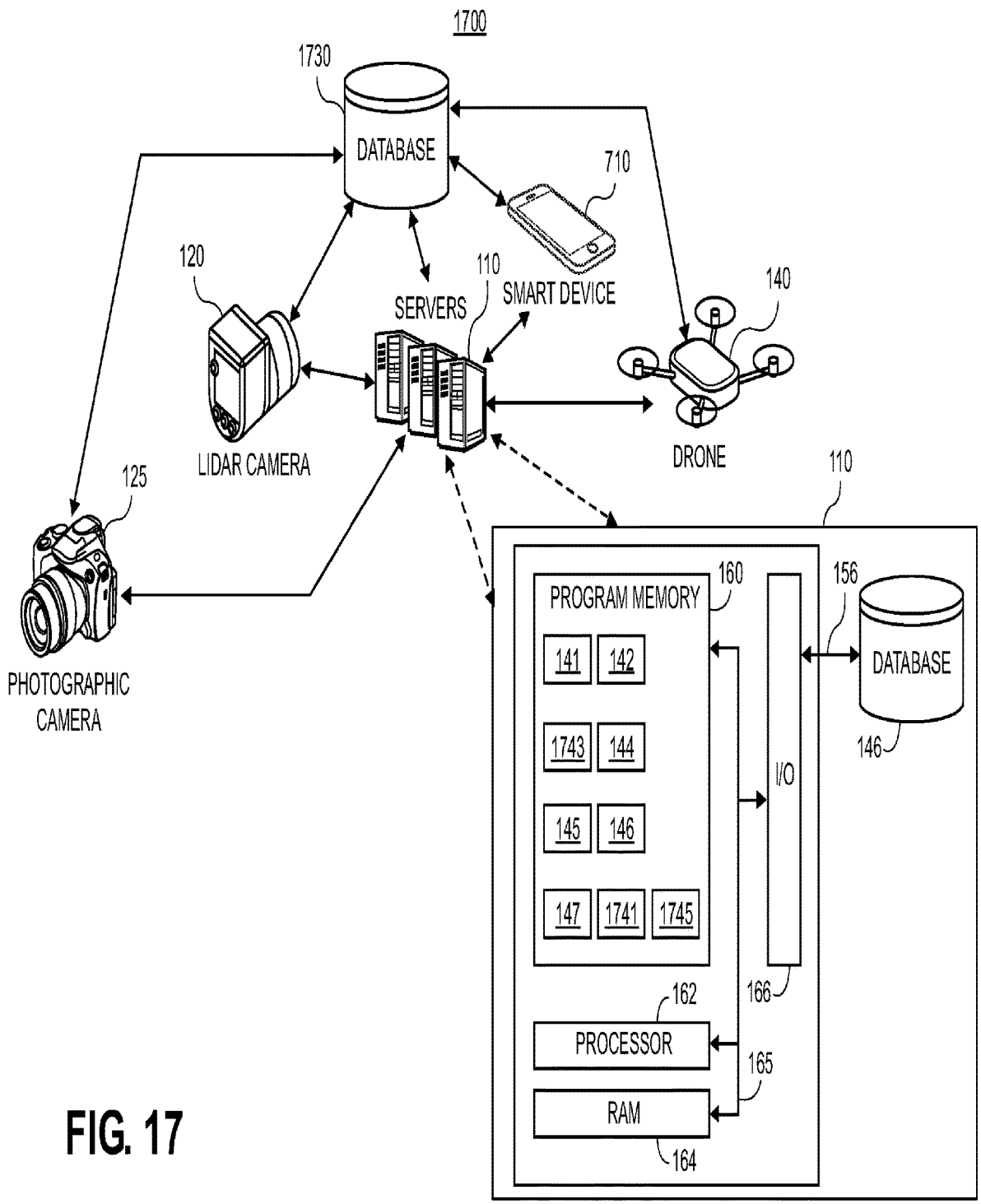
FIG. 17 shows an exemplary computer system for 3D navigation of an interior of a building.

FIG. 17 shows an exemplary computer system for navigation of an interior of a building. With reference thereto, each server 110 may include one or more computer processors adapted and configured to execute various software applications and components of the system for 3D navigation of an interior of a building.

In some embodiments, the system receives a 3D model of a building. The building may be any kind of building (e.g., an office building, a grocery or any other kind of store, a warehouse, etc.). In some embodiments, the system provides, to a user, navigation instructions for navigating to a room of the building, such as an office, a conference room, a kitchen, or a refrigeration room.

In some embodiments, the system provides navigation instructions to a commercial item in the building, such as a grocery item (e.g., eggs, milk, yogurt, bread, a particular kind of spice, etc.). In some embodiments, a user inputs a list of commercial items (e.g., a grocery list), and the system determines a most efficient (e.g., a most distance-efficient, or a most time-efficient route) to obtain all of the items on the list.

With reference to FIG. 15, the server 110 may have a controller 155 that is operatively connected to the database 146 via a link 156. It should be noted that, while not shown, additional databases may be linked to the controller 155 in a known manner. For instance, separate databases may be used for storing different types of information and/or making different calculations. The controller 155 may include a program memory 160, a processor 162 (which may be called a microcontroller or a microprocessor), a random-access memory (RAM) 164, and an input/output (I/O) circuit 166, all of which may be interconnected via an address/data bus 165. It should be appreciated that although only one microprocessor 162 is shown, the controller 155 may include multiple microprocessors 162.

Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for instance.

The server 110 may further include a number of software applications stored in a program memory 160. The various software applications on the server 110 may include: a LIDAR data monitoring application 141 for receiving information from LIDAR camera 120; a drone data monitoring application 142 for monitoring drone data; a database data receiving application 1743 for receiving data from a database such as database 1730; camera data receiving application 144 for receiving camera data; a 3D model builder/modifier 145 for building and modifying a 3D model of a building; a display application 146 for displaying a representation of the 3D model; a navigation input receiver 147 for receiving navigation input; a navigation calculator 1741 for calculating navigation instructions; and/or a directions providing application 1745 for providing directions. The various software applications may be executed on the same computer processor or on different computer processors.

Furthermore, in the exemplary system of FIG. 17, the servers 110 are shown sending and receiving information with LIDAR camera 120. The gathered LIDAR data may be analyzed to determine the interior or exterior dimensions of a building and/or object(s) in the building. For instance, interior dimensions of hallways, offices, meeting rooms, store aisles, etc. may be measured by the LIDAR data. The LIDAR data may be used to create a partial or complete floor plan and/or 3D model of the commercial building. Furthermore, 3D point cloud(s) may be created from the LIDAR data. The LIDAR camera 120 may be operated by any human or machine.

The LIDAR data may be sent to the servers 110 by any method. For instance, the LIDAR data may be sent to the servers 110 directly from the LIDAR camera 120 via the internet. In another example, the LIDAR data may be transferred from the LIDAR camera 120 to a computer (via, e.g., a cable, a USB device, or any other means), and then sent from the computer to the servers 110 by any methods (e.g., sent by the internet, by Ethernet connection, or so forth).

The servers 110 also gather data from other sources. For instance, the servers 110 may gather data from photographic camera 125 (e.g., an optical instrument used for photography or to record images, etc.). In some embodiments, the camera 125 is a camera on an individual's smartphone. The camera data gathered by camera 125 includes color data, pixel data, and so forth.

Moreover, the servers 110 may also gather data from preexisting sources that have data on the building or objects in the building. For instance, data may be gathered from a company's own records, public records, property deeds, government records, websites, previous insurance claims, and so forth. In some embodiments, this data is gathered from database 1730 and/or database 146.

The servers 110 also gather data from a drone 140. Such data may include data from a camera on the drone, a LIDAR camera on the drone, radio detection and ranging (RADAR) data gathered by the drone, global positioning system (GPS) data gathered by the drone, information from an infrared camera of the drone, and so forth.

Although the exemplary computer system 1700 is illustrated to include one LIDAR camera 120, one drone 140, and one group of servers 110 (FIG. 17 is illustrated to show three servers 110, but it should be understood that the server(s) 110 may be one or more server(s)), it should be understood that different numbers LIDAR camera 120, drone 140, servers 110, and/or any of the other elements shown in FIG. 17 may be utilized. For instance, the system 1700 may include any number of servers 110 and hundreds of mobile LIDAR cameras 120 or drones 140. Furthermore, the database storage or processing performed by the one or more servers 110 may be distributed among a plurality of servers 110 in an arrangement known as "cloud computing." This configuration may provide various advantages, such as enabling near real-time uploads and downloads of information as well as periodic uploads and downloads of information.

A machine learning algorithm may be used to analyze any or all of the data held by servers 110 and/or database 1730. The machine learning algorithm may be a supervised learning algorithm, employ decision trees, make use of an artificial neural network, make use of Bayesian statistical analysis, or combinations thereof. In this regard, a processor or a processing element may be trained using supervised or unsupervised machine learning, and the machine learning algorithm may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs. In some embodiments, the machine learning algorithm is a convolutional neural network (CNN); in some embodiments, the machine learning algorithm is a deep neural network (DNN); in some embodiments, the machine learning algorithm is a recurrent neural network (RNN). It is advantageous to use machine learning algorithms that are particularly adept at finding patterns (e.g., CNNs).

The machine learning algorithm may be trained using preexisting data (e.g., from database 1730, or database 146, etc.). The preexisting data may include general data of a company's inventory, commercial building layouts, 3D models of floor plans, 3D models of floor plans of a specific company, data of how a floor plan effects a company's efficiency or profits, etc. In some embodiments, this preexisting data is gathered from websites or from databases of individual companies. In some embodiments, the preexisting data may be generated from various devices illustrated in FIG. 17 (e.g., LIDAR camera 120, photographic camera 125, drone 140, smart device 710, etc.); for instance, the data gathered from these devices may be used to build 3D models of floor plans which are stored in database 1730.

Figure 18:
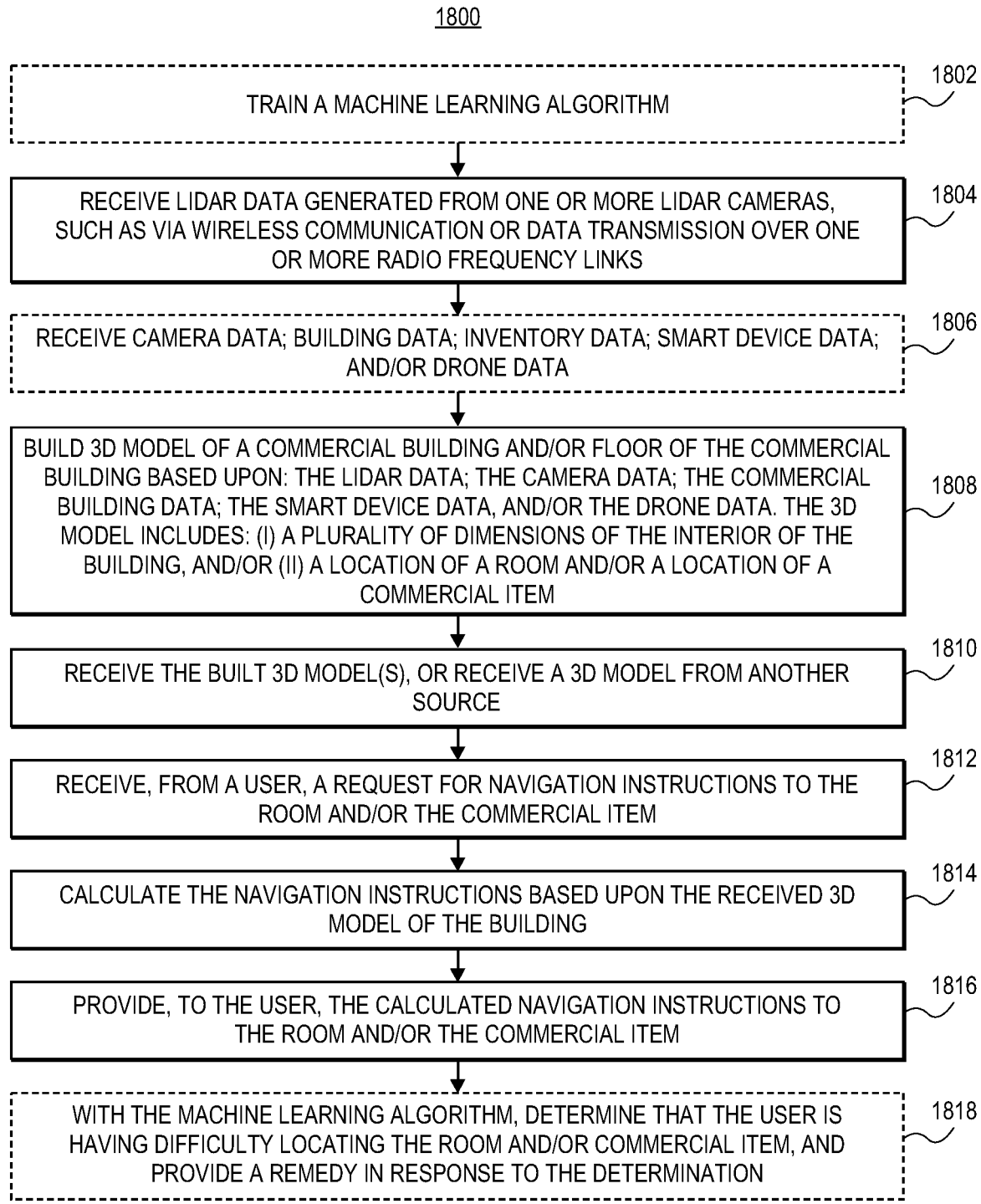
FIG. 18 shows a flowchart of an exemplary computer-implemented method for 3D navigation of an interior of a building.

Exemplary Computer-Implemented Method for 3D Navigation of an Interior of a Building FIG. 18 shows a flowchart of an exemplary computer-implemented method 1800 for viewing potential placement of an object in a room. With reference thereto, at optional step 1802, the system may train a machine learning algorithm, such as a machine learning algorithm used to determine that a user is having difficulty locating a room and/or an item, and as will be described below with respect to step 1818.

At step 1804, LIDAR data (e.g., from LIDAR camera 120) is received, such as via wireless communication or data transmission over one or more radio frequency links, by server 110. In some embodiments, the LIDAR data is transferred to the servers 110 from the LIDAR camera 120 via a physical memory device.

At optional step 1806, the server 110 receives any of: camera data from camera 125; building data (including, e.g., dimensions of the building, a 3D model of the building, etc.), inventory data (e.g., a list of commercial items such as groceries along with their locations in the building, etc.), smart device data from smart devices 710; data from database 1730; and/or drone data from drone 140.

At step 1808, the system builds (e.g., with 3D model builder/modifier 145) a 3D model of a commercial building and/or floor of the commercial building based upon: the LIDAR data, and/or any of the data received in step 1806. The 3D model includes: (i) a plurality of dimensions of the interior of the building, and/or (ii) a location of a room and/or a location of a commercial item. In some embodiments, the room is an office, a conference room, a kitchen, or a refrigeration room. In some embodiments, the commercial item is a grocery item, a medical item, a furniture item, or an electronics item.

At step 1810, the navigation calculator 1741 receives the 3D model of the building (e.g., from the 3D model builder/modifier 145, or from another source, such as database 1730 or database 146). In some embodiments, the 3D model is simply received from the building data held in database 1730 or database 146, and thus does not need to be built by the 3D model builder/modifier 145.

At step 1812, a request is received from a user to provide navigation instructions to the room and/or the commercial item. In some embodiments, the request includes a list of commercial items, such as a grocery list.

At step 1814, the navigation instructions are calculated based upon the received 3D model of the building. In some embodiments, the navigation instructions include a height level of the commercial item. For instance, a grocery item may be indicated as being on the third shelf from the ground, or as a certain geometric distance from the ground. In some embodiments, the navigation instructions also include an aisle number that the commercial item is located at.

At step 1816, the user is provided with the calculated navigation instructions to the room and/or the commercial item. If the request includes a list of commercial items, the system may determine a most efficient (e.g., a most distance-efficient, or a most time-efficient route) to obtain all of the items on the list. In some embodiments, a most time-efficient route is calculated based upon: (i) the locations of items on the list, and/or (ii) how difficult it is to navigate to an item due to obstructions, such as crowds (e.g., data from camera 125 indicates that a particular aisle is crowded, which the system takes into account when calculating the navigation instructions).

In some embodiments, the provided navigation instructions are overlaid onto a pair of computerized glasses.

At optional step 1818, the machine learning algorithm (optionally trained in step 1802) determines if the user is having difficulty locating the room and/or commercial item. If so, the system provides a remedy in response to the determination. For instance, the system may provide the user with navigation instructions to a store employee. Additionally or alternatively, the system may alert the store employee that the customer is having difficulty locating the item. Additionally or alternatively, the system may provide alternative or more detailed navigation instructions to an item, such as providing a shelf level or height off the ground that an item is located at.

The machine learning algorithm may be trained (e.g., at step 1802) based upon any data, such as data held by database 1730, or database 146. For instance, the machine learning algorithm may be trained based upon 3D models of buildings, navigation instructions to a room and/or commercial item, data of how long it takes a user to find a room and/or commercial item, etc.

The determination that the user is having difficulty locating the room and/or commercial item may be added to a database along with other information correlated with the determination (e.g., time spent searching for the room/item, other information about the user, etc.). This information may then be used to determine (e.g., with a machine learning algorithm) which rooms and/or items are difficult to locate.

Exemplary Functionality: 3D Home Model for Visualizing Proposed Changes to Home

In another aspect, computer-implemented method for visualizing proposed changes to a home may be provided. The method may include, via one or more processors, sensors, servers, and/or transceivers: (1) receiving light detection and ranging (LIDAR) data generated from a LIDAR camera; (2) measuring a plurality of dimensions of a room of the home based upon processor analysis of the LIDAR data; (3) building a 3D model of the room based upon the measured plurality of dimensions; (4) receiving an indication of a proposed change to the room; (5) modifying the 3D model to include the proposed change to the room; and/or (6) displaying a representation of the modified 3D model. The proposed changed to the room may comprise an addition or removal of a wall. Additionally or alternatively, the proposed changed to the room may comprise a remodel of a kitchen or bathroom. In some embodiments, the displaying of the representation of the modified 3D model comprises displaying a 2D image generated from the 3D model. The method may include additional, less, or alternate actions, including those discussed elsewhere herein.

For instance, the method may further include, via the one or more processors, transceivers, sensors, and/or servers, receiving navigation input; wherein the displaying the representation of the modified 3D model comprises visually navigating through the 3D model based upon the received navigation input. The proposed changed to the room may comprise a repair to at least one of a window or a wall.

The building of the 3D model may further include building the 3D model further based upon preexisting home structural data.

The method may further include, via the one or more processors, transceivers, sensors, and/or servers, receiving camera data including color data; and the building of the 3D model may further include: deriving dimensions of a wall based upon processor analysis of the LIDAR data; deriving a color of the wall based upon processor analysis of the camera data; and/or filling, into the 3D model, the wall including the derived dimensions of the wall and the derived color of the wall.

The proposed changed to the room may include an addition or removal of a skylight. The proposed change to a room may be received from a computing device of a human user, the computing device comprising: a computer, a smartphone, or a tablet.

In another aspect, a computer system configured to visualize proposed changes to a home may be provided. The computer system may include one or more processors, sensors, servers, and/or transceivers configured to: (1) receive light detection and ranging (LIDAR) data generated from a LIDAR camera; (2) measure a plurality of dimensions of a room of the home based upon processor analysis of the LIDAR data; (3) build a 3D model of the room based upon the measured plurality of dimensions; (4) receive an indication of a proposed change to the room; (5) modify the 3D model to include the proposed change to the room; and/or (6) display a representation of the modified 3D model. The proposed changed to the room may include an addition or removal of a wall. The computer system may include additional, less, or alternate functionality, including that discussed elsewhere herein.

For instance, the computer system may be further configured, via the one or more processors, sensors, servers, and/or transceivers, to display a 2D image generated from the 3D model. The system may further be configured, via the one or more processors, sensors, servers, and/or transceivers, to: receive navigation input; and display the representation of the modified 3D model by visually navigating through the 3D model based upon the received navigation input.

The system may further be configured, via the one or more processors, sensors, servers, and/or transceivers, to: receive camera data including color data; and build the 3D model by: deriving dimensions of a wall based upon processor analysis of the LIDAR data; deriving a color of the wall based upon processor analysis of the camera data; and filling, into the 3D model, the wall including the derived dimensions of the wall and the derived color of the wall.

In yet another aspect, a computer system configured to visualize proposed changes to a home may be provided. The computer system may include: one or more processors; and a program memory coupled to the one or more processors and storing executable instructions that when executed by the one or more processors cause the computer system to: receive light detection and ranging (LIDAR) data generated from a LIDAR camera; measure a plurality of dimensions of a room of the home based upon processor analysis of the LIDAR data; build a 3D model of the room based upon the measured plurality of dimensions; receive an indication of a proposed change to the room; modify the 3D model to include the proposed change to the room; and/or display a representation of the modified 3D model. The proposed changed to the room may be an addition or removal of a wall. The computer system may include additional, less, or alternate functionality, including that discussed elsewhere herein.

For instance, the executable instructions further cause the computer system to display a 2D image generated from the 3D model. The executable instructions may further cause the computer system to: receive navigation input; and display the representation of the modified 3D model by visually navigating through the 3D model based upon the received navigation input.

The executable instructions may further cause the computer system to: receive camera data including color data; and build the 3D model by: deriving dimensions of a wall based upon processor analysis of the LIDAR data; deriving a color of the wall based upon processor analysis of the camera data; and filling, into the 3D model, the wall including the derived dimensions of the wall and the derived color of the wall.

Exemplary Functionality: 3D Home Model for Representation of Property

In another aspect, a computer-implemented method for representation of a home may be provided. The method may include, via one or more processors, sensors, servers, and/or transceivers: (1) receiving light detection and ranging (LIDAR) data generated from a LIDAR camera; (2) measuring a plurality of dimensions of the home based upon processor analysis of the LIDAR data; (3) building a 3D model of the home based upon the measured plurality of dimensions; and/or (4) displaying a representation of the 3D model by visually navigating through the 3D model. The method may include additional, less, or alternate actions, including those discussed elsewhere herein.

For instance, the method may further include, via the one or more processors, transceivers, sensors, and/or servers, receiving navigation input via wireless communication or data transmission over one or more radio frequency links; wherein the visual navigation through the 3D model is based upon the received navigation input.

The method may further include, via the one or more processors, transceivers, sensors, and/or servers: displaying an arrow on the displayed 3D model; and receiving navigation input via wireless communication or data transmission over one or more radio frequency links, the navigation input comprising a user selection of the arrow; wherein the visual navigation through the 3D model is based upon the received navigation input.

The visual navigation through the 3D model may be based upon a default navigation generated by a machine learning algorithm. The measured plurality of dimensions may include a measured width of a wall; and the displaying the representation of the 3D model may further include overlaying a numerical value of the width of the wall onto a visual representation of the wall in the displayed 3D model.

The measured plurality of dimensions may include a measured height and width of an object; and the displaying the representation of the 3D model may further include overlaying numerical values of the height and width of the object onto a visual representation of the object in the displayed 3D model.

The method may further include, via the one or more processors, transceivers, sensors, and/or servers: receiving, via wireless communication or data transmission over one or more radio frequency links, a user selection of an object displayed in the displayed 3D model; and displaying a 2D image of the selected object including displaying numerical values of a height and a width of the object.

The method may further include, via the one or more processors, transceivers, sensors, and/or servers: receiving camera data including color data; wherein the 3D model is built further based upon the color data.

The method may further include, via the one or more processors, transceivers, sensors, and/or servers, receiving camera data including color data; wherein the building of the 3D model may further include: deriving dimensions of a wall based upon processor analysis of the LIDAR data; deriving a color of the wall based upon processor analysis of the camera data; and filling, into the 3D model, the wall including the derived dimensions of the wall and the derived color of the wall.

In another aspect, a computer system configured for 3D representation of a home may be provided. The computer system may include one or more processors, sensors, servers, and/or transceivers configured to: (1) receive light detection and ranging (LIDAR) data generated from a LIDAR camera; (2) measure plurality of dimensions of the home based upon processor analysis of the LIDAR data; (3) build a 3D model of the home based upon the measured plurality of dimensions; and/or (4) display a representation of the 3D model by visually navigating through the 3D model. The computer system may include additional, less, or alternate functionality, including that discussed elsewhere herein.

For instance, the computer system may be further configured to, via the one or more processors, sensors, servers, and/or transceivers: display an arrow on the displayed 3D model; receive navigation input via wireless communication or data transmission over one or more radio frequency links, the navigation input comprising a user selection of the arrow; and base the visual navigation through the 3D model upon the received navigation input.

The measured plurality of dimensions may include a measured width of a wall; and the computer system may be further configured to, via the one or more processors, sensors, servers, and/or transceivers, display the representation of the 3D model by overlaying a numerical value of the width of the wall onto a visual representation of the wall in the displayed 3D model.

The computer system may be, further configured to, via the one or more processors, sensors, servers, and/or transceivers: receive, via wireless communication or data transmission over one or more radio frequency links, a user selection of an object displayed in the displayed 3D model; and display a 2D image of the selected object including displaying numerical values of a height and a width of the object.

In yet another aspect, a computer system configured for 3D representation of a home may be provided. The computer system may include: one or more processors; and a program memory coupled to the one or more processors and storing executable instructions that when executed by the one or more processors cause the computer system to: receive light detection and ranging (LIDAR) data generated from a LIDAR camera; measure plurality of dimensions of the home based upon processor analysis of the LIDAR data; build a 3D model of the home based upon the measured plurality of dimensions; and/or display a representation of the 3D model by visually navigating through the 3D model. The computer system may include additional, less, or alternate functionality, including that discussed elsewhere herein.

For instance, the executable instructions may further cause the computer system to receive navigation input via wireless communication or data transmission over one or more radio frequency links; and the visual navigation through the 3D model is based upon the received navigation input.

The executable instructions may further cause the computer system to: display an arrow on the displayed 3D model; receive navigation input via wireless communication or data transmission over one or more radio frequency links, the navigation input comprising a user selection of the arrow; and base the visual navigation through the 3D model upon the received navigation input.

The measured plurality of dimensions may include a measured width of a wall; and the executable instructions may further cause the computer system to display the representation of the 3D model by overlaying a numerical value of the width of the wall onto a visual representation of the wall in the displayed 3D model.

The measured plurality of dimensions may include a measured height and width of an object; and the executable instructions may further cause the computer system to display the representation of the 3D model by overlaying numerical values of the height and width of the object onto a visual representation of the object in the displayed 3D model.

The executable instructions may further cause the computer system to: receive, via wireless communication or data transmission over one or more radio frequency links, a user selection of an object displayed in the displayed 3D model; and display a 2D image of the selected object including displaying numerical values of a height and a width of the object.

The executable instructions may further cause the computer system to: receive camera data including color data; and build the 3D model further based upon the color data.

Exemplary Functionality: 3D Model for Viewing Potential Placement of an Object

In another aspect, a computer-implemented method for viewing potential placement of an object may be provided. The method may include, via one or more processors, sensors, servers, and/or transceivers: (1) receiving light detection and ranging (LIDAR) data generated from a LIDAR camera; (2) measuring a plurality of dimensions of the object based upon processor analysis of the LIDAR data; (3) receiving or generating a 3D model of a room, the 3D model of the room including dimensional data of the room; (4) inserting a representation of the object into the 3D model of the room based upon processor analysis of: (i) the plurality of dimensions of the object measured from the LIDAR data; and (ii) the dimensional data of the room; and/or (5) displaying the 3D model of the room with the inserted representation of the object. The method may include additional, less, or alternate actions, including those discussed elsewhere herein.

The object may be a piece of furniture comprising one of: (1) a chair; (2) a couch; (3) a table; (4) a desk; and/or (5) a lamp. The object may be an appliance comprising one of: (1) a refrigerator; (2) a stove; (3) a microwave; (4) a dishwasher; (5) an air fryer; (6) a laundry machine; or (7) a dryer.

The displaying of the 3D model of the room with the inserted representation of the object may include displaying the 3D model of the room with the inserted representation of the object on a pair of glasses.

In some embodiments, the object may be a first object, and the LIDAR data may be first LIDAR data; and the computer-implemented may further include, via the one or more processors, transceivers, sensors, and/or servers: receiving second LIDAR data generated from the LIDAR camera; measuring a plurality of dimensions of a second object based upon processor analysis of the second LIDAR data; and replacing the representation of the first object with a representation of the second object in the 3D model of the room.

The displaying of the 3D model of the room with the inserted object may include displaying a price of the object.

The method may further include, via the one or more processors, transceivers, sensors, and/or servers: determining that it is not possible to bring the object into the room based upon processor analysis of: (i) dimensional data of a door of the room, and (ii) the plurality of dimensions of the object measured from the LIDAR data; wherein the displaying of the 3D model of the room with the inserted representation of the object further comprises displaying a warning indicating that it is not possible to bring the object into the room.

The object may be an object of a plurality of objects, and the computer-implemented method may further include, via the one or more processors, transceivers, sensors, and/or servers: measuring dimensional data of each object of the plurality of objects based upon processor analysis of received LIDAR data; presenting, to a user, a list of objects of the plurality of objects, the list including a price of each object of the plurality of objects; receiving, from the user, a selection from the list of objects; and displaying the 3D model of the room with a representation of the selected object.

The measured plurality of dimensions may include a measured height and width of an object; and the displaying the representation of the 3D model may further include overlaying numerical values of the height and width of the object onto the representation of the object in the displayed 3D model.

The method may further include, via the one or more processors, transceivers, sensors, and/or servers: receiving camera data including color data and transparency data of the object; wherein the representation of the object is built based upon the color data and the transparency data of the object.

The method may further include, via the one or more processors, transceivers, sensors, and/or servers: changing a placement of the inserted representation of the object in the 3D model based upon a command from a user.

In another aspect, a computer system configured to display a potential placement of an object may be provided. The computer system may include one or more processors, sensors, servers, and/or transceivers configured to: (1) receive light detection and ranging (LIDAR) data generated from a LIDAR camera; (2) measure a plurality of dimensions of the object based upon processor analysis of the LIDAR data; (3) receive or generate a 3D model of a room, the 3D model of the room including dimensional data of the room; (4) insert a representation of the object into the 3D model of the room based upon processor analysis of: (i) the plurality of dimensions of the object measured from the LIDAR data; and (ii) the dimensional data of the room; and/or (5) display the 3D model of the room with the inserted representation of the object. The computer system may include additional, less, or alternate functionality, including that discussed elsewhere herein.

For instance, the computer system may further be configured to, via the one or more processors, sensors, servers, and/or transceivers: display, on a pair of glasses, the 3D model of the room with the inserted representation of the object.

The computer system may further be configured to, via the one or more processors, sensors, servers, and/or transceivers: display a price of the object when displaying the 3D model.

The object may be an object of a plurality of objects, and the computer system may be further configured to, via the one or more processors, sensors, servers, and/or transceivers: measure dimensional data of each object of the plurality of objects based upon processor analysis of received LIDAR data; present, to a user, a list of objects of the plurality of objects; receive, from the user, a selection from the list of objects; and display the 3D model of the room with a representation of the selected object.

The measured plurality of dimensions may include a measured height and width of an object; and the computer system may be further configured to, via the one or more processors, sensors, servers, and/or transceivers, display the representation of the 3D model by overlaying numerical values of the height and width of the object onto the representation of the object in the displayed 3D model.

In another aspect, a computer system configured to display a potential placement of an object may be provided. The computer system may include: one or more processors; and a program memory coupled to the one or more processors and storing executable instructions that when executed by the one or more processors cause the computer system to: receive light detection and ranging (LIDAR) data generated from a LIDAR camera; measure a plurality of dimensions of the object based upon processor analysis of the LIDAR data; receive or generate a 3D model of a room, the 3D model of the room including dimensional data of the room; insert a representation of the object into the 3D model of the room based upon processor analysis of: (i) the plurality of dimensions of the object measured from the LIDAR data; and (ii) the dimensional data of the room; and/or display the 3D model of the room with the inserted representation of the object. The computer system may further include additional, less, or alternate functionality, including that discussed elsewhere herein.

For instance, the computer system may further include computerized glasses; wherein the executable instructions further cause the computer system to display the 3D model of the room with the inserted representation of the object on the computerized glasses.

The executable instructions may further cause the computer system to: display a price of the object when displaying the 3D model.

The object may be an object of a plurality of objects, and the executable instructions may further cause the computer system to: measure dimensional data of each object of the plurality of objects based upon processor analysis of received LIDAR data; present, to a user, a list of objects of the plurality of objects; receive, from the user, a selection from the list of objects; and display the 3D model of the room with a representation of the selected object.

Exemplary Functionality: AI Based Recommendations for Object Placement in a Home In another aspect, a computer-implemented method for machine learning based recommendation of object placement may be provided. The method may include, via one or more processors, sensors, servers, and/or transceivers: (1) training a machine learning algorithm based upon preexisting data of object placement in a room; (2) receiving room data comprising dimensional data of a room; (3) receiving object data comprising: (i) dimensional data of an object; (ii) a type of the object; and/or (iii) color data of the object; and/or (4) with the trained machine learning algorithm, generating a recommendation for placement of the object in the room based upon: (i) the received room data, and (ii) the received object data. The method may include additional, less, or alternate actions, including those discussed elsewhere herein.

The object may comprise a furniture piece comprising: a chair; a table; a desk; a couch; or a lamp. The recommendation may be a first recommendation, and the method may further include, via the one or more processors, transceivers, sensors, and/or servers: with trained machine learning algorithm, generating a second recommendation for placement of the object in the room; and presenting, as first and second options, the first and second recommendations to a user.

The method may further include, via the one or more processors, transceivers, sensors, and/or servers: receiving an object placement in the room from a user; and displaying both: (i) a representation of the object placement in the room from the user, and (ii) a representation of the object placement generated by the machine learning algorithm, thereby allowing the user to compare the placements.

The method may further include, via the one or more processors, transceivers, sensors, and/or servers: displaying, on a display, the generated recommendation for placement of the object in the room.

The method may further include, via the one or more processors, transceivers, sensors, and/or servers: receiving a placement of an item from a user in the room; wherein the recommendation for object placement in the room is further based upon the received placement of the item.

The method may further include, via the one or more processors, transceivers, sensors, and/or servers: building a user profile based upon furniture placement in a home of a user; wherein the recommendation for object placement in the room is further based upon the user profile.

The object data may include all of: (i) the dimensional data of the object; (ii) the type of the object; and (iii) the color data of the object.

In some embodiments, the machine learning algorithm may be a convolutional neural network.

The method may further include, via the one or more processors, transceivers, sensors, and/or servers: receiving light detection and ranging (LIDAR) data generated from a LIDAR camera; and measuring a plurality of dimensions of the object based upon processor analysis of the LIDAR data; wherein the object data comprises the dimensional data of the object, and the dimensional data of the object comprises the plurality of dimensions of the object measured based upon the processor analysis of the LIDAR data.

In another aspect a computer system configured for machine learning based recommendation of object placement may be provided. The computer system may include one or more processors, sensors, servers, and/or transceivers configured to: (1) train a machine learning algorithm based upon preexisting data of object placement in a room; (2) receive room data comprising dimensional data of a room; (3) receive object data comprising: (i) dimensional data of an object; (ii) a type of the object; and/or (iii) color data of the object; and/or (4) with the trained machine learning algorithm, generate a recommendation for placement of the object in the room based upon: (i) the received room data, and (ii) the received object data. The computer system may include additional, less, or alternate functionality, including that discussed elsewhere herein.

The recommendation may be a first recommendation, and the system may be further configured to, via the one or more processors, sensors, servers, and/or transceivers: with trained machine learning algorithm, generate a second recommendation for placement of the object in the room; and present, as first and second options, the first and second recommendations to a user.

The computer system may be further configured to, via the one or more processors, sensors, servers, and/or transceivers: receive an object placement in the room from a user; and display both: (i) a representation of the object placement in the room from the user, and (ii) a representation of the object placement generated by the machine learning algorithm, thereby allowing the user to compare the placements.

The computer system may further include: a display; wherein the computer system is further configured to, via the one or more processors, sensors, servers, and/or transceivers: display, on the display, the generated recommendation for placement of the object in the room.

The type of the object may comprise: a chair; a table; a desk; a couch; a lamp; a bookshelf; a picture; or a painting.

In yet another aspect, a computer system configured for machine learning based recommendation of object placement may be provided. The system may include: one or more processors; and a program memory coupled to the one or more processors and storing executable instructions that when executed by the one or more processors cause the computer system to: train a machine learning algorithm based upon preexisting data of object placement in a room; receive room data comprising dimensional data of a room; receive object data comprising: (i) dimensional data of an object; (ii) a type of the object; and/or (iii) color data of the object; and/or with the trained machine learning algorithm, generate a recommendation for placement of the object in the room based upon: (i) the received room data, and (ii) the received object data. The computer system may include additional, less, or alternate functionality, including that discussed elsewhere herein.

The recommendation may be a first recommendation, and wherein the executable instructions may further cause the computer system to: with trained machine learning algorithm, generate a second recommendation for placement of the object in the room; and present, as first and second options, the first and second recommendations to a user.

The executable instructions may further cause the computer system to: receive an object placement in the room from a user; and display both: (i) a representation of the object placement in the room from the user, and (ii) a representation of the object placement generated by the machine learning algorithm.

The executable instructions may further cause the computer system to: build a user profile based upon furniture placement in a home of a user; wherein the recommendation for object placement in the room is further based upon the user profile.

The room data may further include color data of the room, and a window placement in the room.

Exemplary Functionality: 3D Model for Visualization of Landscape Design

In another aspect, a computer-implemented method for visualization of landscape design may be provided. The method may include, via one or more processors, sensors, servers, and/or transceivers: (1) receiving light detection and ranging (LIDAR) data generated from a LIDAR camera; (2) measuring a plurality of dimensions of a landscape based upon processor analysis of the LIDAR data; (3) building a 3D model of the landscape based upon the measured plurality of dimensions, the 3D model including: (i) a structure, and (ii) a vegetation; and/or (4) displaying a representation of the 3D model. The method may include additional, less, or alternate actions, including those discussed elsewhere herein.

The structure may comprise: a patio; a shed; a garage; a fence; or an outside of a room of a house. The vegetation may comprise: a tree; a plant; or a flower. The 3D model may further include a pathway. The structure and the vegetation may be determined based upon processor analysis of the LIDAR data.

The method may further include, via the one or more processors, transceivers, sensors, and/or servers: receiving drone data; wherein the 3D model of the landscape is built further based upon the received drone data.

The method may further include, via the one or more processors, transceivers, sensors, and/or servers: receiving global positioning system (GPS) data; wherein the 3D model of the landscape is built further based upon the received GPS data. The displayed representation of the 3D model may comprise a 2D image of the landscape.

In some embodiments, the LIDAR camera is positioned on the ground; and the method further comprises, via the one or more processors, transceivers, sensors, and/or servers, receiving drone data from a drone, the drone data comprising: (i) radio detection and ranging (RADAR) data gathered by the drone, and (ii) photographic camera data gathered by the drone; wherein the 3D model of the landscape is further built based upon the received drone data.

The method may further include, via the one or more processors, transceivers, sensors, and/or servers: receiving object data from a user; and inputting, into a machine learning algorithm: (i) data of the 3D model of the landscape, and (ii) the received object data to generate a recommendation for placement of the object in the landscape; wherein the object comprises one of: a patio; a shed; a garage; a fence; a tree; a plant; a flower; or a pathway.

The method may further include, via the one or more processors, transceivers, sensors, and/or servers: receiving object data from a user; and inputting, into a machine learning algorithm: (i) data of the 3D model of the landscape, and (ii) the received object data to generate a recommendation for placement of the object in the landscape; wherein the machine learning algorithm comprises: a convolutional neural network (CNN); a deep neural network (DNN); or a recurrent neural network (RNN).

The method may further include, via the one or more processors, transceivers, sensors, and/or servers: determining dimensional data of boundaries of the landscape based upon: (i) preexisting property data from a database, and (ii) the LIDAR data; and overlaying the dimensional data of the boundaries onto the displayed representation of the 3D model.

In another aspect, a computer system configured for visualization of landscape design may be provided. The computer system may include one or more processors, sensors, servers, and/or transceivers configured to: (1) receive light detection and ranging (LIDAR) data generated from a LIDAR camera; (2) measure a plurality of dimensions of a landscape based upon processor analysis of the LIDAR data; (3) build a 3D model of the landscape based upon the measured plurality of dimensions, the 3D model including: (i) a structure, and (ii) a vegetation; and/or (4) display a representation of the 3D model. The computer system may include additional, less, or alternate functionality, including that discussed elsewhere herein.

The computer system may further be configured to, via the one or more processors, sensors, servers, and/or transceivers: receive drone data; and build the 3D model of the landscape further based upon the received drone data.

The computer system may further be configured to, via the one or more processors, sensors, servers, and/or transceivers: receive object data from a user; and input, into a machine learning algorithm: (i) data of the 3D model of the landscape, and (ii) the received object data to generate a recommendation for placement of the object in the landscape; wherein the machine learning algorithm comprises: a convolutional neural network (CNN); a deep neural network (DNN); or a recurrent neural network (RNN).

The computer system may further be configured to, via the one or more processors, sensors, servers, and/or transceivers: determine dimensional data of boundaries of the landscape based upon: (i) preexisting property data from a database, and (ii) the LIDAR data; and overlay the dimensional data of the boundaries onto the displayed representation of the 3D model.

In yet another aspect, a computer system configured for visualization of landscape design may be provided. The computer system may include: one or more processors; and a program memory coupled to the one or more processors and storing executable instructions that when executed by the one or more processors cause the computer system to: receive light detection and ranging (LIDAR) data generated from a LIDAR camera; measure a plurality of dimensions of a landscape based upon processor analysis of the LIDAR data; and/or build a 3D model of the landscape based upon the measured plurality of dimensions, the 3D model including: (i) a structure, and (ii) a vegetation; and display a representation of the 3D model. The computer system may include additional, less, or alternate functionality, including that discussed elsewhere herein.

The executable instructions may further cause the computer system to: receive drone data; and build the 3D model of the landscape further based upon the received drone data.

The executable instructions may further cause the computer system to: receive object data from a user; and input, into a machine learning algorithm: (i) data of the 3D model of the landscape, and (ii) the received object data to generate a recommendation for placement of the object in the landscape; wherein the machine learning algorithm comprises: a convolutional neural network (CNN); a deep neural network (DNN); or a recurrent neural network (RNN).

The executable instructions may further cause the computer system to: determine dimensional data of boundaries of the landscape based upon: (i) preexisting property data from a database, and (ii) the LIDAR data; and overlay the dimensional data of the boundaries onto the displayed representation of the 3D model.

Exemplary Functionality: Visualization of Utility Lines

In another aspect, a computer-implemented method for visualization of a utility line may be provided. The method may include, via one or more processors, sensors, servers, and/or transceivers: (1) receiving light detection and ranging (LIDAR) data generated from a LIDAR camera; (2) receiving preexisting utility line data; and/or (3) determining a location of the utility line based upon: (i) the received LIDAR data, and (ii) the received preexisting utility line data. The method may include additional, less, or alternate actions, including those discussed elsewhere herein.

For instance, the method may further include, via the one or more processors, transceivers, sensors, and/or servers: analyzing the LIDAR data to determine a location of an object; and determining a location of the object in the preexisting utility line data; wherein the determination of the location of the utility line is made by matching the location of the object determined from the LIDAR data with the location of the objected determined from the preexisting utility line data.

The preexisting utility line data may include a geographic indication of the utility line. The utility line may comprise one of: a gas line; an electric line; a water line; a cable line; or a fiber optic line. The preexisting utility line data may be received from a database of public records.

The method may further include, via the one or more processors, transceivers, sensors, and/or servers: receiving drone data; wherein the determination of the location of the utility line is based further upon the drone data.

The method may further include, via the one or more processors, transceivers, sensors, and/or servers: receiving drone data comprising second LIDAR data and/or radio detection and ranging (RADAR); wherein the determination of the location of the utility line is based further upon the drone data comprising the second LIDAR data and/or RADAR data.

The method may further include, via the one or more processors, transceivers, sensors, and/or servers: receiving global positioning system (GPS) data of the LIDAR camera; wherein the determination of the location of the utility line is based further upon the GPS data.

The method may also include, via the one or more processors, transceivers, sensors, and/or servers: displaying, on a display, the location of the utility line. The method may further include, via the one or more processors, transceivers, sensors, and/or servers: providing, to a user, an indication of where to mark the ground for the utility line based upon the determined location of the utility line.

The method may further include, via the one or more processors, transceivers, sensors, and/or servers: providing, to a user, an indication of the location of the utility line by overlaying the indication of the location of the utility line onto an image or video data of a ground.

The method may also include, via the one or more processors, transceivers, sensors, and/or servers: providing, to a user, an indication of the location of the utility line by overlaying the indication of the location of the utility line onto an image or video of a ground; wherein the image or video is generated by a camera of a smartphone of the user.

The preexisting utility line data may be comprised in geographic data of an area proximate to the utility line; the geographic data of the area proximate to the utility line may further comprise data of a structure in the area proximate to the utility line; and the method may further include, via the one or more processors, transceivers, sensors, and/or servers: determining data of the structure based upon processor analysis of the LIDAR data, the data of the structure based upon processor analysis of the LIDAR data comprising: (i) a location of a structure, and (ii) dimensional data of the structure; comparing (a) the data of the structure determined based upon the processor analysis of the LIDAR data with (b) the data of the structure comprised in the geographic data of the area proximate to the utility line; determining, based upon the comparison, that a location of the structure in the geographic data of the area proximate to the utility line is not correct; and displaying, on a display, an indication that the location of the structure in the geographic data of the area proximate to the utility line is not correct.

In another aspect, a computer system configured for visualization of a utility line may be provided. The computer system may include one or more processors, sensors, servers, and/or transceivers configured to: (1) receive light detection and ranging (LIDAR) data generated from a LIDAR camera; (2) receive preexisting utility line data; and/or (3) determine a location of the utility line based upon: (i) the received LIDAR data, and (ii) the received preexisting utility line data.

The computer system may be further configured to, via the one or more processors, sensors, servers, and/or transceivers: receive drone data comprising second LIDAR data and/or radio detection and ranging (RADAR); wherein the determination of the location of the utility line is based further upon the drone data comprising the second LIDAR data and/or RADAR data.

The computer system may be further configured to, via the one or more processors, sensors, servers, and/or transceivers: provide, to a user, an indication of the location of the utility line by overlaying the indication of the location of the utility line onto an image or video of a ground; wherein the image or video is generated by a camera of a smartphone of the user.

In yet another aspect, a computer system configured for visualization of a utility line may be provided. The computer system may include: one or more processors; and a program memory coupled to the one or more processors and storing executable instructions that when executed by the one or more processors cause the computer system to: receive light detection and ranging (LIDAR) data generated from a LIDAR camera; receive preexisting utility line data; and determine a location of the utility line based upon: (i) the received LIDAR data, and (ii) the received preexisting utility line data.

The executable instructions may further cause the computer system to: analyze the LIDAR data to determine a location of an object; and determine a location of the object in the preexisting utility line data; wherein the determination of the location of the utility line is made by matching the location of the object determined from the LIDAR data with the location of the objected determined from the preexisting utility line data.

The executable instructions may further cause the computer system to: receive drone data comprising second LIDAR data and/or radio detection and ranging (RADAR); wherein the determination of the location of the utility line is based further upon the drone data comprising the second LIDAR data and/or RADAR data.

The executable instructions may further cause the computer system to: provide, to a user, an indication of the location of the utility line by overlaying the indication of the location of the utility line onto an image or video of a ground; wherein the image or video is generated by a camera of a smartphone of the user.

Exemplary Functionality: Commercial Inventory Mapping

In another aspect, a computer-implemented method for commercial inventory mapping may be provided. The method may include, via the one or more processors, sensors, servers, and/or transceivers: (1) receiving light detection and ranging (LIDAR) data generated from a LIDAR camera; (2) determining data of a first object based upon processor analysis of the LIDAR data, the data of the first object comprising: (i) dimensional data of the first object, and (ii) a type of the first object; and/or (3) adding the first object and the first object data to a commercial inventory list. The method may include additional, less, or alternate actions, including those discussed elsewhere herein.

For instance, the method may further include, via the one or more processors, transceivers, sensors, and/or servers: determining data of a second object based upon processor analysis of the LIDAR data, the data of the second object comprising: (i) dimensional data of the second object, and (ii) a type of the second object; and adding the second object and the second object data to the commercial inventory list.

In some embodiments, the LIDAR data may be first LIDAR data, and the method may further include, via the one or more processors, transceivers, sensors, and/or servers: receiving second LIDAR data; determining data of a second object based upon processor analysis of the second LIDAR data, the data of the second object comprising: (i) dimensional data of the second object, and (ii) a type of the second object; and adding the second object and the second object data to the commercial inventory list.

The computer-implemented method may further include, via the one or more processors, transceivers, sensors, and/or servers: determining a location of the first object based upon processor analysis of the LIDAR data; wherein the first object data further comprises the location of the first object.

The computer-implemented method may further include, via the one or more processors, transceivers, sensors, and/or servers: determining a location of the first object based upon processor analysis of the LIDAR data; wherein the first object data further comprises the location of the first object; wherein the method further comprises, via the one or more processors, transceivers, sensors, and/or servers: providing, to a user, directions to the first object based upon the determined location of the first object.

The computer-implemented method may further include, via the one or more processors, transceivers, sensors, and/or servers: receiving global positioning system (GPS) data corresponding to the LIDAR data; determining a location of the first object based upon processor analysis of the LIDAR data and the corresponding GPS data; and wherein the first object data further comprises the location of the first object.

The computer-implemented method may further include, via the one or more processors, transceivers, sensors, and/or servers: receiving photographic camera data from a photographic camera; wherein the type of the first object is determined further based upon processor analysis of the photographic camera data.

In some embodiments, the LIDAR data may be received from one or more drones.

The computer-implemented method may further include, via the one or more processors, transceivers, sensors, and/or servers: receiving photographic camera data from a photographic camera, the photographic camera data comprising either image data or video data; wherein the type of the first object is determined further based upon processor analysis recognizing either a bar code or a Quick Response (QR) code in the either image data or video data.

In another aspect, a computer system configured for commercial inventory mapping may be provided. The computer system may include one or more processors, sensors, servers, and/or transceivers configured to: (1) receive light detection and ranging (LIDAR) data generated from a LIDAR camera; (2) determine data of a first object based upon processor analysis of the LIDAR data, the data of the first object comprising: (i) dimensional data of the first object, and (ii) a type of the first object; and/or (3) add the first object and the first object data to a commercial inventory list.

The computer system may be further configured to, via the one or more processors, sensors, servers, and/or transceivers: determine data of a second object based upon processor analysis of the LIDAR data, the data of the second object comprising: (i) dimensional data of the second object, and (ii) a type of the second object; and add the second object and the second object data to the commercial inventory list.

The computer system may be further configured to, via the one or more processors, sensors, servers, and/or transceivers: determine a location of the first object based upon processor analysis of the LIDAR data; wherein the first object data further comprises the location of the first object.

The computer system may be further configured to, via the one or more processors, sensors, servers, and/or transceivers: determine a location of the first object based upon processor analysis of the LIDAR data; wherein the first object data further comprises the location of the first object; wherein the system is further configured to, via the one or more processors, transceivers, sensors, and/or servers: provide, to a user, directions to the first object based upon the determined location of the first object.

The computer system may be further configured to, via the one or more processors, sensors, servers, and/or transceivers: receive global positioning system (GPS) data corresponding to the LIDAR data; and determine a location of the first object based upon processor analysis of the LIDAR data and the corresponding GPS data; wherein the first object data further comprises the location of the first object.

The computer system may be further configured to, via the one or more processors, sensors, servers, and/or transceivers: determine if there is a second object in the LIDAR data; if there is a second object in the LIDAR data: determine data of the second object based upon processor analysis of the LIDAR data, the data of the second object comprising: (i) dimensional data of the second object, and (ii) a type of the second object; and add the second object and the second object data to the commercial inventory list; and if there is not a second object in the LIDAR data: receive additional LIDAR data generated from the LIDAR camera.

In yet another aspect, a computer system configured for commercial inventory mapping may be provided. The computer system may include: one or more processors; and a program memory coupled to the one or more processors and storing executable instructions that when executed by the one or more processors cause the computer system to: receive light detection and ranging (LIDAR) data generated from a LIDAR camera; determine data of a first object based upon processor analysis of the LIDAR data, the data of the first object comprising: (i) dimensional data of the first object, and (ii) a type of the first object; and add the first object and the first object data to a commercial inventory list.

The executable instructions may further cause the computer system to: determine data of a second object based upon processor analysis of the LIDAR data, the data of the second object comprising: (i) dimensional data of the second object, and (ii) a type of the second object; and add the second object and the second object data to the commercial inventory list.

The executable instructions further cause the computer system to: determine a location of the first object based upon processor analysis of the LIDAR data; wherein the first object data further comprises the location of the first object.

The executable instructions may further cause the computer system to: determine a location of the first object based upon processor analysis of the LIDAR data; wherein the first object data further comprises the location of the first object; wherein the executable instructions further cause the computer system to: provide, to a user, directions to the first object based upon the determined location of the first object.

The executable instructions may further cause the computer system to: determine if there is a second object in the LIDAR data; if there is a second object in the LIDAR data: determine data of the second object based upon processor analysis of the LIDAR data, the data of the second object comprising: (i) dimensional data of the second object, and (ii) a type of the second object; and add the second object and the second object data to the commercial inventory list; if there is not a second object in the LIDAR data: receive additional LIDAR data generated from the LIDAR camera.

Exemplary Functionality: 3D Generation of a Floor Plan for a Commercial Building In another aspect, a computer-implemented method for 3D generation of a floor plan for a commercial building may be provided. The method may include, via one or more processors, sensors, servers, and/or transceivers: (1) receiving a 3-dimensional (3D) model of a floor of a commercial building comprising a plurality of dimensions of the floor of the commercial building; and (2) with a machine learning algorithm, generating a new floor plan of the floor of the commercial building based upon the received 3D model of the floor; wherein the generated new floor plan comprises a 3D floor plan. The method may include additional, less, or alternate actions, including those discussed elsewhere herein.

For instance, the computer-implemented method may further include, via the one or more processors, transceivers, sensors, and/or servers: receiving light detection and ranging (LIDAR) data generated from a LIDAR camera; wherein the plurality of dimensions of the commercial building are determined based upon processor analysis of the LIDAR data.

The new floor plan may include a 3D layout of a meeting room generated by the machine learning algorithm. The computer-implemented method may further include, via the one or more processors, transceivers, sensors, and/or servers: receiving, from a human user, an input of a first room location on the floor; wherein the new floor plan is generated based further upon the input first room location; and wherein the first room comprises: an office; a kitchen; a storage area; a meeting room; or a conference room.

The commercial building may comprise one or more offices. In some embodiments, the machine learning algorithm may be: a convolutional neural network (CNN); a deep neural network (DNN); or a recurrent neural network (RNN).

The computer-implemented method may further include, via the one or more processors, transceivers, sensors, and/or servers: prior to generating the new floor plan, training the machine learning algorithm based upon input of a plurality of 3D models of floor plans.

The computer-implemented method may further include, via the one or more processors, transceivers, sensors, and/or servers: prior to generating the new floor plan, training the machine learning algorithm based upon inputs of: (i) a plurality of 3D models of floor plans, and (ii) correlations between: (a) individual 3D models of floor plans of the plurality of 3D models of floor plans, and (b) a company's efficiency or profits.

The computer-implemented method may further include, via the one or more processors, transceivers, sensors, and/or servers: with the machine learning algorithm, creating a company profile based upon 3D models of floor plans of the company; wherein the generation of the new floor plan is based further upon the company profile.

The computer-implemented method may further include, via the one or more processors, transceivers, sensors, and/or servers: displaying a representation of the new floor plan on a display device including overlaying dimensional data of at least one room of the new floor plan onto the representation of the new plan.

In another aspect, a computer system configured for 3D generation of a floor plan for a commercial building may be provided. The computer system may include one or more processors, sensors, servers, and/or transceivers configured to: (1) receive a 3-dimensional (3D) model of a floor of a commercial building comprising a plurality of dimensions of the floor of the commercial building; and (2) with a machine learning algorithm, generate a new floor plan of the floor of the commercial building based upon the received 3D model of the floor; wherein the generated new floor plan comprises a 3D floor plan. The computer system may include additional, less, or alternate functionality, including that discussed elsewhere herein.

For instance, the computer system may be further configured to, via the one or more processors, sensors, servers, and/or transceivers: receive light detection and ranging (LIDAR) data generated from a LIDAR camera; and determine the plurality of dimensions of the commercial building based upon processor analysis of the LIDAR data.

The computer system may be further configured to, via the one or more processors, sensors, servers, and/or transceivers: receive, from a human user, an input of a first room location on the floor; wherein the new floor plan is generated based further upon the input first room location; and wherein the first room comprises: an office; a kitchen; a storage area; a meeting room; or a conference room.

The computer system may be further configured to, via the one or more processors, sensors, servers, and/or transceivers: prior to generating the new floor plan, train the machine learning algorithm based upon input of a plurality of 3D models of floor plans.

The computer system may be further configured to, via the one or more processors, sensors, servers, and/or transceivers: display a representation of the new floor plan on a display device by overlaying dimensional data of at least one room of the new floor plan onto the representation of the new plan.

In yet another aspect, a computer system configured for 3D generation of a floor plan for a commercial building may be provided. The computer system may include: one or more processors; and a program memory coupled to the one or more processors and storing executable instructions that when executed by the one or more processors cause the computer system to: receive a 3-dimensional (3D) model of a floor of a commercial building comprising a plurality of dimensions of the floor of the commercial building; and with a machine learning algorithm, generate a new floor plan of the floor of the commercial building based upon the received 3D model of the floor; wherein the generated new floor plan comprises a 3D floor plan. The computer system may include additional, less, or alternate functionality, including that discussed elsewhere herein.

For instance, the executable instructions further cause the computer system to: receive light detection and ranging (LIDAR) data generated from a LIDAR camera; and determine the plurality of dimensions of the commercial building based upon processor analysis of the LIDAR data.

The executable instructions may further cause the computer system to: receive, from a human user, an input of a first room location on the floor; wherein the new floor plan is generated based further upon the input first room location; and wherein the first room comprises: an office; a kitchen; a storage area; a meeting room; or a conference room.

The executable instructions may further cause the computer system to: prior to generating the new floor plan, train the machine learning algorithm based upon input of a plurality of 3D models of floor plans.

The executable instructions may further cause the computer system to: display a representation of the new floor plan on a display device by overlaying dimensional data of at least one room of the new floor plan onto the representation of the new plan.

Exemplary Functionality: 3D Navigation of an Interior of a Building

In another aspect, a computer-implemented method for 3D navigation of an interior of a building may be provided. The method may include, via one or more processors, sensors, servers, and/or transceivers: (1) receiving a 3-dimensional (3D) model of the building, the 3D model comprising: (i) a plurality of dimensions of the interior of the building, and (ii) a location of a room and/or a location of a commercial item; (2) receiving, from a user, a request for navigation instructions to the room and/or the commercial item; (3) calculating the navigation instructions based upon the received 3D model of the building; and/or (4) providing, to the user, the calculated navigation instructions to the room and/or the commercial item. The method may include additional, less, or alternate actions, including those discussed else-where herein.

For instance, the computer-implemented method may further include, via the one or more processors, transceivers, sensors, and/or servers: receiving light detection and ranging (LIDAR) data generated from a LIDAR camera; wherein the plurality of dimensions of the interior of the building are determined based upon processor analysis of the LIDAR data.

The computer-implemented method may further include, via the one or more processors, transceivers, sensors, and/or servers: receiving light detection and ranging (LIDAR) data generated from a LIDAR camera; based upon processor analysis of the LIDAR data, determining: (i) the location of the room in the interior of the building, and (ii) the location of the commercial item in the commercial building.

The location of the room may be included in the 3D model and the navigation instructions; and the room may comprise: an office; a conference room; a kitchen; or a refrigeration room.

The location of the commercial item may be included in the 3D model and the navigation instructions; and the commercial item may comprise: a grocery item; a medical item; a furniture item; or an electronics item.

The location of the commercial item may be included in the 3D model and the navigation instructions; the commercial item may be a grocery item; and the navigation instructions may comprise: (i) an aisle number of the grocery item, and (ii) a height level from the ground of the grocery item.

The location of the commercial item may be included in the 3D model and the navigation instructions; the request for navigation instructions may comprise a list of commercial items including at least two commercial items; and the provided navigation instructions may comprise a most distance-efficient route to obtain the at least two items of the list of commercial items.

The location of the commercial item may be included in the 3D model and the navigation instructions; the request for navigation instructions may comprise a list of commercial items including at least two commercial items; and the provided navigation instructions may comprise a most time-efficient route to obtain the at least two items of the list of commercial items; and the most time-efficient route may be based upon: (i) the locations the at least two items of the commercial items, and (ii) camera data comprising customer density data.

The computer-implemented method may further include, via the one or more processors, transceivers, sensors, and/or servers: with a machine learning algorithm, determining that the user is having difficulty locating the room and/or commercial item; and in response to the determination: (i) providing, to the user, navigation instructions to a location of an employee of a store, and/or (ii) providing, to a company employee, an alert that the user is having difficulty locating the room and/or commercial item.

The computer-implemented method may further include, via the one or more processors, transceivers, sensors, and/or servers: with a machine learning algorithm, determining that the user is having difficulty locating the room and/or commercial item; and in response to the determination, providing, to the user, alternative navigation instructions to the room and/or commercial item.

The computer-implemented method may further include, via the one or more processors, transceivers, sensors, and/or servers: adding, to a database, the provided navigation instructions along with other data received from the user; with a machine learning algorithm and based upon the navigation instructions along with the other data received from the user added to the database: diagnosing that a room and/or commercial item is difficult to locate.

The computer-implemented method may further include, via the one or more processors, transceivers, sensors, and/or servers: overlaying, onto a pair of computerized glasses, the provided navigation instructions to the room and/or commercial item.

In yet another aspect, a computer system configured for 3D navigation of an interior of a building may be provided. The computer system may include one or more processors, sensors, servers, and/or transceivers configured to: (1) receive a 3-dimensional (3D) model of the building, the 3D model comprising: (i) a plurality of dimensions of the interior of the building, and (ii) a location of a room and/or a location of a commercial item; (2) receive, from a user, a request for navigation instructions to the room and/or the commercial item; (3) calculate the navigation instructions based upon the received 3D model of the building; and/or (4) provide, to the user, the calculated navigation instructions to the room and/or the commercial item. The computer system may include additional, less, or alternate functionality, including that discussed elsewhere herein.

For instance, the computer system may be further configured to, via the one or more processors, sensors, servers, and/or transceivers: receive light detection and ranging (LIDAR) data generated from a LIDAR camera; based upon processor analysis of the LIDAR data, determine: (i) the location of the room in the interior of the building, and (ii) the location of the commercial item in the commercial building.

The location of the commercial item may be included in the 3D model and the navigation instructions; the request for navigation instructions may comprise a list of commercial items including at least two commercial items; and the provided navigation instructions comprise a most distance-efficient route to obtain the at least two items of the list of commercial items.

The computer system may be further configured to, via the one or more processors, sensors, servers, and/or transceivers: add, to a database, the provided navigation instructions along with other data received from the user; and with a machine learning algorithm and based upon the navigation instructions along with the other data received from the user added to the database: diagnose that a room and/or commercial item is difficult to locate.

In yet another aspect, a computer system configured for 3D navigation of an interior of a building may be provided. The computer system may include: one or more processors; and a program memory coupled to the one or more processors and storing executable instructions that when executed by the one or more processors cause the computer system to: receive a 3-dimensional (3D) model of the building, the 3D model comprising: (i) a plurality of dimensions of the interior of the building, and (ii) a location of a room and/or a location of a commercial item; receive, from a user, a request for navigation instructions to the room and/or the commercial item; calculate the navigation instructions based upon the received 3D model of the building; and/or provide, to the user, the calculated navigation instructions to the room and/or the commercial item. The computer system may include additional, less, or alternate functionality, including that discussed elsewhere herein.

The executable instructions may further cause the computer system to: receive light detection and ranging (LIDAR) data generated from a LIDAR camera; based upon processor analysis of the LIDAR data, determine: (i) the location of the room in the interior of the building, and (ii) the location of the commercial item in the commercial building.

The location of the commercial item may be included in the 3D model and the navigation instructions; the request for navigation instructions may comprise a list of commercial items including at least two commercial items; and the provided navigation instructions may comprise a most distance-efficient route to obtain the at least two items of the list of commercial items.

The executable instructions may further cause the computer system to: add, to a database, the provided navigation instructions along with other data received from the user; and with a machine learning algorithm and based upon the navigation instructions along with the other data received from the user added to the database: diagnose that a room and/or commercial item is difficult to locate.

Other Matters

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

Furthermore, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The invention claimed is:

1. A computer-implemented method for representation of a home, the method comprising, via one or more processors, sensors, servers, and/or transceivers:
   receiving light detection and ranging (LIDAR) data generated from a LIDAR camera;
   measuring a plurality of dimensions of the home based upon processor analysis of the LIDAR data;
   building a 3D model of the home based upon the measured plurality of dimensions;
   displaying a representation of the 3D model;
   receiving, via wireless communication or data transmission over one or more radio frequency links, a user selection of an object displayed in the displayed representation of the 3D model; and
   displaying a 2D image of the selected object including displaying, in the 2D image, numerical values of a height and a width of the object according to dimensions of the object measured from the LIDAR data.

2. The computer-implemented method of claim 1, further comprising, via the one or more processors, transceivers, sensors, and/or servers, receiving navigation input via wireless communication or data transmission over one or more radio frequency links;
   wherein visual navigation through the 3D model is based upon the received navigation input.

3. The computer-implemented method of claim 1, further comprising, via the one or more processors, transceivers, sensors, and/or servers:
   displaying an arrow on the displayed representation of the 3D model; and receiving navigation input via wireless communication or data transmission over one or more radio frequency links, the navigation input comprising a user selection of the arrow;
wherein visual navigation through the 3D model is based upon the received navigation input.

4. The computer-implemented method of claim 1, wherein:
the measured plurality of dimensions includes a measured width of a wall; and
the displaying the representation of the 3D model further comprises overlaying a numerical value of the width of the wall onto a visual representation of the wall in the displayed representation of the 3D model.

5. The computer-implemented method of claim 1, wherein:
the displaying the representation of the 3D model further comprises overlaying the numerical values of the height and width of the object onto a visual representation of the object in the displayed representation of the 3D model.

6. The computer-implemented method of claim 1, further comprising, via the one or more processors, transceivers, sensors, and/or servers:
receiving camera data including color data;
wherein the 3D model is built further based upon the color data.

7. The computer-implemented method of claim 1, further comprising, via the one or more processors, transceivers, sensors, and/or servers, receiving camera data including color data;
wherein the building of the 3D model further comprises:
deriving dimensions of a wall based upon processor analysis of the LIDAR data;
deriving a color of the wall based upon processor analysis of the camera data; and
filling, into the 3D model, the wall including the derived dimensions of the wall and the derived color of the wall.

8. A computer system configured for 3D representation of a home, the computer system comprising one or more processors, sensors, servers, and/or transceivers configured to:
receive light detection and ranging (LIDAR) data generated from a LIDAR camera;
measure plurality of dimensions of the home based upon processor analysis of the LIDAR data;
build a 3D model of the home based upon the measured plurality of dimensions;
display a representation of the 3D model;
receive, via wireless communication or data transmission over one or more radio frequency links, a user selection of an object displayed in the displayed representation of the 3D model; and
display a 2D image of the selected object including displaying, in the 2D image, numerical values of a height and a width of the object according to dimensions of the object measured from the LIDAR data.

9. The computer system of claim 8, further configured to, via the one or more processors, sensors, servers, and/or transceivers receive navigation input via wireless communication or data transmission over one or more radio frequency links;
wherein visual navigation through the 3D model is based upon the received navigation input.

10. The computer system of claim 8, further configured to, via the one or more processors, sensors, servers, and/or transceivers:
display an arrow on the displayed representation of the 3D model;
receive navigation input via wireless communication or data transmission over one or more radio frequency links, the navigation input comprising a user selection of the arrow; and
base visual navigation through the 3D model upon the received navigation input.

11. The computer system of claim 8, wherein:
the measured plurality of dimensions includes a measured width of a wall; and
the computer system is further configured to, via the one or more processors, sensors, servers, and/or transceivers, display the representation of the 3D model by overlaying a numerical value of the width of the wall onto a visual representation of the wall in the displayed representation of the 3D model.

12. The computer system of claim 8, further configured to, via the one or more processors, sensors, servers, and/or transceivers:
receive camera data including color data; and
build the 3D model further based upon the color data.

13. The computer system of claim 8, further configured to, via the one or more processors, sensors, servers, and/or transceivers:
receive camera data including color data; and
build the 3D model by:
deriving dimensions of a wall based upon processor analysis of the LIDAR data;
deriving a color of the wall based upon processor analysis of the camera data; and
filling, into the 3D model, the wall including the derived dimensions of the wall and the derived color of the wall.

14. A computer system configured for 3D representation of a home, comprising:
one or more processors; and
a non-transitory program memory coupled to the one or more processors and storing executable instructions that when executed by the one or more processors cause the computer system to:
receive light detection and ranging (LIDAR) data generated from a LIDAR camera;
measure plurality of dimensions of the home based upon processor analysis of the LIDAR data;
build a 3D model of the home based upon the measured plurality of dimensions;
display a representation of the 3D model;
receive, via wireless communication or data transmission over one or more radio frequency links, a user selection of an object displayed in the displayed representation of the 3D model; and
display a 2D image of the selected object including displaying, in the 2D image, numerical values of a height and a width of the object according to dimensions of the object measured from the LIDAR data.

15. The computer system of claim 14, wherein:
the executable instructions further cause the computer system to receive navigation input via wireless communication or data transmission over one or more radio frequency links; and
visual navigation through the 3D model is based upon the received navigation input.

16. The computer system of claim 14, wherein the executable instructions further cause the computer system to:
display an arrow on the displayed representation of the 3D model;
receive navigation input via wireless communication or data transmission over one or more radio frequency links, the navigation input comprising a user selection of the arrow; and
base visual navigation through the 3D model upon the received navigation input.

17. The computer system of claim 14, wherein:
the measured plurality of dimensions includes a measured width of a wall; and
the executable instructions further cause the computer system to display the representation of the 3D model by overlaying a numerical value of the width of the wall onto a visual representation of the wall in the displayed representation of the 3D model.

18. The computer system of claim 14, wherein:
the executable instructions further cause the computer system to display the representation of the 3D model by overlaying the numerical values of the height and width of the object onto a visual representation of the object in the displayed representation of the 3D model.

19. The computer system of claim 14, wherein the executable instructions further cause the computer system to:
receive camera data including color data; and
build the 3D model further based upon the color data.

20. The computer system of claim 14, wherein the executable instructions further cause the computer system to:
receive camera data including color data; and
build the 3D model by:
deriving dimensions of a wall based upon processor analysis of the LIDAR data;
deriving a color of the wall based upon processor analysis of the camera data; and
filling, into the 3D model, the wall including the derived dimensions of the wall and the derived color of the wall.

\* \* \* \* \*